United States Patent
Dulebenets

(10) Patent No.: US 11,829,935 B2
(45) Date of Patent: Nov. 28, 2023

(54) APPLICATION OF A MULTI-OBJECTIVE OPTIMIZATION MODEL FOR AUTOMATIC VESSEL SCHEDULING IN LINER SHIPPING

(71) Applicant: Florida A&M University, Tallahassee, FL (US)

(72) Inventor: Maxim A. Dulebenets, Tallahassee, FL (US)

(73) Assignee: Florida A&M University, Tallahassee, FL (US)

( * ) Notice: Subject to any disclaimer, the term of this patent is extended or adjusted under 35 U.S.C. 154(b) by 803 days.

(21) Appl. No.: 16/369,101

(22) Filed: Mar. 29, 2019

(65) Prior Publication Data

US 2019/0303859 A1    Oct. 3, 2019

Related U.S. Application Data

(60) Provisional application No. 62/652,036, filed on Apr. 3, 2018.

(51) Int. Cl.
  G06Q 10/08    (2023.01)
  *G06Q 10/0835*    (2023.01)
  *G06Q 10/1091*    (2023.01)

(52) U.S. Cl.
  CPC ..... *G06Q 10/0835* (2013.01); *G06Q 10/1091* (2013.01)

(58) Field of Classification Search
  USPC .......................................... 705/337, 1.1, 7.11
  See application file for complete search history.

(56) References Cited

U.S. PATENT DOCUMENTS

2015/0178649 A1*  6/2015  Furman ............ G06Q 10/06312
                                                                 705/7.22

FOREIGN PATENT DOCUMENTS

CN        103944161 A  *  7/2014  ............. Y04S 10/50
JP           3973922 B2  *  9/2007  ......... F02D 41/1479
                                     (Continued)

OTHER PUBLICATIONS

Visentini, Monize Sâmara et al. "Review of Real-Time Vehicle Schedule Recovery Methods in Transportation Services." Journal of scheduling 17.6 (2014): 541-567. Web. (Year: 2014).*

(Continued)

*Primary Examiner* — Akiba K Robinson
(74) *Attorney, Agent, or Firm* — Owen G. Behrens; Smith & Hopen, P.A.

(57) ABSTRACT

The practical application of a multi-objective mixed integer nonlinear optimization model for the improvement of vessel scheduling, which accounts for all major route service cost components reported in the literature and separates them in two conflicting groups. The original mixed integer nonlinear model is linearized by discretizing the vessel sailing speed reciprocal, and the Global Multi-Objective Optimization Algorithm is developed to solve the linearized model. It was found that negotiation of both vessel service time windows and handling rates between liner shipping companies and marine container terminal operators may significantly reduce the total route service cost components. Furthermore, the numerical experiments show that vessel schedules are more sensitive to the unit fuel cost as compared to the unit carbon dioxide emission cost.

7 Claims, 23 Drawing Sheets

(56) References Cited

FOREIGN PATENT DOCUMENTS

| WO | WO-2009082454 A1 * | 7/2009 | ............. G06Q 10/04 |
|----|---|---|---|
| WO | WO-2015171286 A1 * | 11/2015 | ............. G06Q 10/04 |

OTHER PUBLICATIONS

Alhrabi, A. et al., 2014. Schedule design for sustainable container supply chain networks with port time windows. Advanced Engineering Informatics vol. 29, pp. 322-331.

American Shipper, Aug. 2015. Best practices and collaboration for curbing port congestion. White paper.

Aydin, N. et al., 2017. Speed optimization and bunkering in liner shipping in the presence of uncertain service times and time windows at ports. European Journal of Operational Research vol. 259, pp. 143-154.

Bilgen, B. et al., 2007. A mixed-integer linear programming model for bulk grain blending and shipping. International Journal of Production Economics vol. 107, pp. 555-571.

Brouer, B. et al., 2013. The Vessel Schedule Recovery Problem (VSRP)—A MIP model for handling disruptions in liner shipping. European Journal of Operational Research vol. 224, pp. 362-374.

Chuang, T. et al., 2010. Planning the route of container ships: A fuzzy genetic approach. Expert Systems with Applications vol. 37, pp. 2948-2956.

Deb, K., et al, Apr. 2002. A fast and elitist multiobjective genetic algorithm: NSGA-II. IEEE Transactions on Evolutionary Computation, vol. 6, No. 2, pp. 182-197.

Du, Y. et al., 2011. Berth allocation considering fuel consumption and vessel emissions. Transportation Research Part E, vol. 47, pp. 1021-1037.

Dulebenets, M.A., Jun. 2015. Bunker consumption optimization in liner shipping: A metaheuristic approach. International Journal on Recent and Innovation Trends in Computing and Communication vol. 3, Issue 6, pp. 3766-3776.

Dulebenets, M.A., 2018. The vessel scheduling problem in a liner shipping route with heterogeneous vessel fleet. International Journal of Civil Engineering, 16:19-32.

Dulebenets, M.A., 2017. Advantages and disadvantages from enforcing emission restrictions within emission control areas. Maritime Business Review, vol. 1, No. 2, pp. 107-132.

Dulebenets, M.A. et al., 2017. The green vessel schedule design problem: Consideration of emissions constraints. Energy Systems, 8:761-783.

Dulebenets, M.A. et al., 2017. Vessel scheduling in liner shipping: Modeling transport of perishable assets. International Journal of Production Economics vol. 184, pp. 141-156.

U.S. EPA, 2017. Causes of Climate Change. https://www3.epa.gov/climatechange/science/ causes.html. Accessed May 29, 2019.

Fagerholt, K., 2001. Ship scheduling with soft time windows: An optimization based approach. European Journal of Operational Research, vol. 131, pp. 559-571.

Fagerholt, K. et al., 2015. Maritime routing and speed optimization with emission control areas. Transportation Research Part C, vol. 52, pp. 57-73.

Fagerholt, K. et al., 2015. On two speed optimization problems for ships that sail in and out of emission control areas. Transportation Research Part D, vol. 39, pp. 56-64.

IContainers, 2017. Shipping alliances: New mergers. http://www.icontainers.com/us/2016/08/11/new-alliances-shipping-line-mergers/. Accessed May 29, 2019.

Journal of Commerce, 2015. Container shipping industry faces potential wave of consolidation. http://www.joc.com. Accessed Feb. 7, 2017.

Journal of Commerce, 2016. Japanese shipping merger to create new major liner. http://www.joc.com. Accessed Feb. 7, 2017.

Journal of Commerce, 2016. Hanjin Shipping bankruptcy timeline: How did we get here? http://www.joc.com. Accessed Feb. 7, 2017.

Kontovas, C., 2014. The Green Ship Routing and Scheduling Problem (GSRSP): A conceptual approach. Transportation Research Part D, vol. 31, pp. 61-69.

Li, C. et al., 2015. Disruption recovery for a vessel in liner shipping. Transportation Science vol. 49, Issue 4, pp. 900-921.

Li, C. et al., 2015. Real-time schedule recovery in liner shipping service with regular uncertainties and disruption events. Transportation Research Part B, http://dx.doi.org/10.1016/j.trb.2015.10.004.

Mansouri, S. et al., 2015. Multi-objective decision support to enhance environmental sustainability in maritime shipping: A review and future directions. Transportation Research Part E, vol. 78, pp. 3-18.

Meng, Q. et al., 2014. Containership routing and scheduling in liner shipping: Overview and future research directions. Transportation Science, vol. 48, No. 2, pp. 265-280.

OOCL, 2017. Schedule by Service Loops, Asia-Europe (AET), Asia-Mediterranean Express Service (EUM). http://www.oocl.com. Accessed May 29, 2019.

Ports.com, 2017. Sea route & distance. http://ports.com/sea-route. Accessed May 29, 2019.

Psaraftis, H. et al., 2013. Speed models for energy-efficient maritime transportation: A taxonomy and survey. Transportation Research Part C, vol. 26, pp. 331-351.

Ronen, D., 2011. The effect of oil price on containership speed and fleet size. Journal of the Operational Research Society vol. 62, No. 1, pp. 211-216.

Qi, X., et al., 2012. Minimizing fuel emissions by optimizing vessel schedules in liner shipping with uncertain port times. Transportation Research Part E, vol. 48, pp. 863-880.

Schroten, A. et al., 2011. External Cost Calculator—Methodology report. CE Delft and IVE mbH.

Song, D. et al., 2015. Multi-objective optimization for planning liner shipping service with uncertain port times. Transportation Research Part E, vol. 84, pp. 1-22.

The Port Authority of New York and New Jersey, 2016. Marine Terminal Tariffs. http://www.panynj.gov/port/tariffs.html. Accessed May 29, 2019.

Tran, N. et al., 2017. An empirical disclosure of fleet expansion and growth of ship size in container liner shipping. International Journal of Production Economics 159, 241-253.

Tran, N. et al., 2016. Container shipping route design incorporating the costs of shipping, inland/feeder transport, inventory and $CO_2$ emission. Maritime Economics & Logistics, 1-28.

Wang, S. et al., 2014. Liner ship route schedule design with port time windows. Transportation Research Part C, vol. 41, pp. 1-17.

Wang, S. et al., 2012. Liner ship route schedule design with sea contingency time and port time uncertainty. Transportation Research Part B 46, 615-633.

Wang, S. et al., 2012. Sailing speed optimization for container ships in a liner shipping network. Transportation Research Part E 48, 701-714.

Wang, S. et al., 2012. Robust schedule design for liner shipping services. Transportation Research Part E 48, 1093-1106.

Wang, S. et al., 2013. Bunker consumption optimization methods in shipping: A critical review and extensions. Transportation Research Part E 53, 49-62.

Wang, S. et al., 2013. A note on "Berth allocation considering fuel consumption and vessel emissions". Transportation Research Part E 49, 48-54.

Wang, S. et al., 2015. Estimation of the perceived value of transit time for containerized cargoes. Transportation Research Part A 78, 298-308.

World Bank, 2016. Cost to import (US$ per container). http://data.worldbank.org/ indicator/IC.IMP.COST.CD. Accessed May 29, 2019.

World Shipping Council, 2015. Some observations on port congestion, vessel size and vessel sharing agreements. http://www.worldshipping.org. Accessed Dec. 15, 2016.

Yang, C. et al., 2009. Assessing resources, logistics service capabilities, innovation capabilities and the performance of container shipping services in Taiwan. International Journal of Production Economics 122, 4-20.

(56) References Cited

OTHER PUBLICATIONS

Zampelli, S. et al., 2014. The berth allocation and quay crane assignment problem using a CP approach. Principles and Practice of Constraint Programming, Springer Berlin Heidelberg, 880-896.
Zhen, L. et al., 2016. Models on ship scheduling in transshipment hubs with considering bunker cost. International Journal of Production Economics 173, 111-121.

\* cited by examiner

APPLICATION OF A MULTI-OBJECTIVE OPTIMIZATION MODEL FOR AUTOMATIC VESSEL SCHEDULING IN LINER SHIPPING

CROSS-REFERENCE TO RELATED APPLICATIONS

This nonprovisional application claims priority to U.S. Provisional Patent Application No. 62/652,036, entitled "Vessel Scheduling in Liner Shipping with Conflicting Objectives," filed Apr. 3, 2018 by the same inventors, the entirety of which is incorporated herein by this reference.

TECHNICAL FIELD

This invention relates, generally, to the design of and practical application of models in creating vessel schedules in liner shipping. More specifically, it relates to a holistic application of multi-objective optimization models for the vessel scheduling problem in liner shipping that accounts for all major route service cost components, separated into two conflicting groups, which provides an improvement in vessel scheduling. More specifically, it relates to the practical application of the multi-objective optimization model for vessel scheduling when multiple variables may change in importance and applicability in the context of shipping company consolidation.

BACKGROUND

Marine transportation is critical for the global trade (Bilgen and Ozkarahan, 2007; Yang et al., 2009; Zhen et al., 2016; Dulebenets and Ozguven, 2017; Tran and Haasis, 2017), and international seaborne trade volumes have been continuously increasing over the last years. More than 90% of the total global trade volumes are transported by ocean-going vessels. The United Nations Conference on Trade and Development (UNCTAD) indicates that the total volumes of the international trade, carried by oceangoing vessels, reached 10.05 billion tons in 2015, which is a 2.1% increase as compared to the total seaborne international trade volumes recorded in 2014 (UNCTAD, 2016).

Many liner shipping companies started consolidation to form stronger alliances and attract new customers. In order to remain competitive, serve the growing demand, and avoid potential monetary losses, liner shipping companies have to design efficient vessel schedules to ensure that the cargo will be delivered to ports in a timely manner. In the vessel scheduling problem, a given liner shipping company has to decide on the vessel sailing speeds at voyage legs of the liner shipping route, arrival times at ports of call, departure times from ports of call, handling rates at ports of call, and the number of vessels required to provide the agreed port service frequency (Meng et al., 2014).

Many operational decisions that have to be made by liner shipping companies throughout the design of vessel schedules are conflicting in their nature (Mansouri et al., 2015). For example, if a given liner shipping company aims to reduce the fuel consumption and associated costs, it will be required to decrease the vessel sailing speeds at voyage legs of the given liner shipping route, which will further increase the total vessel turnaround time. Therefore, it will be necessary to deploy more vessels to guarantee the agreed service frequency at ports of the given liner shipping route, which will increase the total vessel weekly operational costs. Similarly, the liner shipping company may be able to reduce the total turnaround time of vessels by negotiating handling rates with higher handling productivities with marine container terminal operators; however, the latter will incur additional port handling costs. Nevertheless, the vessel scheduling models, presented in the literature to date, generally combine all the conflicting objectives into one objective function, which aims to minimize the total route service cost (Meng et al., 2014; Mansouri et al., 2015). The latter approach does not allow capturing the conflicting nature of the route service cost components and imposes limitations in the analysis of important tradeoffs.

The vessel scheduling problem is considered as a tactical-level decision problem (vessel schedules are generally constructed with a frequency, varying from 3 months to 6 months), where the liner shipping company is required to determine the vessel sailing speed at voyage legs of the liner shipping route, negotiate the appropriate handling rates with the marine container terminal operators at ports of call, decide on the vessel arrival times at ports of call, departure times from ports of call (depending on the handling rates, negotiated with the marine container terminal operators), and allocate the required amount of vessels for service of ports of the liner shipping route with a specific frequency (ports are typically visited on weekly/bi-weekly basis).

As discussed above, some decisions, which have to be made by liner shipping companies, are conflicting in their nature. For example, in order to reduce the fuel consumption by vessels and decrease the associated costs, the liner shipping company will have to reduce the vessel sailing speeds. Reduction in fuel consumption will allow decreasing the total amount of carbon dioxide ($CO_2$) emissions produced by vessels in sea, which will improve the environmental sustainability of the liner shipping operations. However, reduction in the vessel sailing speeds will increase the total transit time of containers, which will further cause an increase in the container inventory costs (since containers will have to stay longer on vessels). Furthermore, increasing transit time of containers will further increase the total turnaround time of vessels at the given liner shipping route. Therefore, the liner shipping company will be required to deploy more vessels at the given liner shipping route in order to provide the agreed service frequency at each port of call. On the other hand, the liner shipping company will be able to reduce the total vessel turnaround time by requesting handling rates with higher productivities (i.e., to reduce the total handling time of vessels at ports). However, marine container terminal operators will impose higher port handling costs to the liner shipping company for requesting handling rates with higher productivities. Moreover, marine container terminal operators will have to deploy more handling equipment to provide higher handling productivities and ensure faster service of vessels, which will increase the total amount of $CO_2$ emissions produced at ports due to container handling. In the meantime, reduction of the vessel sailing speeds may cause violation of vessel arrival time windows, negotiated with marine container terminal operators. Based on the contractual agreements between the liner shipping company and marine container terminal operators, the liner shipping company may be required to pay penalties for violation of the vessel arrival time windows.

The vessel scheduling models, taught in the liner shipping literature to date, generally combine all the aforementioned cost components into one objective function, which aims to minimize the total liner shipping route service cost. However, the latter approach, which is similar to the weighted sum approach in multi-objective optimization, does not allow capturing the conflicting nature of certain cost components and imposes significant limitations for liner shipping companies in the analysis of tradeoffs among the conflicting objectives.

The problem of vessel scheduling in liner shipping has been extensively studied over the last years. Generally, the vessel scheduling problem is classified as a tactical level decision problem (Meng et al., 2014), where the liner shipping company has to make medium term decisions (e.g., arrival times at ports of call, vessel sailing speeds at voyage legs of the liner shipping route, handling times at ports of call, departure times from ports of call). The literature review, which is presented in this document, briefly describes the published to date studies on vessel scheduling and primarily focuses on the objective functions that were considered in the proposed mathematical models.

All of the reviewed studies were classified in the following categories: (1) general vessel scheduling; (2) uncertainty in liner shipping operations; (3) collaborative agreements; (4) vessel schedule recovery; and (5) green vessel scheduling.

General vessel scheduling. Fagerholt (2001) studied the vessel scheduling problem, where service time windows (TWs) at ports could be violated by arriving vessels. The liner shipping company was assumed to incur an additional inconvenience cost for vessel arrivals outside the agreed service TWs. The objective minimized the total route service cost, including the transportation cost (e.g., vessel operational cost, fuel consumption cost, chartering cost, etc.) and the inconvenience cost. The problem was solved using a set partitioning algorithm. It was found that the problem size significantly influenced the computational performance of the proposed solution approach. Dulebenets (2015a) proposed a metaheuristic algorithm for the vessel scheduling problem, where the objective aimed to minimize the total route service cost. A comparative analysis against a static secant approximation indicated that the developed algorithm provided more accurate values of the objective function for the majority of the considered problem instances and outperformed the static secant approximation in terms of computational time for all the considered problem instances. Wang et al. (2015) presented a methodology, which could be used to estimate the perceived value of container transit times. The objective of the mathematical model minimized the total cost, associated with the fuel consumption and container transit time.

Dulebenets (2016a) studied the vessel scheduling problem, where the liner shipping route was served with a heterogeneous vessel fleet. The objective aimed to minimize the total vessel turnaround cost. BARON was used to solve the problem. Numerical experiments demonstrated that the vessel schedules were more affected with deployment of larger vessels as compared to increasing unit fuel cost. Dulebenets and Ozguven (2017) proposed a mathematical model for the vessel scheduling problem in a liner shipping route with perishable assets. The objective minimized the total route service cost, including the cost associated with deterioration of perishable assets on board the vessels. The original model was linearized using piecewise secant approximations and solved using CPLEX. Computational experiments indicated that maintaining freshness of perishable assets might cause an increase in the route service cost. Furthermore, deployment of small size vessels would be more advantageous for liner shipping routes with perishable assets.

Ronen (2011) and Aydin et al. (2017) proposed the sailing speed optimization and bunker management models, and findings from those studies can be considered by liner shipping companies in construction of cost-effective vessel schedules. Specifically, Ronen (2011) presented a sailing speed optimization model, aiming to minimize the annual route operational cost. The annual route operational cost included the fuel consumption cost and the total vessel weekly operational cost. An analytical procedure was developed to solve the problem. A set of numerical experiments, conducted using the published liner shipping data, indicated that selection of the vessel sailing speed, close to the minimum cost vessel sailing speed, could yield significant cost savings. Aydin et al. (2017) studied the problem of the sailing speed optimization and bunker management in liner shipping, considering stochastic port times. The objective of the mathematical model minimized the total route service cost, including the fuel consumption cost and the cost of late vessel arrivals at ports. The model accounted not only for the fuel consumption throughout the voyage between consecutive ports, but also for the fuel consumption during waiting and service at ports. A dynamic programming methodology was adopted to solve the problem. Results from computational experiments indicated that consideration of the port time uncertainty in selection of the vessel sailing speed significantly reduced the fuel consumption cost.

Uncertainty in liner shipping operations. Several studies primarily focused on modeling uncertainty in liner shipping operations. Chuang et al. (2010) proposed a mathematical model for the vessel routing and scheduling problem, taking into consideration uncertainty in port handling times, sailing times, and demand at ports of call. The objective aimed to maximize the total profit. The problem was solved using a fuzzy Evolutionary Algorithm. The conducted computational experiments showed effectiveness of the presented methodology and the developed solution algorithm. Qi and Song (2012) focused on the vessel scheduling problem, considering the effects of port handling time uncertainty. The objective minimized the total expected fuel consumption and the total vessel arrival delays at ports of call. The sample average approximation method was applied to solve the problem. A set of numerical experiments, performed in that disclosure, showcased that the port time uncertainty could significantly affect the fuel consumption by vessels, serving the given liner shipping route. Wang and Meng (2012a) proposed a mathematical model for the vessel scheduling problem, taking into account the uncertainty associated with port handling and sailing times. The objective minimized the total route service cost, and the problem was solved using a cutting-plane based algorithm. Computational experiments indicated that the liner shipping company might have to add more vessels for service of the given liner shipping route due to the uncertainty in port and sailing times.

Wang and Meng (2012c) studied the vessel scheduling problem, where the port waiting, and container handling times were subject to uncertainty. The objective of the proposed model minimized the total route service cost. The sample average approximation method was used to solve the problem. It was found that the reliability of vessel schedules could be enhanced by assigning more vessels for service of the given liner shipping route. Song et al. (2015) applied an Evolutionary Algorithm to solve the vessel scheduling problem, where the port handling times were not known with certainty. A total of three objectives were minimized, including: (a) the annual total vessel operational costs (sum of the fuel consumption and chartering costs); (b) the average schedule unreliability (i.e., probability of late vessel arrivals at ports); and (c) the annual total carbon dioxide emissions. Numerical experiments showed that emissions could be decreased either with reduction in the total vessel operational costs or with reduction in the average schedule unreliability.

Collaborative agreements. Another group of vessel scheduling studies explored various collaborative agreements between marine container terminal operators and liner shipping companies. Wang et al. (2014) proposed a mathematical model for the vessel scheduling problem, where the vessel service TWs were negotiated between marine container terminal operators and the liner shipping company. The objective aimed to minimize the total route service cost. The problem was linearized, and an iterative optimization algorithm was used to solve it. Computational experiments indicated that duration of TWs could affect the total route service cost. Moreover, the liner shipping company was required to reduce the transit time for high value cargoes. Alhrabi et al. (2015) applied a similar collaborative mechanism between marine container terminal operators and the liner shipping company. Numerical experiments demonstrated that the number of vessels, required for service of the given liner shipping route, vessel sailing speed, and the total route service cost could be affected with availability of multiple service TWs.

Dulebenets (2015b) focused on the vessel scheduling problem, where the liner shipping company could negotiate container handling rates with marine container terminal operators. The objective aimed to minimize the total route service cost. The original problem was linearized, and CPLEX was applied to solve it. Results from computational experiments indicated that the proposed collaborative agreement could improve efficiency of the liner shipping operations and provide the route service cost savings.

Vessel schedule recovery. Several studies focused on modeling disruptive events in liner shipping scheduling operations. Brouer et al. (2013) proposed a mathematical formulation for the vessel schedule recovery problem and considered the following types of disruptive events: (1) inclement weather; (2) port closure; (3) berth prioritization; and (4) port congestion. The objective aimed to minimize the total route service cost. A number of countermeasures were modeled, including the following: (a) adjust the vessel speed; (b) omit a port; and (c) swap the order of ports. The generated problem instances were solved using CPLEX. The conducted computational experiments indicated that that total route service cost might be decreased by 58% from application of the proposed methodology. Li et al. (2015) focused on the schedule recovery problem for a single vessel in a liner shipping route, aiming to minimize the total route service cost. A set of dynamic programming algorithms were developed to solve the problem. Numerical experiments showed that a speeding could be an efficient mean for the schedule recovery if the delay was not too large. Port swapping and skipping were found to be efficient for the cases with major disruptions and significant delays.

Li et al. (2016) studied the vessel schedule recovery problem, minimizing the total route service cost, which included the expected fuel consumption cost, the vessel delay cost, and the cost of accelerated vessel handling. Two types of uncertainties were modeled: (a) regular uncertainties that include recurring probabilistic activities; and (b) disruptive events that include occasional or on-off events. The authors applied a dynamic programming approach to solve the problem. Results from numerical experiments demonstrated that the impact of a disruption could be efficiently mitigated by skipping the port, where the disruption occurred, for cases under terminal conditions without the earliest handling time constraints.

Green vessel scheduling. As underlined by Mansouri et al. (2015), only a limited number of vessel scheduling models accounted for the negative environmental externalities. Qi and Song (2012) primarily focused on modeling uncertainty in port times, but also underlined that the amount of emissions produced from vessels could be reduced by means of optimizing the vessel schedules. Kontovas (2014) formulated a mathematical model for the green vessel scheduling problem, aiming to minimize the total route service cost. A number of various emission modeling alternatives were discussed in that conceptual disclosure (e.g., total emissions as one of the objective components, total emission cost as one of the objective components, constraints are set on the total emissions produced, etc.). Dulebenets et al. (2015) presented a mathematical model for the green vessel scheduling, where additional constraints were imposed on the amount of emissions produced by vessels. The objective aimed to minimize the total route service cost. The original problem was linearized and solved using CPLEX.

Fagerholt and Psaraftis (2015) and Fagerholt et al. (2015) focused on vessel routing and sailing speed optimization at liner shipping routes with "Emission Control Areas" (ECAs), aiming to maximize the total profit and minimize the total fuel cost respectively. However, both studies did not explicitly capture the vessel service at ports of the liner shipping route. Dulebenets et al. (2016b) assessed the effects of introducing emission restrictions within ECAs on the design of vessel schedules. Two mixed integer nonlinear vessel scheduling models were proposed, where the first model captured the existing IMO regulations within ECAs, while the second one along with the IMO regulations-imposed limitations of the amount of emissions produced by vessels within ECAs. Both models aimed to minimize the total route service cost. A dynamic secant approximation procedure was applied to solve the models. Numerical experiments indicated that introduction of emission restrictions within ECAs could significantly affect the design of vessel schedules, increase the fuel consumption, operational, and inventory costs, but in the meantime would reduce the amount of emissions produced and improve the environmental sustainability.

Accordingly, what is needed is a practical application of a holistic multi-objective optimization model to improve vessel scheduling in liner shipping with conflicting objectives. However, in view of the art considered as a whole at the time the present invention was made, it was not obvious to those of ordinary skill in the field of this invention how the shortcomings of the prior art could be overcome.

While certain aspects of conventional technologies have been discussed to facilitate disclosure of the invention, Applicants in no way disclaim these technical aspects, and it is contemplated that the claimed invention may encompass one or more of the conventional technical aspects discussed herein.

The present disclosure may address one or more of the problems and deficiencies in the art discussed above. However, it is contemplated that this disclosure may prove useful in addressing other problems and deficiencies in many technical areas. Therefore, the present application should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

SUMMARY

This summary is provided to introduce a selection of concepts in a simplified form. These concepts are described in further detail in the detailed description of example embodiments of the disclosure below. This summary is not intended to identify key features or essential features of the claimed subject matter, nor is it intended to be used to limit the scope of the claimed subject matter.

Embodiments disclosed herein include methods of designing improved vessel schedules for liner shipping vessels owned by liner shipping companies, as well as related steps. For example, in accordance with one embodiment, providing a computer with a graphical user interface and a processor; retrieving at least one of an objective to improve vessel schedules, wherein the at least one of the objectives conflicts with at least one other second objective, and delivering these conflicting objectives to the computer; determining an optimal vessel schedule using a global multi-objective mixed integer nonlinear optimization model executed by the processor in the computer using the at least one of the objectives and delivering the optimal vessel schedule to the graphical user interface; wherein the practical application of the global multi-objective optimization model improves the design of the optimal vessel schedule; wherein the delivery of the optimal vessel schedule is automatically delivered the optimized vessel schedule to at least one vessel; wherein the delivery of the optimal vessel schedule automatically adjusts the at least one vessel's speed and course to implement the optimal vessel schedule; and wherein the improved optimal vessel schedule minimizes monetary losses to the liner shipping company. The automatic adjustment of speed a course maybe implemented prior to departure or by remote communication with the vessel as scheduling needs and environmental factors are updated. In one embodiment, the automatic adjustment is remotely pushed to the vessel and presented to the crew for acceptance wherein the course, speed and other control parameters of the ship's operation are automatically downloaded to the navigation system of the ship wherein manual input (and user-error) is avoided. In another embodiment, the ship's location (e.g., in open waters) permits the automatic update to course and speed to be implemented without crew acceptance or approval. In yet another embodiment, the ship is autonomous (lacking crew or an actively engaged "on-duty" crew) wherein the update to speed and course is implemented without any human engagement on the vessel. The communication link to the vessel may be satellite, radio or other appropriate means based on the location of the ship.

In additional embodiments, the method of designing improved vessel schedules for liner shipping vessels owned by a liner shipping company, wherein the at least one of the objectives to improve vessel schedules is a major cost component.

In additional embodiments, the method of designing improved vessel schedules for liner shipping vessels owned by a liner shipping company, wherein the at least one of the objectives is selected from a group of objectives consisting of: total vessel weekly operation cost; total container inventory cost; and total vessel late arrival cost.

In additional embodiments, the method of designing improved vessel schedules for liner shipping vessels owned by a liner shipping company, wherein the at least one other second objective is selected from a group of objectives consists of: total fuel consumption cost; total port handling cost; and total cost of carbon dioxide emissions produced at sea and in ports of call.

In additional embodiments, the method of designing improved vessel schedules for liner shipping vessels owned by a liner shipping company, wherein the at least one of the objectives are weighted differently than the at least one other second objectives.

In additional embodiments, the method of designing improved vessel schedules for liner shipping vessels owned by a liner shipping company, further comprising retrieving environmental variables which have effects on the optimal vessel schedule, and wherein the environmental variables are delivered to the processor in the computer which automatically adjusts the optimal vessel schedule based on the impact of the effect of the environmental variable.

In additional embodiments, the method of designing improved vessel schedules for liner shipping vessels owned by a liner shipping company, wherein the environmental variable is selected from the group consisting of: weather, crew efficiency, and fuel cost.

In additional embodiments, the method of designing improved vessel schedules for liner shipping vessels owned by a liner shipping company, wherein the improved optimal vessel schedule results in improved liner shipping company alliances with other liner shipping companies.

In further embodiments, one or more tangible non-transitory computer-readable media having computer-executable instructions for performing a method of running a software program on a computing device, the computing device operating under an operating system, the method including issuing instructions from the software program comprising steps including: retrieving at least one of an objective to improve vessel schedules, wherein the at least one of the objectives conflicts with at least one other second objective, and delivering these conflicting objectives to the computer; determining an optimal vessel schedule using a global multi-objective mixed integer nonlinear optimization model executed by the processor in the computer using the at least one of the objectives and delivering the optimal vessel schedule to the graphical user interface; wherein the practical application of the global multi-objective optimization model improves the design of the optimal vessel schedule; wherein the delivery of the optimal vessel schedule is automatically delivered the optimized vessel schedule to at least one vessel; wherein the delivery of the optimal vessel schedule automatically adjusts the at least one vessel's speed and course to implement the optimal vessel schedule; and wherein the improved optimal vessel schedule minimizes monetary losses to the liner shipping company.

In further embodiments, A system for optimizing vessel scheduling in liner shipping, where the considered objectives of the liner shipping company are conflicting in their nature, comprising: a computer with a graphical user interface and a processor; at least one of an objective to improve vessel schedules, wherein the at least one of the objectives conflicts with at least one other second objective, and delivering these conflicting objectives to the computer; an optimal vessel schedule determined using a global multi-objective mixed integer nonlinear optimization model executed by the processor in the computer using the at least one of the objectives and delivering the optimal vessel schedule to the graphical user interface; wherein the practical application of the global multi-objective optimization model improves the design of the optimal vessel schedule; wherein the delivery of the optimal vessel schedule is automatically delivered the optimized vessel schedule to at least one vessel; wherein the delivery of the optimal vessel schedule automatically adjusts the at least one vessel's speed and course to implement the optimal vessel schedule; and wherein the improved optimal vessel schedule minimizes monetary losses to the liner shipping company.

BRIEF DESCRIPTION OF THE DRAWINGS

While the specification concludes with claims particularly pointing out and distinctly claiming what are regarded as embodiments of the invention, the advantages of embodiments of the disclosure may be more readily ascertained from the description of certain examples of embodiments of the disclosure when read in conjunction with the accompanying drawings, in which:

DETAILED DESCRIPTION

Figure 1:
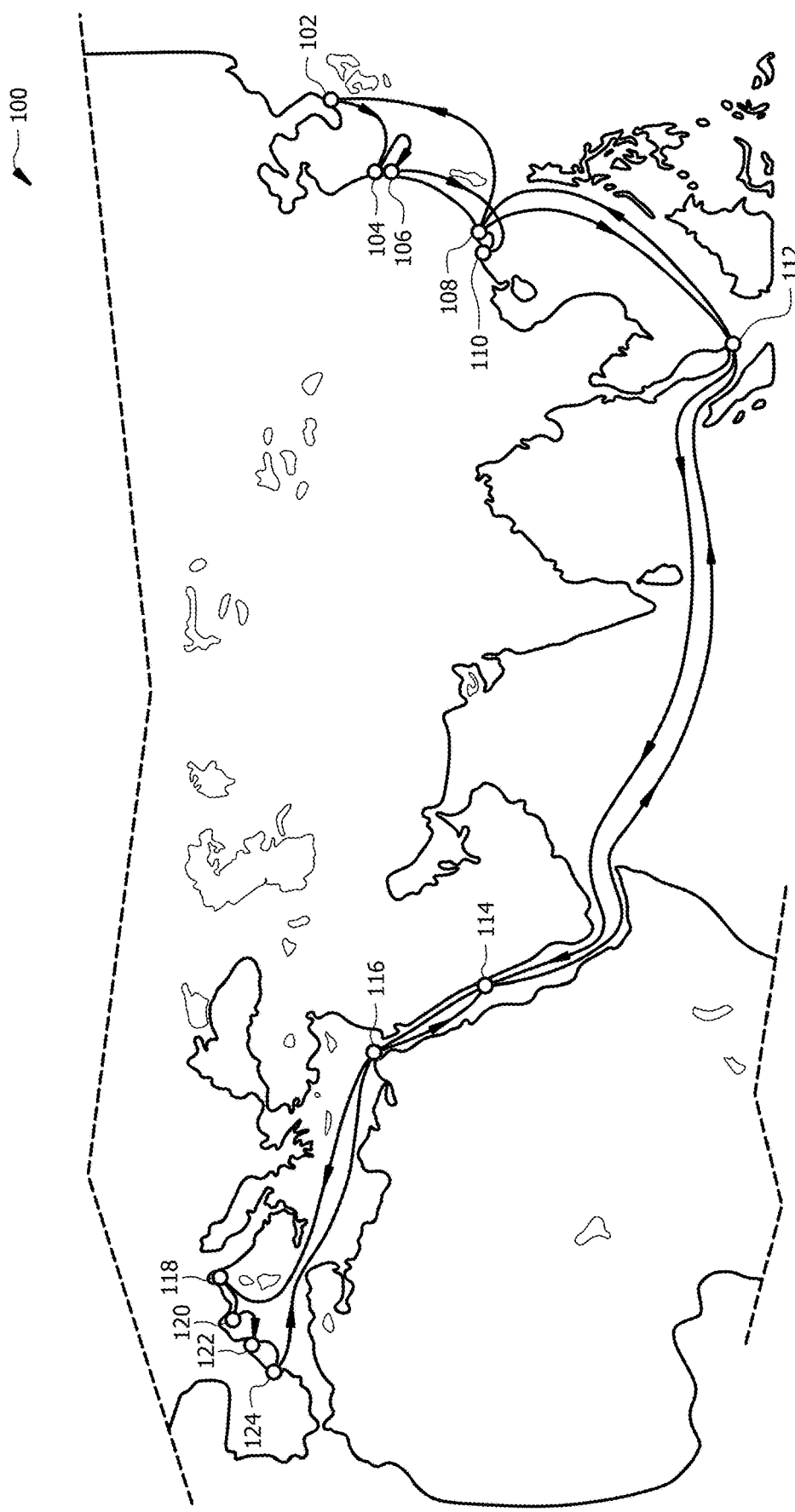
FIG. 1 depicts the Asia-Mediterranean Expressive Service (EUM) route.

In the following detailed description, reference is made to the accompanying drawings, which form a part thereof, and within which are shown by way of illustration specific embodiments by which the invention may be practiced. It is to be understood that other embodiments may be utilized, and structural changes may be made without departing from the scope of the present application. These embodiments are described in sufficient detail to enable those of ordinary skill in the art to practice the present disclosure, and it is to be understood that other embodiments may be utilized, and that structural, logical, and electrical changes may be made within the scope of the disclosure.

From the following descriptions, it should be understood that components of the embodiments as generally described and illustrated in the figures herein could be arranged and designed in a wide variety of different configurations. Thus, the following more detailed description of various embodiments, as represented in the figures, is not intended to limit the scope of the disclosure but is merely representative of various embodiments. While the various aspects of the embodiments are presented in drawings, the drawings are not necessarily drawn to scale unless specifically indicated.

The following description provides specific details, such as material types, compositions, material thicknesses, and processing conditions in order to provide a thorough description of embodiments of the disclosure. However, a person of ordinary skill in the art will understand that the embodiments of the disclosure may be practiced without employing these specific details. Indeed, the embodiments of the disclosure may be practiced in conjunction with conventional techniques employed in the industry. Only those process acts and structures necessary to understand the embodiments of the disclosure are described in detail below. A person of ordinary skill in the art will understand that some process components are inherently disclosed herein and that adding various conventional process components and acts would be in accord with the disclosure. In this description, specific implementations are shown and described only as examples and should not be construed as the only way to implement the present disclosure unless specified otherwise herein.

Illustrations presented herein are not meant to be actual views of any particular material, component, or system, but are merely idealized representations that are employed to describe embodiments of the disclosure. Referring in general to the following description and accompanying drawings, various embodiments of the present disclosure are illustrated to show its structure and method of operation. Common elements of the illustrated embodiments may be designated with similar reference numerals. It should be understood that the figures presented are not meant to be illustrative of actual views of any particular portion of the actual structure or method but are merely idealized representations employed to more clearly and fully depict the present invention defined by the claims below.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements.

Any headings used herein should not be considered to limit the scope of embodiments of the invention as defined by the claims below and their legal equivalents. Concepts described in any specific heading are generally applicable in other sections throughout the entire specification.

As used in this specification and the appended claims, the singular forms "a," "an," and "the" include plural referents unless the content clearly dictates otherwise. As used in this specification and the appended claims, the term "or" is generally employed in its sense including "and/or" unless the context clearly dictates otherwise.

As used herein, "about" means approximately or nearly and in the context of a numerical value or range set forth means±15% of the numerical. In an embodiment, the term "about" can include traditional rounding according to significant figures of the numerical value. In addition, the phrase "about 'x' to 'y'" includes "about 'x' to about 'y'".

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range.

The phrases "connected to" and "coupled to" refer to any form of interaction between two or more entities, including mechanical, electrical, magnetic, electromagnetic, fluid, and thermal interaction. Two components may be connected or coupled to each other even though they are not in direct contact with each other. For example, two components may be coupled to each other through an intermediate component.

The directional terms "proximal" and "distal" are used herein to refer to opposite locations on a device. The proximal end of the device is defined as the end of the device closest to the user when the device is in use. The distal end is the end opposite the proximal end, along the longitudinal direction of the device, or the end furthest from the user.

The use of "including," "comprising," or "having," "containing," "involving," and variations thereof herein, is meant to encompass the items listed thereafter and equivalents thereof as well as any additional items a person of ordinary skill in the art would reasonably understand to be included.

Referring in general to the following description and accompanying drawings, various embodiments of the present disclosure are illustrated to show its structure and method of operation. Common elements of the illustrated embodiments may be designated with similar reference numerals. Accordingly, the relevant descriptions of such features apply equally to the features and related components among all the drawings. Any suitable combination of the features, and variations of the same, described with components illustrated in FIG. 1, can be employed with the components of FIG. 2, and vice versa. This pattern of disclosure applies equally to further embodiments depicted in subsequent figures and described hereinafter. It should be understood that the figures presented are not meant to be illustrative of actual views of any particular portion of the actual structure or method but are merely idealized representations employed to more clearly and fully depict the present invention defined by the claims below.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

In an embodiment, the claimed subject matter is a practical application of a multi-objective optimization model to assist liner shipping companies with the design of improved cost-effective vessel schedules and the analysis of important tradeoffs between the conflicting objectives (e.g., how many more vessels should be deployed at the given liner shipping route to provide the agreed service frequency at ports of call if the average vessel sailing speed is reduced by 5 knots [in order to decrease the fuel consumption and $CO_2$ emissions produced by vessels]; will the number of vessels required for service of the given liner shipping route decrease if the liner shipping company starts requesting handling rates of 150 TEUs/hour instead of 125 TEUs/hour at ports of call; and others). Without efficient vessel schedules the liner shipping companies incur significant monetary losses (e.g., Hanjin liner shipping company filed for bankruptcy in 2016). Furthermore, without loss of generality, the multi-objective optimization model can be used by liner shipping companies for the design of vessel schedules with the minimum total route service cost (by combining the conflicting objectives into one objective function). Therefore, the multi-objective optimization model can serve as a practical application of an effective decision support tool and improve liner shipping operations.

In an embodiment, the current invention is a holistic multi-objective optimization model for vessel scheduling problems. The model accounts for all major cost components, which have been reported in the vessel scheduling literature to date and separates them in two conflicting groups. The first group aims to minimize the total route service cost components, which generally increase with the total vessel turnaround time, including the following: (a) total vessel weekly operational cost; (b) total container inventory cost; and (c) total vessel late arrival cost. The second group aims to minimize the total route service cost components, which generally decrease with the total vessel turnaround time, including the following: (a) total fuel consumption cost; (b) total port handling cost; and (c) total cost of $CO_2$ emissions produced in sea and at ports of call.

In certain embodiments, the current invention is a practical application of a multi-objective mixed integer nonlinear mathematical model, which accounts for all major route serve cost components, revealed in the published to date literature, and separates them in two conflicting groups. Considering an increasing attention of the community to the environmental concerns (Mansouri et al., 2015), this disclosure also models the carbon dioxide emissions produced by vessels throughout the voyage and by handling equipment at ports of call. The latter pollutant is classified as a primary greenhouse gas, which causes global warming (EPA, 2017). Furthermore, a more comprehensive collaborative agreement between the liner shipping company and marine container terminal operators is discussed and evaluated, where both vessel service time windows and handling rates are negotiated at each port of call (while in the published to date vessel scheduling literature either vessel service time windows or handling rates are negotiated). A vessel sailing speed reciprocal is discretized to linearize the original mathematical formulation. This disclosure discusses a Global Multi-Objective Optimization Algorithm (GMOA), which can also be referred to as a global multi-objective optimization model, which is based on the ε-constraint method, to solve the multi-objective vessel scheduling problem. A set of numerical experiments are conducted for the Asia-Mediterranean Express Service liner shipping route, served by Orient Overseas Container Line (OOCL), American President Lines (APL), and Hyundai Merchant Marine (HMM) liner shipping companies as of January 2017, to evaluate the solution methodology and demonstrate how the multi-objective model can be used to draw important managerial insights.

It is an object of the current invention to provide a practical application of a multi-objective mathematical model and global multi-objective optimization algorithm that assist liner shipping companies with improved design of the optimal vessel schedules and realization of important tradeoffs between the conflicting route service cost components. In certain embodiments, the current invention—including the following non-limiting example—provides additional objectives as follows:

1) This disclosure extends the work, conducted by Song et al. (2015), and discusses a comprehensive multi-objective optimization model for the vessel scheduling problem, which accounts for the major route service cost components reported in the literature (i.e., total vessel weekly operational cost, total fuel consumption cost, total port handling cost, total service time window (TW) violation cost, and total container inventory cost);

2) Unlike Song et al. (2015), the current model captures not only the carbon dioxide ($CO_2$) emissions produced by vessels throughout the voyage, but also the $CO_2$ emissions produced at ports of call due to container handling;

3) This disclosure extends the collaborative agreements between liner shipping companies and marine container terminal operators, which have been used in the liner shipping literature (Wang et al., 2014; Dulebenets, 2015b; Alhrabi et al., 2015; Dulebenets and Ozguven, 2017). Specifically, a more comprehensive type of collaborative agreement between the liner shipping company and marine container terminal operators is evaluated, where the liner shipping company negotiates both vessel service TWs and handling rates with marine container terminal operators (while in the published to date vessel scheduling literature either vessel service TWs or handling rates are generally negotiated between the liner shipping company and marine container terminal operators). A new form of collaborative agreement would allow improving both liner shipping and marine container terminal operations (American Shipper, 2015; World Shipping Council, 2015);

4) Unlike Song et al. (2015), who applied the Evolutionary Algorithm for the multi-objective vessel scheduling problem that does not guarantee optimality of the vessel schedules belonging to a Pareto frontier, this disclosure presents a Global Multi-Objective Optimization Algorithm (GMOA) that guarantees optimality of the vessel schedules belonging to a Pareto frontier.

An embodiment of the claimed subject matter is a practical application of the GMOA to enhance and improve liner shipping companies design of optimal vessel schedules. In some embodiments the improved optimal vessel schedule is automatically transmitted to at least one of a plurality of vessels in the liner shipping company's feet to set the speed, course, and other parameters described below to implement the optimal vessel schedule. This will increase the efficiency and profitability variables described in greater detail in the examples. In some embodiments the output from the automatic implementation of the GMOA to improve the design of the optimal vessel schedule is directed to a graphical user interface, with specific functionality improved by the application of the GMOA. In these embodiments it is the unconventional use of often conflicting objectives that provides the improved design of the optimal vessel schedules.

Example 1

The following non-limiting example discusses a liner shipping route to be analyzed and presents the main modeling assumptions.

A detailed analysis of the vessel scheduling literature is presented in Example 2. It was found that more than 50% of studies accounted for the total vessel weekly operational, total fuel consumption, total port handling, and total service TW violation costs. Approximately 26% of studies considered the total inventory cost, associated with transportation of containers. Only a few studies focused on minimization of the total vessel emission cost (≈9%). Several studies accounted for certain miscellaneous cost components including the following: (a) cost associated with delayed or misconnected cargo (Brouer et al., 2013); (b) cost associated with new environmental regulations (Kontovas, 2014); (c) waiting time cost at ports of call (Dulebenets, 2015b); (d) cost of accelerated vessel handling (Li et al., 2015b); (e) chartering cost (Song et al., 2015); and (f) decay cost of perishable products (Dulebenets and Ozguven, 2017).

Some of the route service cost components are conflicting in their nature. For example, in order to reduce the total fuel consumption cost, the liner shipping company has to reduce the fuel consumption of vessels by decreasing their sailing speed, which will further increase the total vessel turnaround time and, hence, will increase the number of vessels required to provide the agreed service frequency at ports and associated vessel weekly operational costs. However, the conducted literature review indicates that only Song et al. (2015) proposed a multi-objective model for the vessel scheduling problem, while the rest of vessel scheduling studies combined the considered cost components into one objective, minimizing the total vessel route service cost. The latter approach, which is similar to the weighted method in multi-objective optimization, does not allow capturing the conflicting nature of certain route service cost components and further imposes limitations for liner shipping companies in the analysis of important tradeoffs.

As will be shown herein, numerical experiments demonstrate that the current methodology is capable of assisting liner shipping companies with the design of cost-effective vessel schedules and analysis of important tradeoffs between the conflicting objectives.

Liner Shipping Route Description

Figure 2:
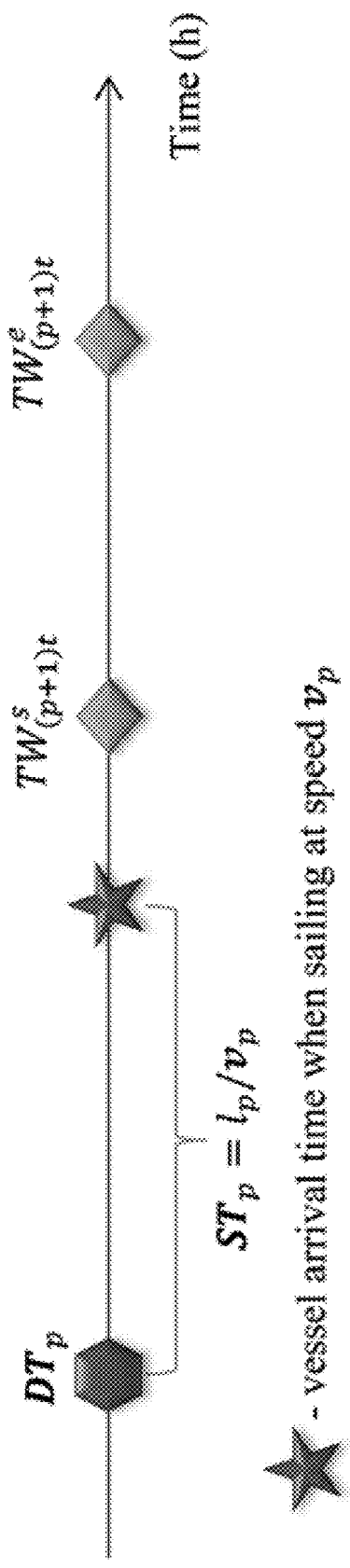
FIG. 2 depicts estimation of the vessel waiting time at ports.
Figure 2:
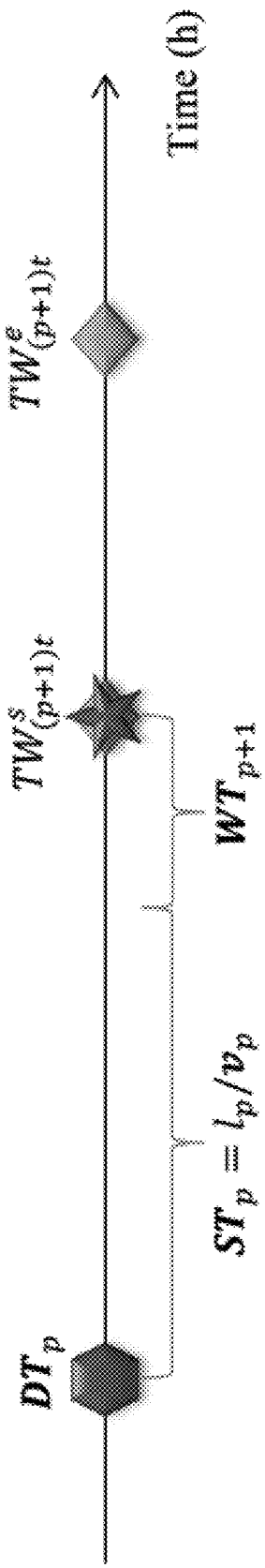

This disclosure focuses on vessel scheduling at the Asia-Mediterranean Express Service (EUM) route, served by the G6 alliance and illustrated in FIG. 1 (OOCL, 2017). The EUM route 100 runs from cities: Pusan 102, Shanghai 104, Ningbo 106, Hong Kong 108, Shekou 110, Singapore 112, Jeddah 114, Port Said 116, Genoa 118, Fos 120, Barcelona 122, and Valencia 124. As of January 2017, vessels from the following liner shipping companies were deployed for service of the EUM liner shipping route: 1) Orient Overseas Container Line (OOCL); 2) American President Lines (APL); and 3) Hyundai Merchant Marine (HMM). The EUM route connects Mediterranean, Africa, Red Sea, and Asia. The port rotation (i.e., sequence of ports to be visited) for the EUM route includes 17 ports call. The port rotation details are provided in Table 1, including the following information: (1) port name; (2) port country; and (3) distance to the next port of call (retrieved from the world seaport catalogue: Ports.com, 2017).

TABLE 1

The port rotation details.

| a/a | Port Name | Country | Distance to the Next Port (nmi) |
|---|---|---|---|
| [1] | Pusan | South Korea | 535 |
| [2] | Shanghai | China | 87 |
| [3] | Ningbo | China | 915 |
| [4] | Shekou | China | 18 |
| [5] | Hong Kong | China | 1,460 |
| [6] | Singapore | Singapore | 4,685 |
| [7] | Jeddah | Saudi Arabia | 760 |
| [8] | Port Said | Egypt | 1,842 |
| [9] | Genoa | Italy | 51 |
| [10] | La Spezia | Italy | 228 |
| [11] | Fos | France | 185 |
| [12] | Barcelona | Spain | 164 |
| [13] | Valencia | Spain | 1,973 |
| [14] | Port Said | Egypt | 760 |
| [15] | Jeddah | Saudi Arabia | 4,685 |
| [16] | Singapore | Singapore | 1,460 |
| [17] | Hong Kong | China | 1,140 |
| [1] | Pusan | South Korea | N/A |

Service of Vessels at Ports: A Collaborative Agreement

Liner shipping companies of the G6 alliance provide a weekly service at ports of the EUM liner shipping route. Let $P=\{1, \ldots, n\}$ be a set of ports to be visited. It is assumed that the G6 alliance has a collaborative agreement with each marine container terminal operator, according to which: (1) a marine container terminal operator offers a set of service TWs $T_p=\{1, \ldots, m_p\}$, $p \in P$ to the G6 alliance at each port of call; and (2) for each TW the G6 alliance is able to select one handling rate from a set of available handling rates $H_{pt}=\{1, \ldots k_{pt}\}$, $p \in P$, $t \in T_p$.

A vessel should arrive at port p within negotiated service TW t [$TW_{pt}^s$—the start of TW t at port p; $TW_{pt}^e$—the end of TW t at port p]. Duration of a given service TW may vary from one port to another, but generally does not exceed three days (OOCL, 2017). Once a vessel arrives at the port, it is towed by push boats to the assigned berth, where quay cranes start (un)loading containers. If a vessel arrives before the start of TW at port p, it will be waiting for service at a dedicated area, located in the vicinity of port p (details regarding the vessel waiting time estimation will be further discussed as this specification continues). It is assumed that an additional penalty will be imposed to liner shipping companies of the G6 alliance for the vessel arrival after the end of TW at port p. The total vessel late arrival cost for the given liner shipping route can be calculated using the following equation:

$$TLC = \sum_{p \in P} c_p^{LT} LT_p \quad (1)$$

where:
TLC—total vessel late arrival cost (USD);
$c_p^{LT}$—vessel late arrival cost at port p (USD/h);
$LT_p$—vessel late arrival hours at port p (h).

Along with the TW selection, the G6 alliance negotiates a handling rate with each marine container terminal operator. Each handling rate has a corresponding handling productivity $hp_{pth}$, $p \in P$, $t \in T_p$, $h \in H_{pt}$, which is measured in TEUs/h. Note that handling productivities may vary from port to port depending on the amount of handling equipment available and the TW requested by the G6 alliance (e.g., during high demand periods the marine container terminal operator will have less handling equipment available). The latter aspect is captured by indexes p and t in parameter $hp_{pth}$. The handling time at port p under handling rate h during TW t is estimated as $$HT_{pth} = \frac{NC_p^{PORT}}{hp_{pth}} \forall p \in P, t \in T_p, h \in H_{pt}(h),$$

where $NC_p^{PORT}$—is the number of containers to be handled at port p (TEUs). The vessel handling cost $c_{pth}^{PC}$, $p \in P$, $t \in T_p$, $h \in H_{pt}$ (USD) is assumed to vary depending on the port of call, TW, and handling rate requested. For instance, one port may have a higher handling cost for a handling rate with the same handling productivity as compared to the other ports of call (captured by index p in parameter $c_{pth}^{PC}$). During TWs with high demand periods marine container terminal operators may impose higher vessel handling costs due to equipment availability (captured by index t in parameter $c_{pth}^{PC}$). Furthermore, higher vessel handling costs are assumed to be imposed for handling rates with higher handling productivities (captured by index h in parameter $c_{pth}^{PC}$). The total port handling cost for the given liner shipping route can be computed using the following equation:

$$TPC = \sum_{p \in P} \sum_{t \in T_p} \sum_{h \in H_{pt}} c_{pth}^{PC} x_{pth} \quad (2)$$

where:
TPC—total port handling cost (USD);
$x_{pth}$—vessel handling rate decision variable (=1 if handling rate h is selected at port p during TW t and =0 otherwise).

Fuel Consumption

This disclosure assumes that a given liner shipping route is served with a string of "homogeneous" vessels, which have similar technical characteristics. The latter assumption has been also observed in practice: as of January 2017, liner shipping companies of the G6 alliance deployed vessels with a capacity of 11,000-13,000 TEUs for service of the EUM liner shipping route (OOCL, 2017). Moreover, the assumption regarding homogeneous nature of the vessel fleet is widely used in the published to date vessel scheduling studies (Wang and Meng, 2012a-c; Wang et al., 2013a; Wang et al., 2014; Dulebenets, 2015a-b). The fuel consumption increases with the vessel sailing speed (Du et al., 2011; Wang and Meng, 2012b; Psaraftis and Kontovas, 2013). Along with sailing speed, there are the other factors, which may affect the fuel consumption of a given vessel (e.g., vessel load). However, as underlined by Wang and Meng (2012b), the fuel consumption of a vessel is primarily affected with its sailing speed. Based on the available literature, the following relationship is adopted for estimating the vessel fuel consumption (Du et al., 2011; Wang and Meng, 2012b):

$$DFC(\bar{v}) = DFC(v^*)\left(\frac{\bar{v}}{v^*}\right)^\alpha = \gamma(\bar{v})^\alpha \tag{3}$$

where:
DFC($\bar{v}$)—average daily vessel fuel consumption (tons of fuel/day);
$\bar{v}$—average daily vessel sailing speed (knots);
DFC($v^*$)—average daily vessel fuel consumption when sailing at the designed speed (tons of fuel per day);
$v^*$—design vessel sailing speed (knots);
$\alpha$, $\gamma$—coefficients of the fuel consumption function.

The fuel consumption per nautical mile $FC_p$ at voyage leg p and the total fuel consumption cost for the given liner shipping route can be computed using the following equations:

$$FC_p = DFC(v_p)\left(\frac{ST_p}{24}\right)\frac{1}{l_p} = \gamma(v_p)^\alpha \frac{l_p}{24v_p} \frac{1}{l_p} = \frac{\gamma(v_p)^{\alpha-1}}{24} \forall\, p \in P \tag{4}$$

$$TFC = c^{FC}\sum_{p\in P} l_p FC_p \tag{5}$$

where:
$v_p$—vessel sailing speed at voyage leg p, which connects ports p and p+1 (knots);
$l_p$—length of voyage leg p (nmi);
$ST_p$—sailing time between consecutive ports p and p+1 (h);
TFC—total fuel consumption cost (USD);
$c^{FC}$—unit fuel cost (USD/ton).

Once a sailing speed is chosen at a given voyage leg of the liner shipping route, it is assumed to remain constant. The uncertainty in sailing time between consecutive ports of call, which can be caused by various factors (including severe weather, changes in the vessel schedule, experience of the vessel crew, etc.), is not modeled in this disclosure but have effects on sailing time that are understood by a person of ordinary skill in the art. Since the fuel consumption by auxiliary engines typically does not change significantly throughout the vessel voyage, the associated fuel consumption cost by auxiliary engines will be included in the vessel weekly operational cost (along with the vessel maintenance cost, insurance cost, vessel crew cost, etc.).

Port Service Frequency

Let Q be the number of vessels required for service of the EUM liner shipping route (note that Q∈N) and $WT_p$ be the vessel waiting time at port p (measured in hours). In order to guarantee the weekly service frequency at ports of the given liner shipping route, the following relationship must be maintained (Wang et al., 2014; Alhrabi et al., 2015; Dulebenets and Ozguven, 2017):

$$168Q = \sum_{p\in P} ST_p + \sum_{p\in P}\sum_{t\in T_p}\sum_{h\in H_{pt}} (HT_{pth} x_{pth}) + \sum_{p\in P} WT_p \tag{6}$$

The left-hand side of equation (6) is a product of the required number of vessels and a numerical value "168", which denotes the total amount of hours in a week. The right-hand side of equation (6) represents the total turnaround time of vessels (i.e., the time required by a given vessel to visit all ports of the given liner shipping route and return to the first port), which is composed of the following components: (a) total vessel sailing time; (b) total port handling time; and (c) total vessel waiting time at ports of call. The total number of vessels necessary to ensure the weekly service frequency at ports of call can be further estimated by dividing the total vessel turnaround time by "168". Decreasing total vessel turnaround time (e.g., due to decrease in the vessel sailing time from choosing higher vessel sailing speeds at voyage legs of the liner shipping route) will allow the G6 alliance to deploy less vessels for service of the EUM liner shipping route. The total vessel weekly operational cost for the given liner shipping route can be calculated using the following equation:

$$TOC = c^{OC} Q \tag{7}$$

where:
TOC—total vessel weekly operational cost (USD);
$c^{OC}$—vessel weekly operational cost (USD/week).

Waiting Time at Ports of Call

In certain cases, the vessel may be scheduled to arrive at the consecutive port of call before the beginning of the negotiated service TW even when sailing at the lowest possible speed ($v^{min}$, knots). For example, in FIG. 2A the vessel, leaving port p at time $DT_p$ (where $DT_p$—is the vessel departure time from port p, h), arrives at port p+1 before the start of negotiated TW t when sailing at the lowest possible speed $v_p = v^{min}$: $DT_p + ST_p < TW_{(p+1)t}^s$. This disclosure assumes that the vessel service cannot begin before the start of the negotiated TW, and in case of an early arrival at port p+1 the vessel will be required to wait at a dedicated area of port p+1 (FIG. 2B).

Let $z_{pt}$ be the service TW decision variable (=1 if TW t is selected at port p and =0 otherwise). The vessel waiting time at each port, except the first port of the liner shipping route, can be estimated based on the vessel arrival time at port p ($AT_p$, h), vessel handling time at port p, vessel sailing time between consecutive ports p and p+1, and the start of TW t at port p+1 using the following relationship:

$$WT_{(p+1)} \geq \sum_{t\in T_p} TW_{(p+1)t}^s z_{(p+1)t} - AT_p - \tag{8}$$

$$\sum_{t\in T_p}\sum_{h\in H_{pt}} (HT_{pth} x_{pth}) - ST_p \forall\, p \in P,\ p < |P|$$

The vessel waiting time at the first port of the liner shipping route, can be computed based on the vessel arrival time at the last port of the liner shipping route, vessel handling time at the last port, vessel sailing time between the last and the first ports of the liner shipping route, the start of TW t at the first port, and the total vessel turnaround time at the given liner shipping route using the following relationship:

$$WT_1 \geq \sum_{t\in T_p} TW_{1t}^s z_{1t} - AT_p - \tag{9}$$

-continued $$\sum_{t \in T_p} \sum_{h \in H_{pt}} (HT_{pth}x_{pth}) - ST_p + 168Q \forall\ p \in P,\ p = |P|$$

The total vessel turnaround time (168Q) is required in equation (9) to capture a round trip journey of the first vessel in the fleet. Specifically, the last vessel in the fleet, used for service of the given liner shipping route, will arrive at the first port at time $AT_1$. In the meantime, the first vessel in the fleet, leaving the last port of the given liner shipping route, will return to the first port after a round trip journey at time $AT_1+168Q$. An example of how the vessel schedules are designed in this disclosure is presented in Example 3.

Container Inventory Cost

Throughout the design of vessel schedules, liner shipping companies of the G6 alliance should account for the inventory costs, associated with transportation of containers along all voyage legs of the given liner shipping route. Based on the available literature (Wang et al., 2014; Dulebenets and Ozguven, 2017), the total container inventory cost is assumed to be proportional to the total container transit time between ports of call, and can be estimated using the following equation:

$$TIC = c^{IC} \sum_{p \in P} ST_p NC_p^{SEA} \qquad (10)$$

where:
TIC—total container inventory cost (USD);
$c^{IC}$—unit container inventory cost (USD per TEU per h);
$NC_p^{SEA}$ number of containers transported by vessels at voyage leg p (TEUs).

Note that this disclosure does not account for the container inventory cost at ports, as generally the total vessel sailing time is significantly larger as compared to the total vessel port time (which is a summation of the total vessel waiting time and the total vessel handling time). Furthermore, loading and unloading of containers at ports reduce the number of containers that stay on vessels, which further decreases the container inventory cost at ports.

Carbon Dioxide ($CO_2$) Emission Modeling

As mentioned previously, this disclosure models the $CO_2$ emissions, produced by vessels throughout the voyage between consecutive ports and by container handling equipment throughout the vessel service at ports. This disclosure adopts the methodology, proposed by the International Maritime Organization (IMO), for modeling the $CO_2$ emissions that are produced in sea. Specifically, the total amount of $CO_2$ emissions at a given voyage leg is assumed to be proportional to the total fuel consumption at that voyage leg and the associated $CO_2$ emission factor in sea $EF^{SEA}$, measured in tons of $CO_2$ per ton of fuel (Psaraftis and Kontovas, 2013; IMO, 2014; Kontovas, 2014). Therefore, the total amount of $CO_2$ emissions at voyage leg p ($CO_{2_p}^{SEA}$, tons) can be computed using the following relationship:

$$CO_{2_p}^{SEA} = EF^{SEA} FC_p l_p \forall p \in P \qquad (11)$$

The total amount of $CO_2$ emissions, produced by vessels in sea, is proportional to the fuel consumption, and technically can be combined with the fuel consumption. However, in this disclosure the $CO_2$ emissions in sea and the fuel consumption are treated as separate terms to showcase the actual amount of the $CO_2$ emissions that are produced by vessels in sea throughout the transportation process.

The total amount of $CO_2$ emissions at a given port of call is assumed to be proportional to the total container demand at that port of call and the associated $CO_2$ emission factor at ports $EF_{pth}^{PORT}$, $p \in P\ t \in T_p$, $h \in H_{pt}$, measured in tons of $CO_2$ per TEU handled (Tran et al., 2016). Since the type of container handling equipment used by marine container terminal operators may vary from one port to another, the amount of $CO_2$ emissions produced may differ for the same container handling productivity. The latter operational aspect is captured by index p in parameter $EF_p^{PORT}$. Furthermore, the container handling equipment availability may vary from one TW to another at a given marine container terminal, which is captured by index t in parameter $EF_{pth}^{PORT}$. In the meantime, selection of a handling rate with a higher productivity will require the marine container terminal operator to deploy more container handling equipment for the vessel service, which shall further increase the amount of $CO_2$ emissions produced. The latter operational aspect is captured by index h in parameter $EF_{ph}^{PORT}$. The total amount of $CO_2$ emissions at port p ($CO_{2_p}^{PORT}$, tons) can be calculated using the following relationship:

$$CO_{2_p}^{PORT} = NC_p^{PORT} \sum_{t \in T_p} \sum_{h \in H_{pt}} (EF_{pth}^{PORT} x_{pth}) \forall\ p \in P \qquad (12)$$

The total cost of $CO_2$ emissions produced in sea and at ports of call for the given liner shipping route can be computed using the following equation:

$$TEC = c^{CO_2} \left( \sum_{p \in P} CO_{2_p}^{SEA} + \sum_{p \in P} CO_{2_p}^{PORT} \right) \qquad (13)$$

where:
TEC—total $CO_2$ emission cost (USD);
$c^{CO_2}$—unit $CO_2$ emission cost (USD/ton of $CO_2$).

Note that the $CO_2$ emissions produced by auxiliary vessel engines in sea and at ports of call of the given liner shipping route are not modeled in this disclosure, as they do not fluctuate significantly throughout the vessel voyage (similar to the fuel consumption by auxiliary vessel engines, as indicated previously).

Implementation and Determination of Vessel Schedule with Conflicting Objectives

As discussed previously, the following total route service cost components will be considered in the design of vessel schedules: 1) total vessel weekly operational cost (TOC); 2) total container inventory cost (TIC); 3) total vessel late arrival cost (TLC); 4) total fuel consumption cost (TFC); 5) total port handling cost (TPC); and 6) total cost due to $CO_2$ emissions produced in sea and at ports (TEC). Liner shipping companies of the G6 alliance must take into account a number of important factors in order to design a cost-effective vessel schedule for the EUM liner shipping route. Selection of low vessel sailing speeds at voyage legs of the liner shipping route will allow reducing the fuel consumption and $CO_2$ emissions in sea. However, decreasing vessel sailing speed would increase the total transit time of containers and will incur additional container inventory costs. Furthermore, an increasing container transit time will increase the total turnaround time of vessels, serving the EUM liner shipping route. The latter would require the G6 alliance to deploy more vessels at the given liner shipping route in order to ensure the agreed weekly service frequency at each port of call, which will incur an increasing vessel weekly operational cost. Decrease in the vessel sailing speed may also result in late vessel arrivals at ports of call. Selection of handling rates with higher handling productivities at ports of call will allow reducing the port handling times and the total turnaround time at the given liner shipping route, but will incur an increasing port handling cost and will increase the amount of $CO_2$ emissions produced at ports. Considering the aforementioned tradeoffs, the total route service cost components can be divided in two conflicting groups:

a) Group 1: the total route service cost components that generally increase with increasing total turnaround time—TOC, TIC, and TLC. The sum of all the total route service cost components, which generally increase with increasing total vessel turnaround time, will be denoted as $F_1 = F_1(Q, ST_p, LT_p)$.

b) Group 2: the total route service cost components that generally decrease with increasing total turnaround time—TFC, TPC, and TEC. The sum of all the total route service cost components, which generally decrease with increasing total vessel turnaround time, will be denoted as $F_2 = F_2 (FC_p, x_{pth}, CO_2{}_p^{SEA}, CO_2{}_p^{PORT})$.

Along with realizing tradeoffs between the total route service cost components, liner shipping companies of the G6 alliance must consider certain operational constraints. Specifically, the vessel sailing speed at each voyage leg should be selected, taking into account the established lower and upper bounds on the vessel sailing speed. While the sailing speed lower bound ($v^{min}$, knots) is generally posed to reduce potential wear of the vessel's engine (Wang et al., 2013a), the sailing speed upper bound ($v^{max}$, knots) is restricted by capacity of the vessel's engine (Psaraftis and Kontovas, 2013). In the meantime, the G6 alliance should consider the limit on the number of vessels ($Q \le Q^{max}$), allocated for service of the given liner shipping route. The proposed collaborative agreement, when the G6 alliance negotiates both vessel service TWs and handling rates with each marine container terminal operator, is expected to provide more flexibility for the G6 alliance in vessel sailing speed selection between consecutive ports of call of the port rotation and improve the fuel consumption management. For example, requesting a handling rate with a higher productivity at the given port of call will reduce the vessel handling time, and those time savings can be used to increase sailing time to the consecutive port of call by reducing the vessel sailing speed and produce less $CO_2$ emissions.

Mathematical Model

The following is the nomenclature and a mixed integer nonlinear mathematical model for the multi-objective vessel scheduling problem with multiple service TWs and handling rates (MOVSP).

| Sets | |
|---|---|
| $P = \{1, \ldots, n\}$ | set of ports to be visited |
| $T_p = \{1, \ldots, m_p\}$ | set of available TWs at port p |
| $H_{pt} = \{1, \ldots, k_{pt}\}$ | set of available handling rates at port p during TW t |
| Decision variables | |
| $v_p \in R^+ \: \forall p \in P$ | vessel sailing speed at voyage leg p, connecting ports p and p + 1 |
| $z_{pt} \in \{0, 1\} \: \forall p \in P, t \in T_p$ | =1 if TW t is selected at port p (=0 otherwise) |
| $x_{pth} \in \{0, 1\} \: \forall p \in P, t \in T_p, h \in H_{pt}$ | =1 if handling rate h is selected at port p during TW t (=0 otherwise) |
| Auxiliary variables | |
| $Q \in N$ | number of vessels required for service of the liner shipping route (vessels) |
| $AT_p \in R^+ \: \forall p \in P$ | vessel arrival time at port p (h) |
| $DT_p \in R^+ \: \forall p \in P$ | vessel departure time from port p (h) |
| $WT_p \in R^+ \: \forall p \in P$ | vessel waiting time at port p (h) |
| $ST_p \in R^+ \: \forall p \in P$ | vessel sailing time at voyage leg p, connecting ports p and p + 1 (h) |
| $FC_p \in R^+ \: \forall p \in P$ | fuel consumption at voyage leg p (tons of fuel/nmi) |
| $LT_p \in R^+ \: \forall p \in P$ | vessel late arrival hours at port p (h) |
| $CO_2{}_p^{SEA} \in R^+ \: \forall p \in P$ | the amount of $CO_2$ emissions produced at voyage leg p (tons) |
| $CO_2{}_p^{PORT} \in R^+ \: \forall p \in P$ | the amount of $CO_2$ emissions produced at port p (tons) |
| Parameters | |
| $n \in N$ | number of ports to be visited by vessels (ports) |
| $m_p \in N \: \forall p \in P$ | number of available TWs at port p (TWs) |
| $k_{pt} \in N \: \forall p \in P, t \in T_p$ | number of available handling rates at port p during TW t (rates) |
| $\alpha, \gamma$ | fuel consumption function coefficients |
| $c^{OC} \in R^+$ | vessel weekly operational cost (USD/week) |
| $c_p^{LT} \in R^+ \: \forall p \in P$ | late vessel arrival cost at port p (USD/h) |
| $c^{IC} \in R^+$ | unit container inventory cost (USD per TEU per h) |
| $c^{FC} \in R^+$ | unit fuel cost (USD/ton) |
| $C_{pth}^{PC} \in R^+ \: \forall p \in P, t \in T_p, h \in H_{pt}$ | handling cost at port p under handling rate h during TW t (USD) |
| $c^{CO_2}$ | unit $CO_2$ emission cost (USD/ton of $CO_2$) |
| $l_p \in R^+ \: \forall p \in P$ | length of voyage leg p (nmi) |
| $NC_p^{SEA} \in N \: \forall p \in P$ | number of containers transported at voyage leg p (TEUs) |
| $NC_p^{PORT} \in N \: \forall p \in P$ | number of containers handled at port p (TEUs) |
| $v^{min} \in R^+$ | minimum vessel sailing speed (knots) |
| $v^{max} \in R^+$ | maximum vessel sailing speed (knots) |
| $Q^{max} \in N$ | maximum number of vessels allocated for the liner shipping route (vessels) |
| $HT_{pth} \in R^+ \: \forall p \in P, t \in T_p, h \in H_{pt}$ | vessel handling time at port p under handling rate h during TW t (h) |
| $TW_{pt}^s \in R^+ \: \forall p \in P, t \in T_p$ | start of TW t at port p (h) |
| $TW_{pt}^e \in R^+ \: \forall p \in P, t \in T_p$ | end of TW t at port p (h) |

| | |
|---|---|
| $EF^{SEA} \in R^+$ | $CO_2$ emission factor in sea (tons of $CO_2$/ton of fuel) |
| $EF_{pth}^{PORT} \in R^+$ $\forall p \in P$, $t \in T_p$, $h \in H_{pt}$ | $CO_2$ emission factor at port p under handling rate h during TW t (tons of $CO_2$/TEU) |

MOVSP:

$$\min F_1 = \left[ c^{OC}Q + c^{IC}\sum_{p \in P} ST_p NC_p^{SEA} + \sum_{p \in P} c_p^{LT} LT_p \right] \quad (14)$$

$$\min F_2 = \left[ c^{FC}\sum_{p \in P} l_p FC_p + \sum_{p \in P}\sum_{t \in T_p}\sum_{h \in H_{pt}} c_{pth}^{PC} x_{pth} + c^{CO_2}\left(\sum_{p \in P} CO_{2_p}^{SEA} + \sum_{p \in P} CO_{2_p}^{PORT}\right) \right] \quad (15)$$

Subject to:

$$\sum_{t \in T_p} z_{pt} = 1 \; \forall \; p \in P \quad (16)$$

$$\sum_{t \in T_p}\sum_{h \in H_{pt}} x_{pth} = 1 \; \forall \; p \in P \quad (17)$$

$$x_{pth} \le z_{pt} \; \forall \; p \in P, t \in T_p, h \in H_{pt} \quad (18)$$

$$ST_p = \frac{l_p}{v_p} \; \forall \; p \in P \quad (19)$$

$$FC_p = \frac{\gamma(v_p)^{\alpha-1}}{24} \; \forall \; p \in P \quad (20)$$

$$WT_{(p+1)} \ge \sum_{t \in T_p} TW_{(p+1)t}^s z_{(p+1)t} - AT_p - \sum_{t \in T_p}\sum_{h \in H_{pt}}(HT_{pth} x_{pth}) - ST_p \; \forall \; p \in P, \; p < |P| \quad (21)$$

$$WT_1 \ge \sum_{t \in T_p} TW_{1t}^s z_{1t} - AT_p - \sum_{t \in T_p}\sum_{h \in H_{pt}}(HT_{pth} x_{pth}) - ST_p + 168Q \; \forall \; p \in P, p = |P| \quad (22)$$

$$DT_p = AT_p + WT_p + \sum_{t \in T_p}\sum_{h \in H_{pt}}(HT_{pth} x_{pth}) \; \forall \; p \in P \quad (23)$$

$$LT_p \ge AT_p - \sum_{t \in T_p} TW_{pt}^e z_{pt} \; \forall \; p \in P \quad (24)$$

$$AT_{p+1} = DT_p + ST_p \; \forall \; p \in P, p < |P| \quad (25)$$

$$AT_1 = DT_p + ST_p - 168Q \; \forall \; p \in P, p = |P| \quad (26)$$

$$168Q = \sum_{p \in P} ST_p + \sum_{p \in P}\sum_{t \in T_p}\sum_{h \in H_{pt}}(HT_{pth} x_{pth}) + \sum_{p \in P} WT_p \quad (27)$$

$$Q \le Q^{max} \quad (28)$$

$$CO_{2_p}^{SEA} = EF^{SEA} FC_p l_p \; \forall \; p \in P \quad (29)$$

$$CO_{2_p}^{PORT} = NC_p^{PORT}\sum_{t \in T_p}\sum_{h \in H_{pt}}(EF_{pth}^{PORT} x_{pth}) \; \forall \; p \in P \quad (30)$$

$$v^{min} \le v_p \le v^{max} \; \forall \; p \in P \quad (31)$$

In the MOVSP mathematical model, the objective function (14) aims to minimize the total route service cost components, which generally increase with the total vessel turnaround time, including the following: (a) total vessel weekly operational cost; (b) total container inventory cost; and (c) total vessel late arrival cost. The objective function (15) aims to minimize the total route service cost components, which generally decrease with the total vessel turnaround time, including the following: (a) total fuel consumption cost; (b) total port handling cost; and (c) total cost of $CO_2$ emissions produced in sea and at ports of call. Constraint set (16) ensures that only one service TW should be selected at each port of call. Constraint set (17) indicates that only one handling rate must be selected for the vessel service at each port of call during a given TW. Constraint set (18) ensures that the vessel will be served under the selected handling rate during the negotiated TW at each port of call. Constraint set (19) estimates the vessel sailing time between consecutive ports of call. Constraint set (20) calculates the fuel consumption at each voyage leg of the liner shipping route. Constraint sets (21) and (22) compute the vessel waiting time at each port of call before the beginning of service. Constraint set (23) estimates the vessel departure time from each port of call. Constraint set (24) calculates the hours of vessel late arrival at each port of call. Constraint sets (25) and (26) compute the vessel arrival time at the consecutive port of call. Constraint set (27) guarantees that the weekly service frequency at ports of call should be maintained. Constraint set (28) ensures that the number of deployed vessels will not exceed the maximum number of vessels, allocated for service of the given liner shipping route. Constraint sets (29) and (30) estimate the amount of $CO_2$ emissions produced in sea and at ports of call due to container handling respectively. Constraint set (31) guarantees that the vessel sailing speed will be within the established bounds at each voyage leg of the given liner shipping route. Note that the MOVSP mathematical model does not include the sign restriction constraints for its parameters and variables (e.g., $LT_p \ge 0$ $\forall p \in P$), as they are defined in the nomenclature (e.g., $LT_p$—is a non-negative variable: $LT_p \in R^+ \forall p \in P$).

The unit cost components (i.e., $c_p^{LT}$, $c^{FC}$, $c^{CO_2}$, etc.) play the role of normalizing coefficients in the MOVSP mathematical model. Specifically, the total vessel weekly operational cost (TOC, measured in USD) cannot be added to the total vessel late arrival hours ($\Sigma_{p \in P} LT_p$, measured in hours); therefore, a unit vessel late arrival cost ($c_p^{LT}$, measured in USD/hour) was introduced in the model as a normalizing coefficient to convert the total vessel late arrival hours to the total vessel late arrival cost (TLC=$\Sigma_{p \in P} c_p^{LT} LT_p$, measured in USD). Similarly, the total port handling cost (TPC, measured in USD) cannot be added to the total $CO_2$ emissions ([$\Sigma_{p \in P} CO_{2_p}^{SEA} + \Sigma_{p \in P} CO_{2_p}^{PORT}$], measured in tons); therefore, a unit $CO_2$ emission cost ($c^{CO_2}$, measured in USD/ton) was introduced in the model as a normalizing coefficient to convert the total $CO_2$ emissions to the total $CO_2$ emission cost (TEC=$c^{CO_2}[\Sigma_{p \in P} CO_{2_p}^{SEA} + \Sigma_{p \in P} CO_{2_p}^{PORT}]$, measured in USD). However, in some cases it may be difficult to quantify certain cost components, and without loss of generality the MOVSP mathematical model can be adjusted accordingly (e.g., if parameter $c^{CO_2}$ is difficult to quantify, the second objective function can be reduced to min $F_2 = [\Sigma_{p \in P} CO_{2_p}^{SEA} + \Sigma_{p \in P} CO_{2_p}^{PORT}]$).

Solution Methodology

The following describes a solution methodology, including the following components: 1) linearization of the MOVSP mathematical model; and 2) Global Multi-Objective Optimization Algorithm for the vessel scheduling problem.

Linearization of the MOVSP Mathematical Model

Nonlinearity of the MOVSP mathematical model stems from the following components: (a) constraint set (19); and (b) constraint set (20). Note that replacing vessel sailing speed $v_p$, $p \in P$ with its reciprocal $$u_p = \frac{1}{v_p}, p \in P$$

will allow linearizing constraint set (19). The rest of the MOVSP components are nonlinear due to the fuel consumption function. Let $RF_p$ be the fuel consumption function, which is computed based on vessel sailing speed reciprocal $u_p$. Function $RF_p$ is a monotonically decreasing nonlinear convex function.

There are a number of techniques that have been used in the liner shipping literature to overcome the issue of nonlinearity of the fuel consumption function, including the following (Wang et al., 2013a): (i) enumeration method—the vessel sailing speed is assumed to be the same at voyage legs of the liner shipping route, and the vessel scheduling problem is solved analytically based on minimization of the total route service cost; (ii) dynamic programming method—the vessel scheduling problem is reduced to the shortest path problem for the time-space network, where the horizontal axis represents time (generally expressed in days) and the vertical axis represents ports of call to be visited; (iii) discretization method—the vessel sailing speed reciprocal is discretized, values of the fuel consumption function are estimated for each one of the discretized vessel sailing speed reciprocal values, and the vessel scheduling problem is reduced to the mixed integer linear problem; (iv) tailored method—the nonlinear fuel consumption function is replaced using approximating functions (e.g., a set of tangent approximating lines, a set of secant approximating lines), and the vessel scheduling problem is reduced to the mixed integer linear problem; (v) second order cone programming method—the original mixed integer nonlinear model for the vessel scheduling problem is transformed to the mixed integer second order cone programming model.

The assumption regarding the vessel sailing speed, adopted in the enumeration method (i.e., the vessel sailing speed remains the same at voyage legs of the liner shipping route), is rather unrealistic, as the liner shipping company may change the vessel sailing speed at voyage legs in order to arrive within the negotiated vessel service TWs at consecutive ports. The accuracy of the dynamic programming and discretization methods is highly dependent on the discretization level, while the accuracy of the tailored method is highly dependent on the number of segments, selected to approximate the fuel consumption function. However, an increasing discretization level and an increasing number of segments in the fuel consumption function approximation may negatively affect the computational time. Therefore, an additional analysis is required to determine the appropriate discretization level for the dynamic programming and discretization methods and the appropriate number of segments in the approximated fuel consumption function for the tailored method. The second order cone programming method requires additional steps to transform the mixed integer nonlinear model to the mixed integer second order cone programming model, and generally performs worse than the tailored method (Wang et al., 2013b). Thus, dynamic programming, discretization, and tailored methods are typically more efficient for approximation of the nonlinear fuel consumption function (Wang et al., 2013a-b). This disclosure will adopt the discretization method for linearizing the MOVSP mathematical model.

Based on the discretization method, the vessel sailing speed reciprocal is discretized in a finite set of values $S = \{1, \ldots, w\}$, and the fuel consumption is calculated for each one of those values. Let $y_{ps} = 1$ if discrete value s is adopted for the vessel sailing speed reciprocal at voyage leg p (=0 otherwise). Let $u_s^{val}$ be the vessel sailing speed reciprocal, associated with discrete value s, and $RF_s^{val}$ be the fuel consumption estimated based on the vessel sailing speed reciprocal, associated with discrete value s. Then, the mixed integer nonlinear MOVSP mathematical model can be reformulated as a mixed integer linear mathematical model (that will be further referred to as MOVSPL) as follows.

MOVSPL: (32)
$$\min F_1 = \left[ c^{OC}Q + c^{IC}\sum_{p \in P} ST_p NC_p^{SEA} + \sum_{p \in P} c_p^{LT} LT_p \right]$$

$$\min F_2 = \left[ c^{FC}\sum_{p \in P} l_p RF_p + \right. \tag{33}$$
$$\left. \sum_{p \in P}\sum_{t \in T_p}\sum_{h \in H_{pt}} c_{pth}^{PC} x_{pth} + c^{CO_2}\left(\sum_{p \in P} CO_{2p}^{SEA} + \sum_{p \in P} CO_{2p}^{PORT}\right) \right]$$

Subject to:
Constraint set (16)-(18), (21)-(28), (30)

$$\sum_{s \in S} y_{ps} = 1 \forall p \in P \tag{34}$$

$$u_p = \sum_{s \in S} y_{ps} u_s^{val} \forall p \in P \tag{35}$$

$$RF_p = \sum_{s \in S} y_{ps} RF_s^{val} \forall p \in P \tag{36}$$

$$ST_p = l_p u_p \forall p \in P \tag{37}$$

$$CO_{2p}^{SEA} = EF^{SEA} RF_p l_p \forall p \in P \tag{38}$$

$$\frac{1}{v^{max}} \leq u_p \leq \frac{1}{v^{min}} \forall p \in P \tag{39}$$

In the MOVSPL mathematical model, the objective function (32) aims to minimize the total route service cost components, which generally increase with the total vessel turnaround time, while the objective function (33) aims to minimize the total route service cost components, which generally decrease with the total vessel turnaround time. Constraint set (34) ensures that only one discrete value of the vessel sailing speed reciprocal is selected at each voyage leg of the liner shipping route. Constraint set (35) calculates the vessel sailing speed reciprocal based on the selected discrete value at each voyage leg of the liner shipping route. Constraint set (36) estimates the fuel consumption based on the selected discrete value of the vessel sailing speed reciprocal at each voyage leg of the liner shipping route. Constraint set (37) computes the vessel sailing time between consecutive ports of call. Constraint set (38) calculates the amount of $CO_2$ emissions produced at each voyage leg of the liner shipping route. Constraint set (39) guarantees that the vessel sailing speed reciprocal will be within the established bounds at each voyage leg of the liner shipping route. As underlined in Wang et al. (2013), the accuracy of the discretization method highly depends on the discretization level. A higher discretization level will provide more alternatives in terms of the vessel sailing speed selection (see Example 4), but in the meantime will increase the number of variables in the MOVSPL mathematical model, which may further cause an increase in the computational time. The latter tradeoff will be analyzed throughout the numerical experiments, and details will be further discussed as this specification continues.

Global Multi-Objective Optimization Algorithm for the Vessel Scheduling Problem

Since the MOVSPL mathematical model is bi-objective, there exists a set of optimal solutions that form a Pareto Front (PF). In the multi-objective optimization, PF represents a set of non-dominant solutions, where it is impossible to improve one of the objective functions without worsening the other objective functions (Deb et al., 2002). A number of approaches have been used in the past for solving multi-objective optimization problems and constructing PFs, including the following (Coello et al., 2007): (i) The ε-constraint Method; (ii) Pure Pareto Ranking; (iii) Multi-Objective Genetic Algorithm (MOGA); (iv) Non-dominated Sorting Genetic Algorithm (NSGA); (v) Niched-Pareto Genetic Algorithm (NPGA); (vi) Pareto Archived Evolution Strategy (PAES); and others. Note that the MOVSPL mathematical model, where either $F_1$ or $F_2$ is to be minimized, can be solved using mixed integer programming solvers (e.g., CPLEX) within acceptable computational time for the realistic size problem instances. Based on the latter property, a Global Multi-Objective Optimization Algorithm (GMOA-VSP) was developed to solve the MOVSPL mathematical model. The GMOA-VSP algorithm is based on the ε-constraint method, specifically: PF is constructed by minimizing one of the objective functions and setting an upper bound on the other objective function. The main GMOA-VSP steps are presented in Pseudocode 1 (PS-1).

---

PS-1. Global Multi-Objective Optimization on Algorithm for the Vessel Seheduling Problem (GMOA-VSP)

GMOA-VSP (InputData, $N_{PF}$, $\varepsilon_1$, $\varepsilon_2$)

in: InputData - values of the MOVSPL parameters; $N_{PF}$ - desired number of PF points; $\varepsilon_1$ - upper bound on objective function $F_1$; $\varepsilon_2$, - upper bound on objective function $F_2$ out: PF - cost components for the PF vessel schedules 1: |PF| ← $N_{PF}$ ◁ PF Initialization 2: [$F_1^*$; $F_2(F_1^*)$] ← VSPL-F1(InputData, $\varepsilon_2$) ◁ Obtain corner point [$F_1^*$; $F_2(F_1^*)$]

3: [$F_1(F_2^*)$; $F_2^*$] ← VSPL-F2(InputData, $\varepsilon_1$) ◁ Obtain corner point [$F_1(F_2^*)$; $F_2^*$]

4: $\varepsilon \leftarrow \dfrac{F_2(F_1^*) - F_2^*}{(N_{PF} - 2)}$ ◁ Estimate the $F_2$ upper bound interval 5: i ← 1

6: $\varepsilon_{2i}$ ← $F_2^*$ ◁ Set the initial $F_2$ upper bound to $F_2^*$

7: PF ← PF ∪ [$F_1(F_2^*)$; $F_2^*$] ◁ Append corner point [$F_1(F_2^*)$; $F_2^*$]

8: while |PF| < ($N_{PF}$ − 1) do

9:   i ← i + 1

10:   $\varepsilon_{2i}$ ← $\varepsilon_{2i}$ + $\varepsilon$ ◁ Increase the $F_2$ upper bound 11:   [$F_{1i}^*$; $F_2(F_{1i}^*)$] ← VSPL-F1(InputData, $\varepsilon_{2i}$) ◁ Solve VSPL-F1 with the updated upper bound 12:   PF ← PF ∪ [$F_{1i}^*$; $F_2(F_{1i}^*)$] ◁ Append the generated PF point 13: end while 14: PF ← PF ∪ [$F_1^*$; $F_2(F_1^*)$] ◁ Append corner point [$F_1^*$; $F_2(F_1^*)$]

15: return PF

In step 1, a data structure for storing the PF points is initialized. Next, in steps 2 and 3, GMOA-VSP identifies the corner PF points, which correspond to the solutions with the minimum values of objective functions $F_1$ and $F_2$ respectively. The corner point $[F_1^*; F_2(F_1^*)]$ corresponds to the optimal solution for the VSPL-F1 mathematical model, where objective function $F_1$ is minimized and upper bound $\varepsilon_2$ is set on objective function $F_2$. Notation $F_1^*$ represents the optimal value of objective function $F_1$, while notation $F_2(F_1^*)$ represents the value of objective function $F_2$ at the optimal solution for objective function $F_1$. Similarly, the corner point $[F_1(F_2^*); F_2^*]$ corresponds to the optimal solution for the VSPL-F2 mathematical model, where objective function $F_2$ is minimized and upper bound $\varepsilon_1$ is set on objective function $F_1$. Notation $F_2^*$ represents the optimal value of objective function $F_2$, while notation $F_1(F_2^*)$ represents the value of objective function $F_1$ at the optimal solution for objective function $F_2$. The VSPL-F1 and VSPL-F2 mathematical models are presented next.

VSPL-F1:
$$\min F_1 = \left[ c^{OC} Q + c^{IC} \sum_{p \in P} ST_p NC_p^{SEA} + \sum_{p \in P} c_p^{LT} LT_p \right] \quad (40)$$

Subject to:
Constraint set (16)-(18), (21)-(28), (30), (34)-(39)

$$F_2 = \left[ c^{FC} \sum_{p \in P} l_p RF_p + \sum_{p \in P} \sum_{t \in T_p} \sum_{h \in H_{pt}} c_{pth}^{PC} x_{pth} + c^{CO_2} \left( \sum_{p \in P} CO_{2p}^{SEA} + \sum_{p \in P} CO_{2p}^{PORT} \right) \right] \quad (41)$$

$$F_2 \leq \varepsilon_2 \quad (42)$$

VSPL-F2:

$$\min F_2 = \left[ c^{FC} \sum_{p \in P} l_p RF_p + \sum_{p \in P} \sum_{t \in T_p} \sum_{h \in H_{pt}} c_{pth}^{PC} x_{pth} + c^{CO_2} \left( \sum_{p \in P} CO_{2p}^{SEA} + \sum_{p \in P} CO_{2p}^{PORT} \right) \right] \quad (43)$$

Subject to:
Constraint sets (16)-(18), (21)-(28), (30), (34)-(39)

$$F_1 = \left[ c^{OC} Q + c^{IC} \sum_{p \in P} ST_p NC_p^{SEA} + \sum_{p \in P} c_p^{LT} LT_p \right] \quad (44)$$

$$F_1 \leq \varepsilon_1 \quad (45)$$

Then, in step 4, the GMOA-VSP algorithm determines the $F_2$ upper bound interval ($\varepsilon$) based on the values of objective function $F_2$ at the corner PF points and the desired number of PF points ($N_{PF}$) using the following equation:

$$\varepsilon = \frac{F_2(F_1^*) - F_2^*}{(N_{PF} - 2)}.$$

Figure 3:
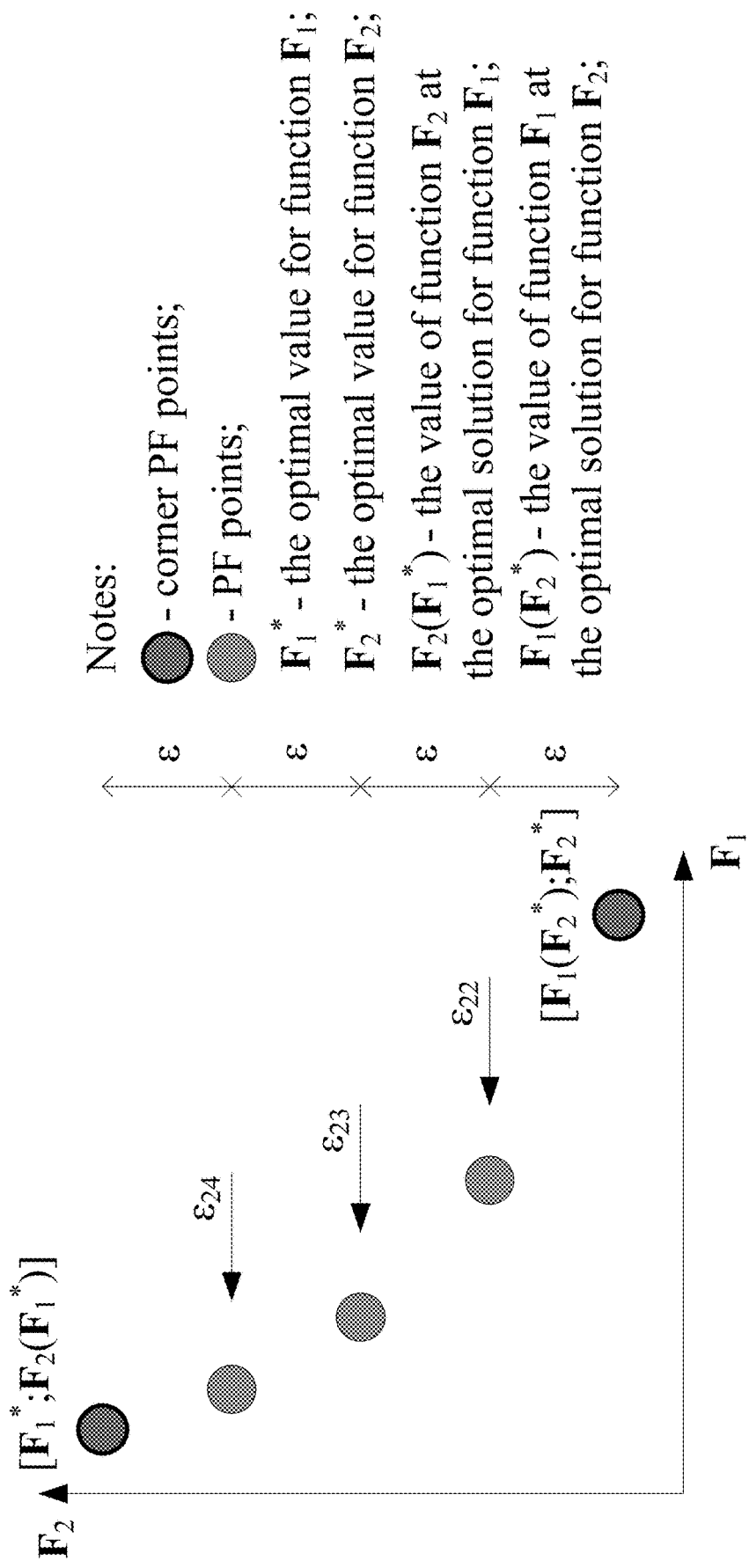
FIG. 3 depicts an example of Pareto Front (PF) construction.

Note that term "-2" in denominator of the $\varepsilon$ formula accounts for the two corner PF points that were generated in steps 2 and 3. In step 6, the initial upper bound on objective function $F_2$ is set to $F_2^*$, while the corner point $[F_1(F_2^*); F_2^*]$ is appended to the PF in step 7 (i.e., construction of the PF starts from the optimal solution for objective function $F_2$). Next, the GMOA-VSP algorithm starts an iterative procedure (steps 8-13), where the $F_2$ upper bound is increased by value of $\varepsilon$ (step 10). A new PF point is obtained in step 11 by solving the VSPL-F1 mathematical model with the updated $F_2$ upper bound. In step 12, the generated PF point is appended to PF. The iterative process is terminated once the number of PF points reaches $N_{PF}-1$. After that, in step 14, the GMOA-VSP algorithm appends the last PF point, which corresponds to the optimal solution for objective function $F_1$ (i.e., corner point $[F_1^*; F_2(F_1^*)]$). FIG. 3 shows an example of constructing a PF, which has five points.

Note that both VSPL-F1 and VSPL-F2 are mixed integer programming models, which can be solved using mixed integer programming solvers (e.g., CPLEX) to the global optimality within acceptable computational time for the realistic size problem instances. An increasing number of points in PF allows better realization of tradeoffs between conflicting objective functions $F_1$ and $F_2$, but in the meantime will increase the number of iterations within the GMOA-VSP algorithm. The latter will also increase the computational time of the algorithm. A tradeoff between the desired number of PF points and the GMOA-VSP computational time will be analyzed throughout the numerical experiments, and details will be further discussed as this specification continues.

Numerical Experiments

The following provides a detailed description of numerical experiments that were conducted to assess the computational performance of the developed GMOA-VSP algorithm and demonstrate how the current multi-objective optimization model could be applied to draw important managerial insights. The numerical experiments were performed throughout this disclosure on a Dell Intel® Core™ i7 Processor with 32 GB of RAM. The GMOA-VSP algorithm was coded in MATLAB 2016a (Mathworks, 2016). The VSPL-F1 and VSPL-F2 mathematical models were coded in General Algebraic Modeling System (GAMS) and solved using CPLEX (GAMS, 2017) at each iteration of the GMOA-VSP algorithm.

Generation of the Input Data

The computational experiments were performed using the numerical data, which were primarily adopted from the available liner shipping and vessel scheduling literature (Wang and Meng, 2012a-c; Wang et al., 2013a; Zampelli et al., 2014; World Bank, 2016; OOCL, 2017, etc.). The selected parameter values are presented in Table 2. The fuel consumption coefficients were adopted to be $\alpha=3$ and $\gamma=0.012$ (Du et al., 2011; Wang and Meng, 2012b; Psaraftis and Kontovas, 2013). The vessel weekly operational cost was assumed to be $c^{OC_i}=300,000$ (USD/week), while the unit inventory cost was set to $c^{IC}=0.5$ (USD per TEU per h) based on the available literature (Wang et al., 2014; Dulebenets, 2016a-b). The unit fuel cost was set to $c^{FC}=300$ (USD/ton) (Fagerholt and Psaraftis, 2015). It was assumed that the G6 alliance could allocate up to 15 vessels for service of the EUM liner shipping route ($Q^{max}=15$ vessels).

The EUM liner shipping route has 17 ports of call in the port rotation (i.e., n=17). The start of TW t at each port of the port rotation was assigned based on the start of TW t at the preceding port of call, length of a voyage leg between consecutive ports of call, and the vessel sailing speed bounds as follows:

$$TW_{(p+1)t}^s = TW_{pt}^s + \frac{l_p}{U[v^{min}; v^{max}]} \forall\, p \in P, t \in T_p(h),$$

where U—is a notation, which will be further adopted to denote the uniformly distributed pseudorandom numbers. The vessel sailing speed was assumed to vary from $v^{min}=15$ knots to $v^{max}=25$ knots (Wang and Meng, 2012a-c). Duration of a TW at each port was assumed to range between one and three days (OOCL, 2017) and was set as follows: $TW_{pt}^e - T_{pt}^s = U[24; 72] \forall p \in P, t \in T_p$ (h). It was assumed that the marine container terminal operator at each port of call could offer 3 TWs for service of vessels of the G6 alliance (i.e., $m_p$=3 $\forall p \in P$). The late vessel late arrival cost was assigned as follows (Zampelli et al., 2014): $c_p^{LT}$=U[5,000; 10,000]$\forall p \in P$ (USD/h).

TABLE 2

Adopted parameter values.

| Parameter | Value | Source(s) |
|---|---|---|
| Number of ports to be visited: n (ports) | 17 | OOCL (2017) |
| Number of TWs at ports: $m_p$ $\forall p \in P$ (TWs) | 3 | N/A |
| Number of handling rates at ports: $k_{pt}$ $\forall p \in P, t \in T_p$ (rates) | 4 | N/A |
| Fuel consumption coefficients: $\alpha$, $\gamma$ | $\alpha$ = 3<br>$\gamma$ = 0.012 | Du et al. (2011); Wang and Meng (2012b); Psaraftis and Kontovas (2013) |
| Vessel weekly operational cost: $c^{OC}$ (USD/week) | 300,000 | Wang and Meng (2012a-c); Dulebenets et al. (2015) |
| Late arrival cost at ports: $c_p^{LT}$ $\forall p \in P$ (USD/h) | U[5,000; 10,000] | Zampelli et al. (2014) |
| Unit inventory cost: $c^{IC}$ (USD per TEU per h) | 0.5 | Wang et al. (2014); Dulebenets et al. (2015) |
| Unit fuel cost: $c^{FC}$ (USD/ton) | 300 | Fagerholt and Psaraftis (2015) |
| Average handling cost: $ahc_h$ $\forall h \in H_{pt}$ (USD/TEU) | [700; 625; 550; 475] | World Bank (2016); The Port Authority of New York and New Jersey (2016) |
| Unit $CO_2$ emission cost: $c^{CO_2}$ (USD/ton) | 32 | Schroten et al. (2011); Tran et al. (2016) |
| Number of containers transported at voyage legs: $NC_p^{SEA}$ $\forall p \in P$ (TEUs) | U[10,000; 15,000] | N/A |
| Number of containers handled at ports: $NC_p^{PORT}$ $\forall p \in P$ (TEUs) | U[200; 2,000] | Dulebenets (2016a-b) |
| Minimum vessel sailing speed: $v^{min}$ (knots) | 15 | Wang and Meng (2012a-c) |
| Maximum vessel sailing speed: $v^{max}$ (knots) | 25 | Wang and Meng (2012a-c) |
| Maximum quantity of deployed vessels: $Q^{max}$ (vessels) | 15 | N/A |
| Duration of TWs at ports: $[TW_{pt}^e - TW_{pt}^s]$ $\forall p \in P, t \in T_p$ (h) | U[24; 72] | OOCL (2017) |
| $CO_2$ emission factor in sea: $EF^{SEA}$ (tons of $CO_2$ emissions/ton of fuel) | 3.114 | IMO (2014) |
| $CO_2$ emission factor at ports: $EF_{pth*}^{PORT}$ $\forall p \in P, t \in T_p, h^* \in H_{pt}$ (tons of $CO_2$ emissions/TEU) | 0.01729 for $hp_{pth*}$ = 180 | Tran et al. (2016) |

The number of containers to be transported at voyage legs of the EUM liner shipping route was generated as follows: $NC_p^{SEA}$=U[10,000; 15,000]$\forall p \in P$ (TEUs). The number of containers to be handled at each port of EUM liner shipping route was assigned as follows (Dulebenets, 2016a-b): $NC_p^{PORT}$=U[200; 2,000]$\forall p \in P$ (TEUs). It was assumed that the marine container terminal operator at each port of call could offer 4 handling rates for service of vessels of the G6 alliance during the available TWs (i.e., $k_{pt}$=4 $\forall p \in P, t \in T_p$). The handling productivity at port p under handling rate h during TW t was computed as follows: $hp_{pth}$=$hp_{pt}^{AVE}$±U[0; 25]$\forall p \in P, t \in T_p, h \in H_{pt}$ (TEUs/h), where $hp_{pth}^{AVE}$—is the average handling productivity at port p under handling rate h during TW t (TEUs/h). Note that the second and random term was introduced in the $hp_{pth}$ formula to differentiate the handling productivities between ports and TWs. Specifically, larger ports typically have more handling equipment available and are able to offer handling rates with higher productivities for service of vessels. Moreover, availability of handling rates may vary at the given port depending on the TW selected by the G6 alliance (e.g., during high demand periods less handling equipment will be available). The average handling productivity was set to $hp_{pt}^{AVE}$=[180; 150; 120; 90]$\forall p \in P, t \in T_p$ ($|H_{pt}|$=4).

Based on the available literature (IMO, 2014), the $CO_2$ emission factor in sea was set to be $EF^{SEA}$=3.114 (tons of $CO_2$/ton of fuel). The $CO_2$ emission factor at ports was assumed to be $EF_{pth*}^{PORT}$=0.01729 (tons of $CO_2$/TEU) for the base handling productivity of $hp_{pth*}$=180 TEUs/h (Tran et al., 2016). The $CO_2$ emission factor at ports for the other handling productivities was generated in relation to the $CO_2$ emission factor for the base handling productivity as follows:

$$EF_{pth}^{PORT} = 0.01729 + U[1.0; 1.2] \cdot \frac{(hp_{pth} - 180)}{180} \cdot 0.01729 \forall\ p \in P,$$
$$t \in T_p, h \in H_{pt}$$

(tons of $CO_2$/TEU). Note that the second and random term was introduced in the $EF_{pth}^{PORT}$ formula to account for changes in the amount of emissions produced due to variability in handling equipment at ports of call, changes in the handling equipment availability from one TW to another, and variability in the equipment handling productivity (as discussed earlier). The unit $CO_2$ emission cost was set to $c^{CO_2}$=32 (USD/ton) (Schroten et al., 2011; Tran et al., 2016). The handling cost at port p under handling rate h during TW t was estimated as follows: $c_{pth}^{PC}$=$NC_p^{PORT}$·($ahc_h$±U[0; 50]) $\forall p \in P, t \in T_p, h \in H_{pt}$ (USD), where $ahc_h$—is the average handling cost per TEU under handling rate h (USD/TEU). Based on the available literature ahc was set to [700; 625; 550; 475] (USD/TEU) for the four available handling rates respectively (World Bank, 2016; The Port Authority of New York and New Jersey, 2016). The handling time at port p under handling rate h during TW t was calculated as follows:

$$HT_{pth} = \frac{NC_p^{PORT}}{hp_{pth}} \forall\ p \in P, t \in T_p, h \in H_{pt}(h).$$

Based on the generated numerical data a total of 20 problem instances were developed by changing the start of TWs and TW durations at ports of call. The developed problem instances will be further used to assess performance of the adopted solution methodology and analysis of the managerial insights, as will be discussed as this specification continues.

Solution Methodology Performance

Figure 4:
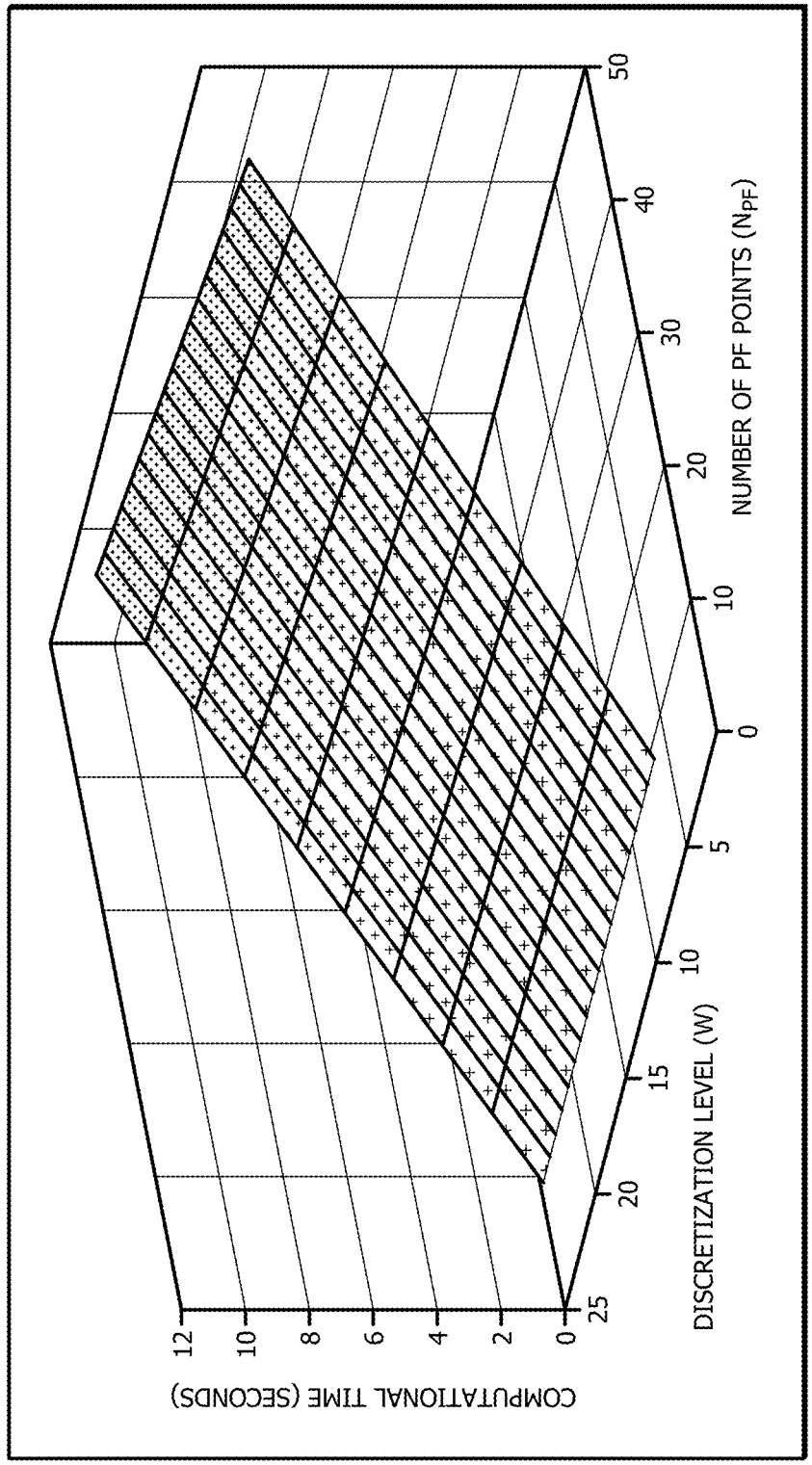
FIG. 4 depicts the Global Multi-Objective Optimization Algorithm (GMOA-VSP) computational time values by scenario.
Figure 5:
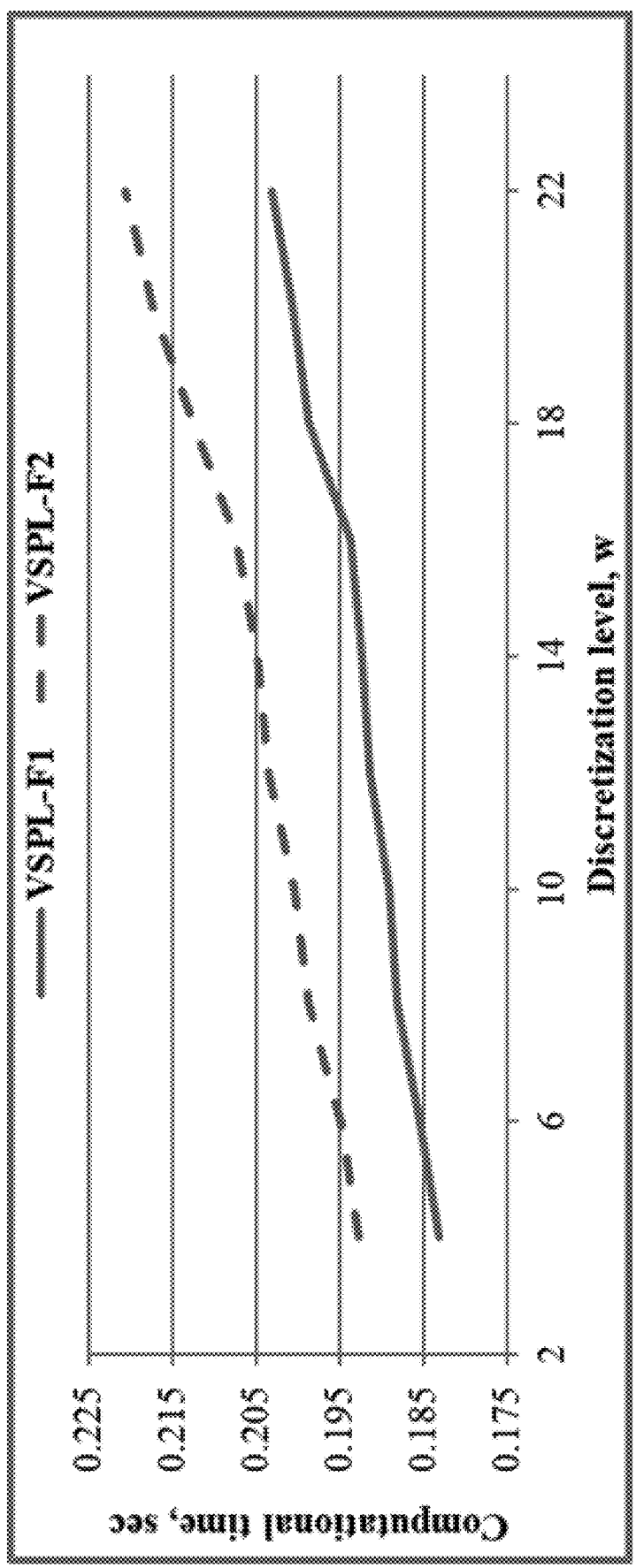
FIG. 5 depicts the VSPL-F1 and VSPL-F2 computational time values by scenario.

As discussed previously, performance of the GMOA-VSP algorithm is primarily affected with two parameters: (a) the vessel sailing speed reciprocal discretization level (w); and (b) the desired number of PF points ($N_{PF}$). A higher discretization level will provide more vessel sailing speed selection alternatives at the EUM liner shipping route, while an increasing number of PF points will allow better realization of tradeoffs among conflicting objectives $F_1$ and $F_2$. However, increasing vessel sailing speed reciprocal discretization level will increase the number of variables in the VSPL-F1 and VSPL-F2 mathematical models, while increasing number of PF points will increase the number of iterations within the GMOA-VSP algorithm. The latter two aspects will further increase the computational time of the GMOA-VSP algorithm. A set of computational experiments were conducted to select the appropriate vessel sailing speed reciprocal discretization level and the desired number of PF points. A total of 190 scenarios were developed by changing the discretization level from 4 to 22 with an increment of 1, while the desired number of PF points was altered from 5 to 50 with an increment of 5 PF points. The GMOA-VSP algorithm was executed 5 times for each one of the considered scenarios and developed problem instances to calculate the average computational time values (i.e., a total of 5·19·10=950 experimental runs). The average over 5 replications and 20 problem instances GMOA-VSP computational time values are presented in FIG. 4 for each one of the considered w/$N_{PF}$ scenarios. Furthermore, an additional set of numerical experiments were performed to assess the effects of the vessel sailing speed discretization level on the computational performance of the VSPL-F1 and VSPL-F2 mathematical models. The average over 5 replications and 20 problem instances computational time values of the VSPL-F1 and VSPL-F2 mathematical models are presented in FIG. 5 for each one of the considered discretization level scenarios.

Results from the conducted numerical experiments showcase that an increase in the discretization level from 4 to 22 on average increased the GMOA-VSP computational time by 0.71 sec over all the desired number of PF point scenarios, problem instances, and performed replications. Furthermore, an increase in the desired number of PF points from 5 to 50 on average increased the GMOA-VSP computational time by 9.60 sec over all the discretization level scenarios, problem instances, and performed replications. The GMOA-VSP computational time comprised 11.13 sec for the highest discretization level (w=22) and the largest number of desired PF points ($N_{PF}$=50), which can be considered as acceptable. The numerical experiments also demonstrate that the average VSPL-F1 computational time comprised 0.20 sec for the highest discretization level (w=22), while the average VSPL-F2 computational time did not exceed 0.22 sec. Therefore, the GMOA-VSP algorithm with w=22 and $N_{PF}$=50 will be further deployed for the analysis of managerial insights.

Analysis of Managerial Insights

The following discusses how the current multi-objective MOVSPL mathematical model can be used for the analysis of important managerial insights with focus on the following aspects: (1) detailed PF analysis; (2) evaluation of the collaborative agreement between the G6 alliance and marine container terminal operators; (3) sensitivity of vessel schedules to the time window duration; (4) sensitivity of vessel schedules to the unit fuel cost; and (5) sensitivity of vessel schedules to the unit $CO_2$ emission cost.

Detailed PF analysis. The first set of computational experiments aimed to perform a detailed analysis of the vessel schedules at the corner PF points. To achieve the latter objective, the GMOA-VSP algorithm was executed for each one of the developed problem instances. Results of the conducted analysis are presented in Table 3, where the following data were retrieved for the corner PF points: (1) value of objective function $F_1$; (2) value of objective function $F_2$; (3) number of vessels required for service of the EUM liner shipping route—Q; (4) average vessel sailing speed weighted by voyage leg length $$-WS = \frac{\sum_{p \in P} v_p l_p}{\sum_{p \in P} l_p}; \quad (5)$$

total vessel sailing time—TST=$\sum_{p \in P} ST_p$; (6) total vessel late arrival time at ports of call—TLT=$\sum_{p \in P} LT_p$; (7) total amount of $CO_2$ emissions produced in sea—$TCD^{SEA}=\sum_{p \in P} CO_2^{SEA}$; (8) total amount of $CO_2$ emissions produced at ports—$TCD^{PORT}=\sum_{p \in P} CO_2^{PORT}$; and (9) average requested handling productivity weighted by the number of containers handled at ports—

$$WHP = \frac{\sum_{p \in P}\sum_{t \in T_p}\sum_{h \in H_{pt}} NC_p^{PORT} hp_{pth} x_{pth}}{\sum_{p \in P} NC_p^{PORT}}.$$

Note that the average weighted vessel sailing speed (unlike its arithmetic average counterpart) allows capturing the effect of voyage leg length on the vessel sailing speed selection, while the average weighted handling rate (unlike its arithmetic average counterpart) allows capturing the effect of container demand at ports on the handling productivity selection.

TABLE 3

Analysis of the vessel schedules at the corner PF points.

| Instance | $F_1$, $10^6$ USD | $F_2$, $10^6$ USD | Q, vessels | WS, knots | TST, days | TLT, h | $TCD^{SEA}$, tons | $TCD^{PORT}$, tons | WHP, TEUs/h |
|---|---|---|---|---|---|---|---|---|---|
| | | | | Corner Point [$F_1$*; $F_2(F_1$*)] | | | | | |
| I-1 | 6.9500 | 11.9234 | 6 | 25.00 | 34.91 | 0.00 | 20175.5 | 140.9 | 146.2 |
| I-2 | 6.9506 | 12.4720 | 6 | 25.00 | 34.92 | 0.00 | 20171.9 | 149.6 | 145.4 |
| I-3 | 6.9500 | 12.3762 | 6 | 25.00 | 34.91 | 0.00 | 20175.5 | 146.6 | 146.3 |
| I-4 | 6.9954 | 12.0163 | 6 | 25.00 | 34.91 | 5.42 | 20175.5 | 142.5 | 144.3 |

TABLE 3-continued

Analysis of the vessel schedules at the corner PF points.

| Instance | $F_1$, $10^6$ USD | $F_2$, $10^6$ USD | Q, vessels | WS, knots | TST, days | TLT, h | $TCD^{SEA}$, tons | $TCD^{PORT}$, tons | WHP, TEUs/h |
|---|---|---|---|---|---|---|---|---|---|
| I-5 | 6.9500 | 12.5725 | 6 | 25.00 | 34.91 | 0.00 | 20175.5 | 154.6 | 146.8 |
| I-6 | 6.9500 | 12.2036 | 6 | 25.00 | 34.91 | 0.00 | 20175.5 | 146.3 | 146.8 |
| I-7 | 6.9500 | 12.5527 | 6 | 25.00 | 34.91 | 0.00 | 20175.5 | 159.3 | 149.5 |
| I-8 | 6.9500 | 12.1387 | 6 | 25.00 | 34.91 | 0.00 | 20175.5 | 145.8 | 145.4 |
| I-9 | 6.9500 | 13.0001 | 6 | 25.00 | 34.91 | 0.00 | 20175.5 | 168.8 | 150.0 |
| I-10 | 6.9500 | 12.6472 | 6 | 25.00 | 34.91 | 0.00 | 20175.5 | 163.8 | 148.6 |
| I-11 | 7.0030 | 11.9875 | 6 | 25.00 | 34.91 | 5.58 | 20175.5 | 144.8 | 146.5 |
| I-12 | 6.9500 | 12.3504 | 6 | 25.00 | 34.91 | 0.00 | 20175.5 | 147.1 | 145.6 |
| I-13 | 6.9598 | 11.6066 | 6 | 25.00 | 34.91 | 0.98 | 20175.5 | 132.3 | 142.7 |
| I-14 | 6.9611 | 12.0128 | 6 | 25.00 | 34.91 | 1.19 | 20175.5 | 143.1 | 145.6 |
| I-15 | 6.9500 | 12.1948 | 6 | 25.00 | 34.91 | 0.00 | 20175.5 | 148.9 | 148.0 |
| I-16 | 7.1642 | 12.9189 | 6 | 25.00 | 34.91 | 8.78 | 20175.5 | 166.8 | 150.0 |
| I-17 | 6.9500 | 12.3493 | 6 | 25.00 | 34.91 | 0.00 | 20175.5 | 152.1 | 149.0 |
| I-18 | 6.9500 | 12.1007 | 6 | 25.00 | 34.91 | 0.00 | 20175.5 | 151.1 | 148.3 |
| I-19 | 7.2500 | 12.1138 | 7 | 25.00 | 34.91 | 0.00 | 20175.5 | 150.1 | 145.8 |
| I-20 | 6.9500 | 12.2737 | 6 | 25.00 | 34.91 | 0.00 | 20175.5 | 154.3 | 150.0 |
| Corner Point [$F_1(F_2^*)$; $F_2^*$] | | | | | | | | | |
| I-1 | 30.0000 | 7.7634 | 10 | 17.12 | 54.55 | 19.92 | 8369.4 | 73.2 | 125.0 |
| I-2 | 30.0000 | 7.7548 | 10 | 17.12 | 54.56 | 11.65 | 8486.9 | 73.2 | 125.0 |
| I-3 | 30.0000 | 7.7188 | 10 | 16.87 | 55.37 | 15.14 | 8143.6 | 73.2 | 125.0 |
| I-4 | 30.0000 | 7.8239 | 9 | 17.55 | 53.22 | 19.16 | 8956.5 | 73.2 | 125.0 |
| I-5 | 30.0000 | 7.9169 | 9 | 17.65 | 51.47 | 21.76 | 9821.2 | 73.2 | 125.0 |
| I-6 | 30.0000 | 7.7559 | 9 | 17.34 | 53.86 | 12.94 | 8569.9 | 73.2 | 125.0 |
| I-7 | 30.0000 | 7.8134 | 9 | 17.54 | 53.26 | 17.32 | 8940.5 | 73.2 | 125.0 |
| I-8 | 30.0000 | 7.7374 | 10 | 17.03 | 54.85 | 21.07 | 8297.8 | 73.2 | 125.0 |
| I-9 | 30.0000 | 7.8031 | 9 | 17.47 | 53.46 | 14.05 | 8852.0 | 73.2 | 125.0 |
| I-10 | 30.0000 | 7.7760 | 9 | 17.36 | 53.78 | 22.15 | 8705.5 | 73.2 | 125.0 |
| I-11 | 30.0000 | 7.7733 | 9 | 17.32 | 53.91 | 12.06 | 8655.0 | 73.2 | 125.0 |
| I-12 | 30.0000 | 7.7633 | 9 | 17.35 | 53.84 | 17.17 | 8547.3 | 73.2 | 125.0 |
| I-13 | 30.0000 | 7.7242 | 10 | 16.93 | 55.16 | 21.18 | 8185.6 | 73.2 | 125.0 |
| I-14 | 30.0000 | 7.7575 | 9 | 17.32 | 53.91 | 12.31 | 8593.6 | 73.2 | 125.0 |
| I-15 | 30.0000 | 7.8608 | 9 | 17.73 | 52.66 | 18.06 | 9213.5 | 73.2 | 125.0 |
| I-16 | 30.0000 | 7.7819 | 9 | 17.37 | 53.76 | 18.08 | 8734.6 | 73.2 | 125.0 |
| I-17 | 30.0000 | 7.7829 | 9 | 17.36 | 53.78 | 12.71 | 8705.5 | 73.2 | 125.0 |
| I-18 | 30.0000 | 7.7713 | 9 | 17.32 | 53.91 | 16.97 | 8639.8 | 73.2 | 125.0 |
| I-19 | 30.0000 | 7.6738 | 10 | 16.85 | 56.08 | 15.69 | 7891.4 | 73.2 | 125.0 |
| I-20 | 30.0000 | 7.7765 | 9 | 17.35 | 53.84 | 15.57 | 8682.3 | 73.2 | 125.0 |

It was observed that the vessel schedules, obtained by minimizing objective function $F_1$, substantially differ from the vessel schedules, obtained by minimizing objective function $F_2$. The vessel schedules with the minimum value of objective function $F_1$ (i.e., the $F_1^*$ vessel schedules) have significantly higher weighted average vessel sailing speeds as compared to the $F_2^*$ vessel schedules. The average weighted vessel sailing speed of the $F_1^*$ vessel schedules was found to be 30.8% higher than the average weighted vessel sailing speed of the $F_2^*$ vessel schedules. Selection of higher vessel sailing speeds at voyage legs of the EUM liner shipping route allowed the G6 alliance reducing the total sailing time by 54.6%. Furthermore, the average weighted handling productivity was found to be 15.0% higher for the $F_1^*$ vessel schedules as compared to the $F_2^*$ vessel schedules. Selection of handling rates with higher handling productivities allowed the G6 alliance reducing the total vessel handling time at ports of call. The savings in terms of the total sailing and vessel handling times for the $F_1^*$ vessel schedules can be explained by the fact that the cost components of objective function $F_1$ decrease with the total vessel turnaround time. Therefore, minimization of objective function $F_1$ further leads to reduction of the total vessel turnaround time and its components (i.e., the total sailing and vessel handling times).

A reduction of the total vessel turnaround time for the $F_1^*$ vessel schedules decreased the number of vessels that were deployed by the G6 alliance to provide the weekly service frequency at ports of the EUM liner shipping route. Specifically, the number of required vessels for the $F_1^*$ vessel schedules was on average reduced by 3.25 vessels as compared to the $F_2^*$ vessel schedules over the considered problem instances. In the meantime, selection of higher vessel sailing speeds increased the fuel consumption by vessels, which further increased the total amount of $CO_2$ emissions produced in sea by 57.1% for the $F_1^*$ vessel schedules. Moreover, selection of handling rates with higher handling productivities by the G6 alliance required the marine container terminal operators to allocate more handling equipment for service of vessels, which further increased the total amount of $CO_2$ emissions produced at ports by 51.3% for the $F_1^*$ vessel schedules. The conducted numerical experiments also demonstrate that the total vessel late arrival time at ports was 15.65 hours lower for the $F_1^*$ vessel schedules as compared to the $F_2^*$ vessel schedules. The latter finding can be justified by the fact that the vessel late arrival time constitutes to the total vessel turnaround time, which is expected to be lower for the $F_1^*$ vessel schedules. Results from the conducted analysis can be further considered by the G6 alliance in the design of vessel schedules based on specific goals (e.g., minimization of the vessel weekly operational costs, minimization of the $CO_2$ emissions in sea and at ports, minimization of the port handling costs, etc.). Note that the current methodology can be also used for the design of vessel schedules with the minimum total route service cost (i.e., min $F=F_1+F_2$) based on the constructed PFs. Details regarding estimation of the minimum total route service cost vessel schedules are provided in Example 5.

Figure 6A:
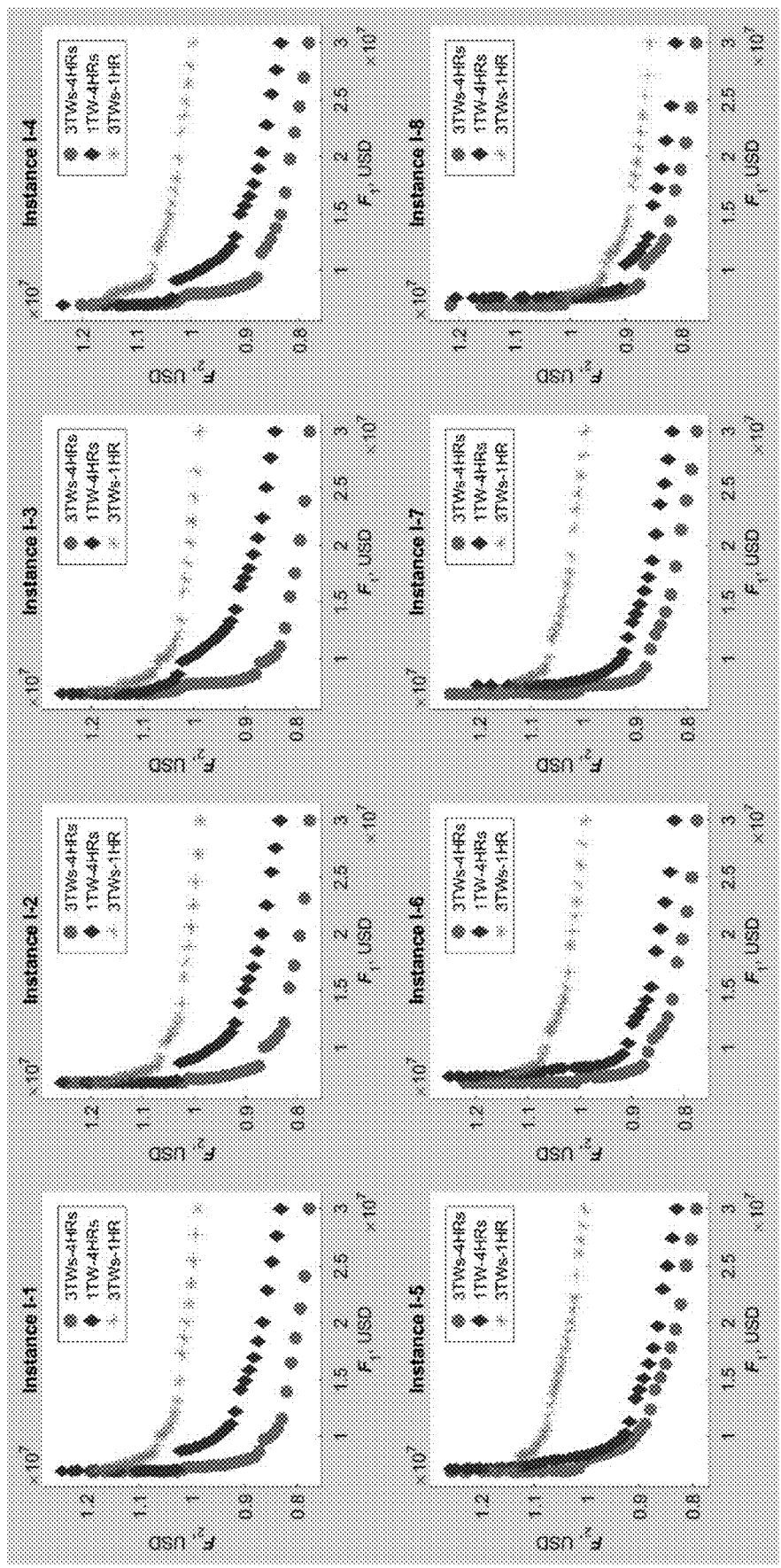
FIG. 6A depicts the obtained PFs for the considered collaborative agreements.
Figure 6B:
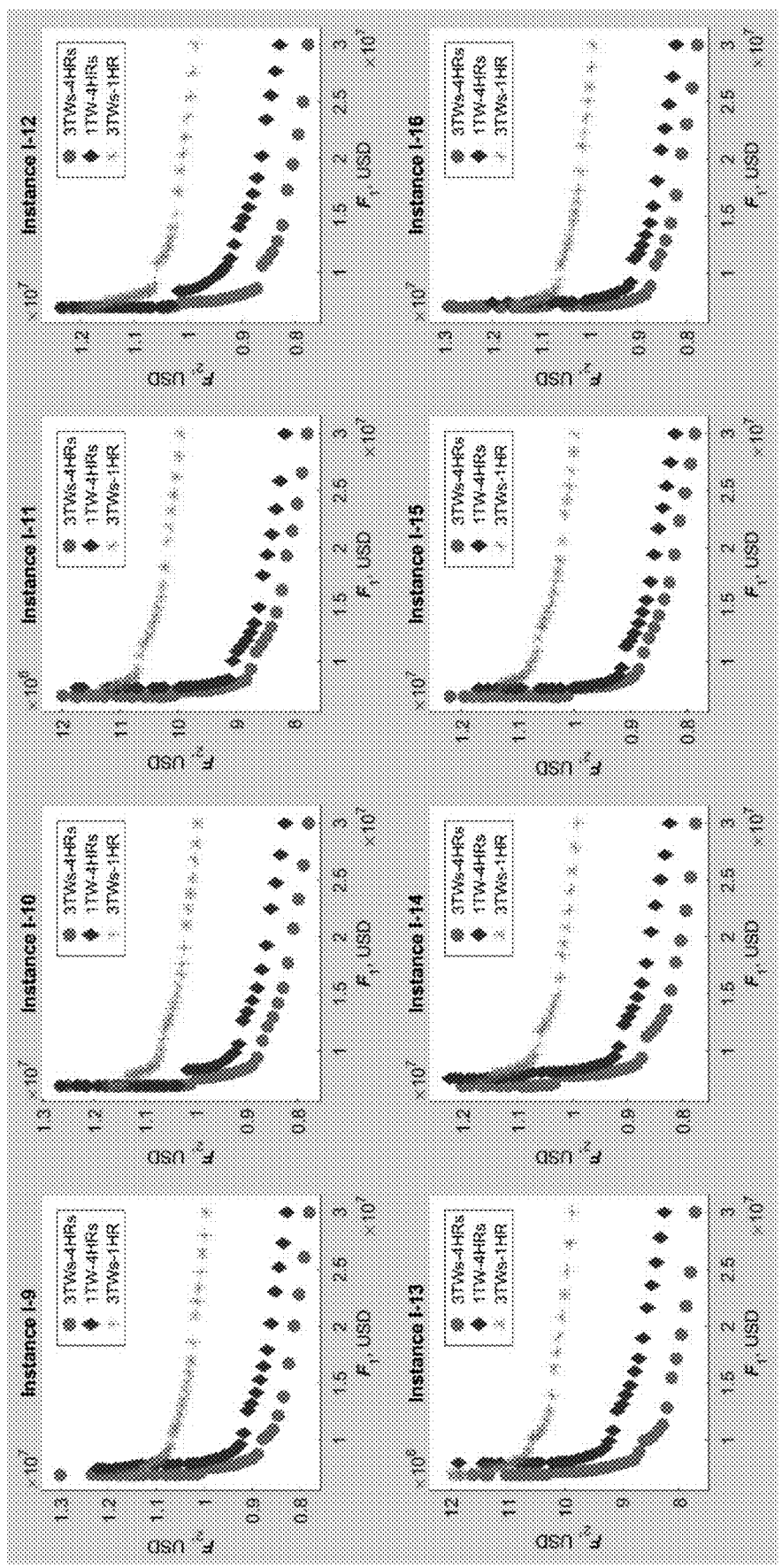
FIG. 6B depicts the obtained PFs for the considered collaborative agreements.
Figure 6C:
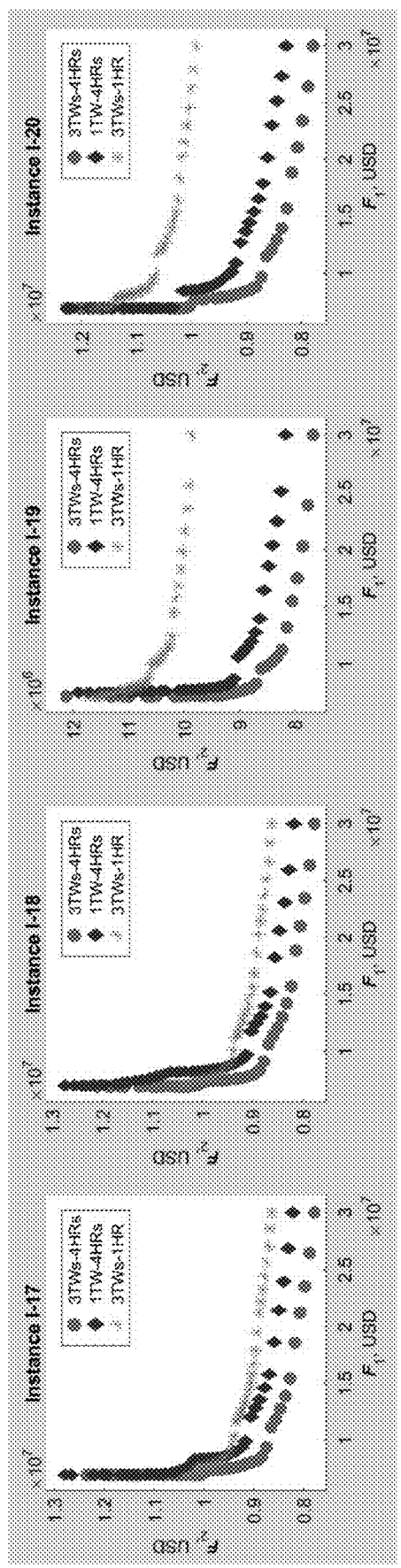
FIG. 6C depicts the obtained PFs for the considered collaborative agreements.

Collaborative agreement evaluation. The second set of computational experiments focused on evaluation of the proposed collaborative agreement between the G6 alliance and marine container terminal operators, according to which both vessel service TWs and handling rates were negotiated. The latter objective was achieved based on a comparative analysis of the proposed collaborative agreement (that will be referred to as CA) against two other alternative agreements presented in the literature: (1) marine container terminal operators offer one service TW and multiple handling rates during each TW (Dulebenets, 2015b)—this agreement will be referred to as $CA_1$; and (2) marine container terminal operators offer multiple service TWs and one handling rate during each TW (Wang et al., 2014; Alhrabi et al., 2015)—this agreement will be referred to as $CA_2$. The developed GMOA-VSP algorithm was executed for each one of the considered problem instances, and the obtained PFs are presented in FIG. 6 for each collaborative agreement.

It was observed that the PFs, obtained under collaborative agreements $CA_1$ and $CA_2$, are inferior to the PFs, obtained under collaborative agreement CA, for all the considered problem instances. The latter finding highlights that the proposed collaborative agreement, when both vessel service TWs and handling rates are negotiated between the G6 alliance and marine container terminal operators, allows improving efficiency of the liner shipping operations and yields cost savings. The conducted numerical experiments show that the vessel schedules were more sensitive to the vessel handling rate availability as compared to the service TW availability due to the fact that the PFs, obtained under collaborative agreement $CA_2$, are inferior to the PFs, obtained under collaborative agreement $CA_1$. Furthermore, the cost components of objective function $F_2$ (i.e., total fuel consumption cost; total port handling cost; and total cost of $CO_2$ emissions produced in sea and at ports of call) were found to be more sensitive to the type of a collaborative agreement adopted. The latter can be justified by the fact that multiple vessel service TWs and handling rates at ports of call provide the G6 alliance more flexibility in terms of selection of vessel sailing speeds at voyage legs and vessel handling times at ports, which further allows more efficient management of the liner shipping operations and leads to reduction in the fuel consumption, port handling costs, and total amount of $CO_2$ emissions produced. On average over the considered problem instances the $F_2^*$ vessel schedules under collaborative agreement CA yielded 6.0% and 24.9% savings in terms of the total $F_2$ costs as compared to the $F_2^*$ vessel schedules under collaborative agreements $CA_1$ and $CA_2$ respectively.

Figure 7A:
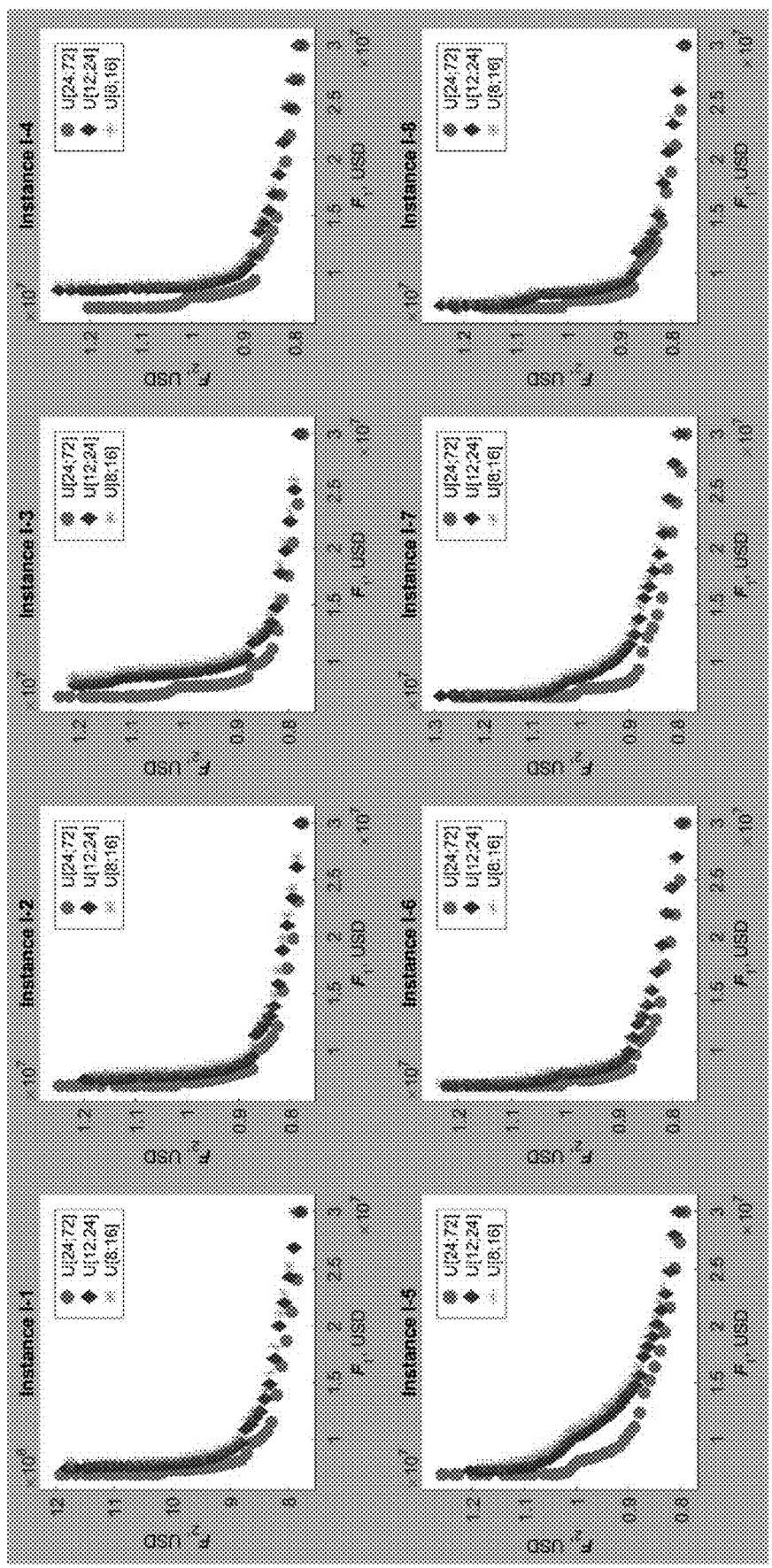
FIG. 7A depicts the obtained PFs for the considered TW duration cases.
Figure 7B:
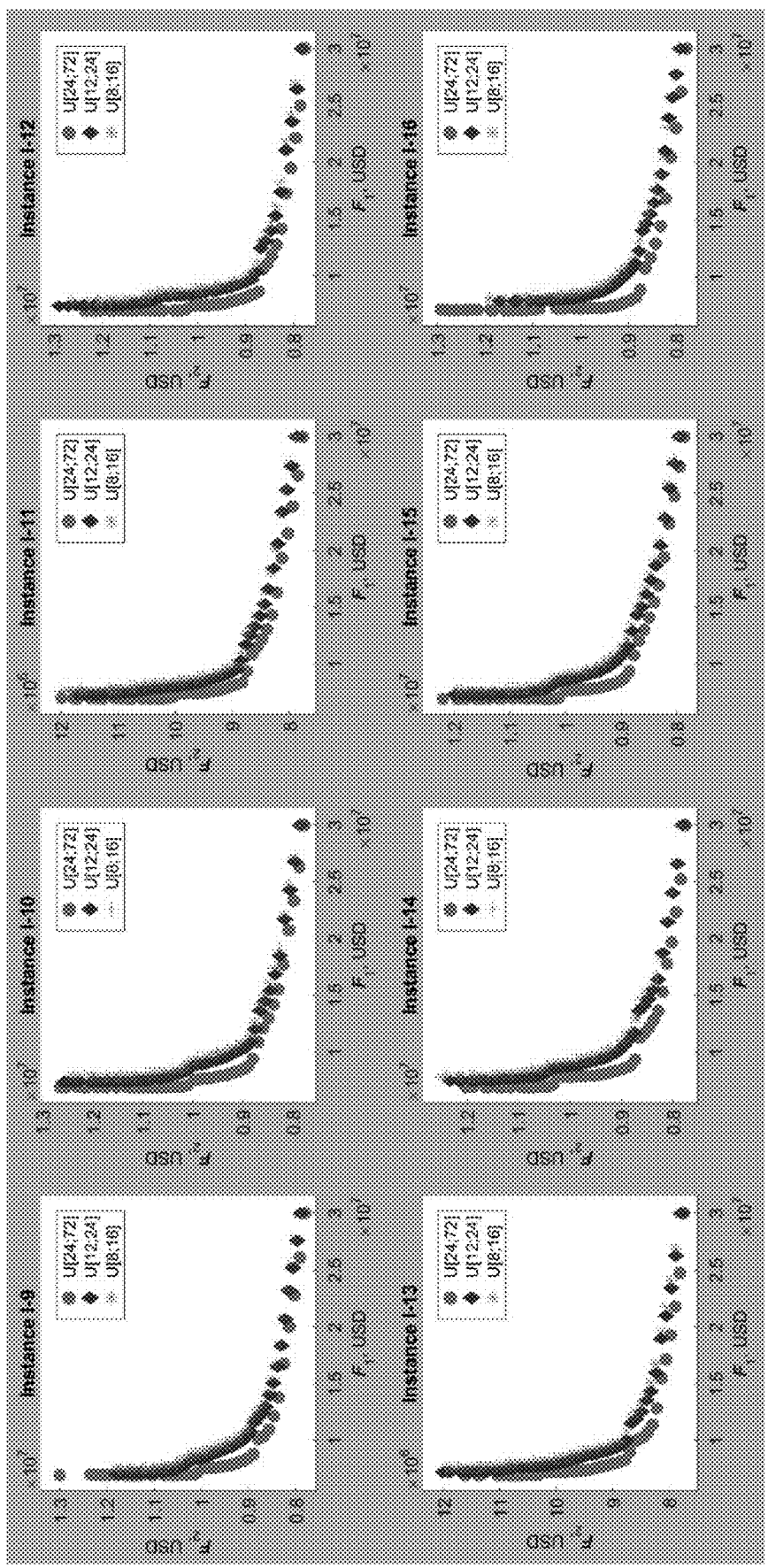
FIG. 7B depicts the obtained PFs for the considered TW duration cases.
Figure 7C:
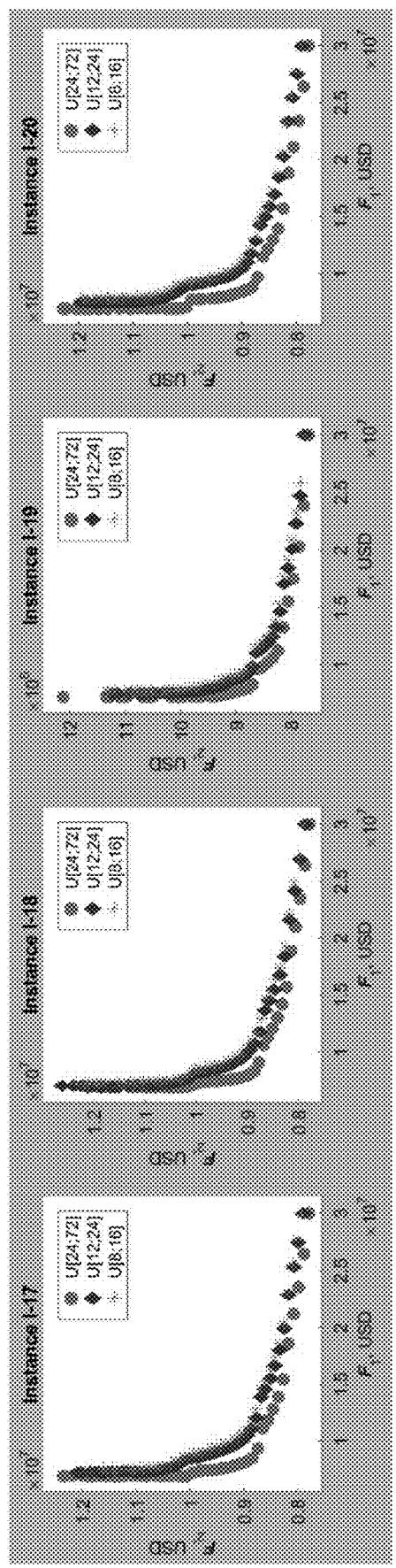
FIG. 7C depicts the obtained PFs for the considered TW duration cases.

Sensitivity of vessel schedules to the time window duration. The third set of computational experiments aimed to assess the effects of TW duration on the design of vessel schedules. The following TW duration cases were considered: (1) U[24; 72]—the TW duration varies from 24 hours to 72 hours (this TW duration case will be referred to as $TWD_1$); (2) U[12; 24]—the TW duration varies from 12 hours to 24 hours (this TW duration case will be referred to as $TWD_2$); and (3) U[8; 16]—the TW duration varies from 8 hours to 16 hours (this TW duration case will be referred to as $TWD_3$). The analysis was performed under the proposed collaborative agreement (CA), where both vessel service TWs and handling rates were negotiated between the G6 alliance and marine container terminal operators (however, the duration of TWs was changed for each one of the aforementioned cases). The developed GMOA-VSP algorithm was executed for each one of the considered problem instances and TW duration cases. The obtained PFs are presented in FIG. 7.

Numerical experiments demonstrate that changes in the TW duration at ports of call significantly affected the design of vessel schedules. Specifically, decreasing TW duration caused an increase in the total route service cost components (both $F_1$ and $F_2$ objective functions), as the PFs that were obtained for the TW duration cases $TWD_2$ and $TWD_3$ are inferior to the $TWD_1$ PFs. Furthermore, it was found that a reduction in the TW duration increased the route service cost components of objective function $F_1$ on average by 12.1% and 16.9% for the $TWD_2$ and $TWD_3$ vessel schedules respectively as compared to the $TWD_1$ vessel schedules. On the other hand, the route service cost components of objective function $F_2$ increased on average by 1.78% and 2.14% for the $TWD_2$ and $TWD_3$ vessel schedules respectively. The latter finding can be supported by the fact that an increase in the TW duration allowed the G6 alliance significantly reducing the total vessel late arrivals at ports of call and associated cost (which is the cost component of objective function $F_1$). Using the current mathematical model and the GMOA-VSP algorithm, the G6 alliance would be able to negotiate the appropriate duration of TWs with marine container terminal operators at ports of call and ensure the timely arrival of vessels at ports of call.

Figure 8A:
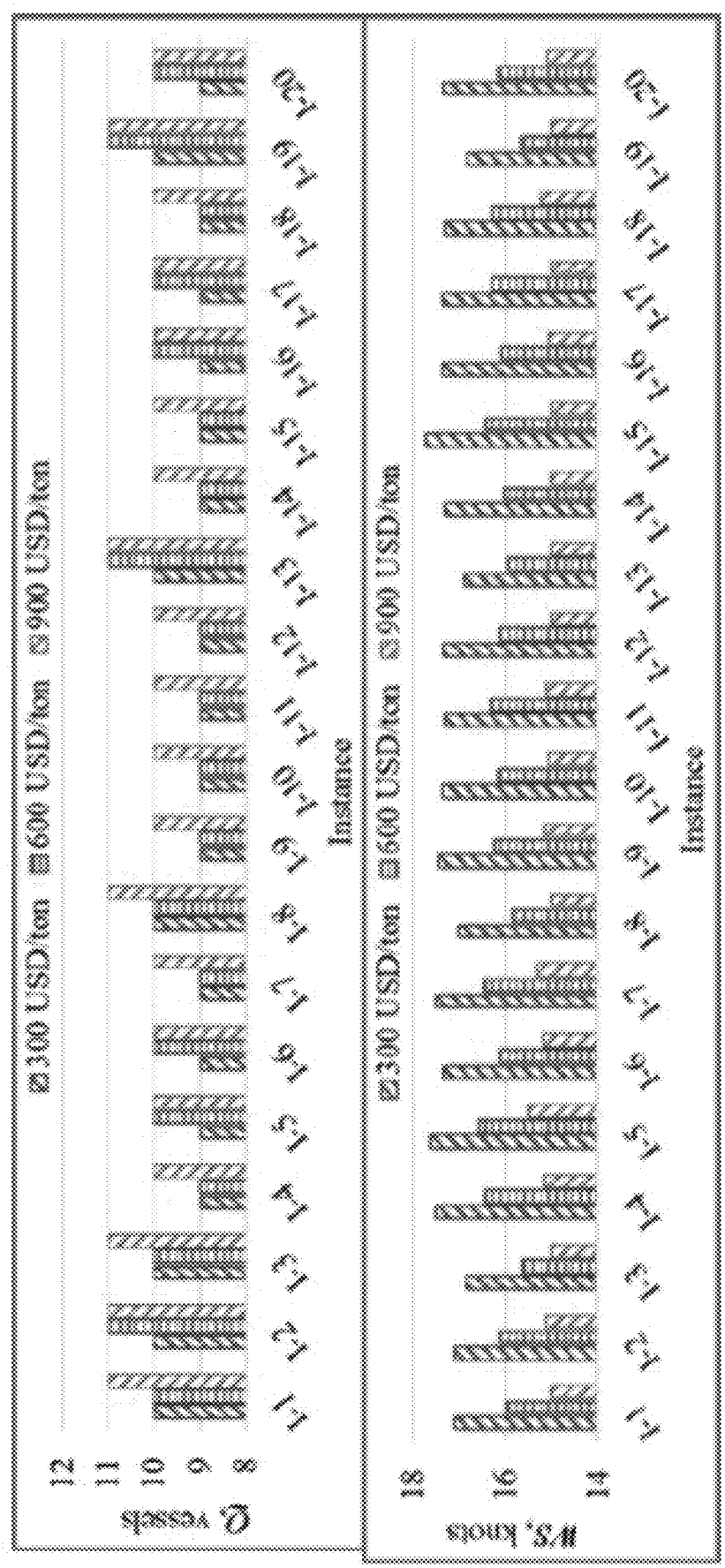
FIG. 8A depicts the unit fuel cost ($c^{FC}$) effects on vessel schedules.
Figure 8B:
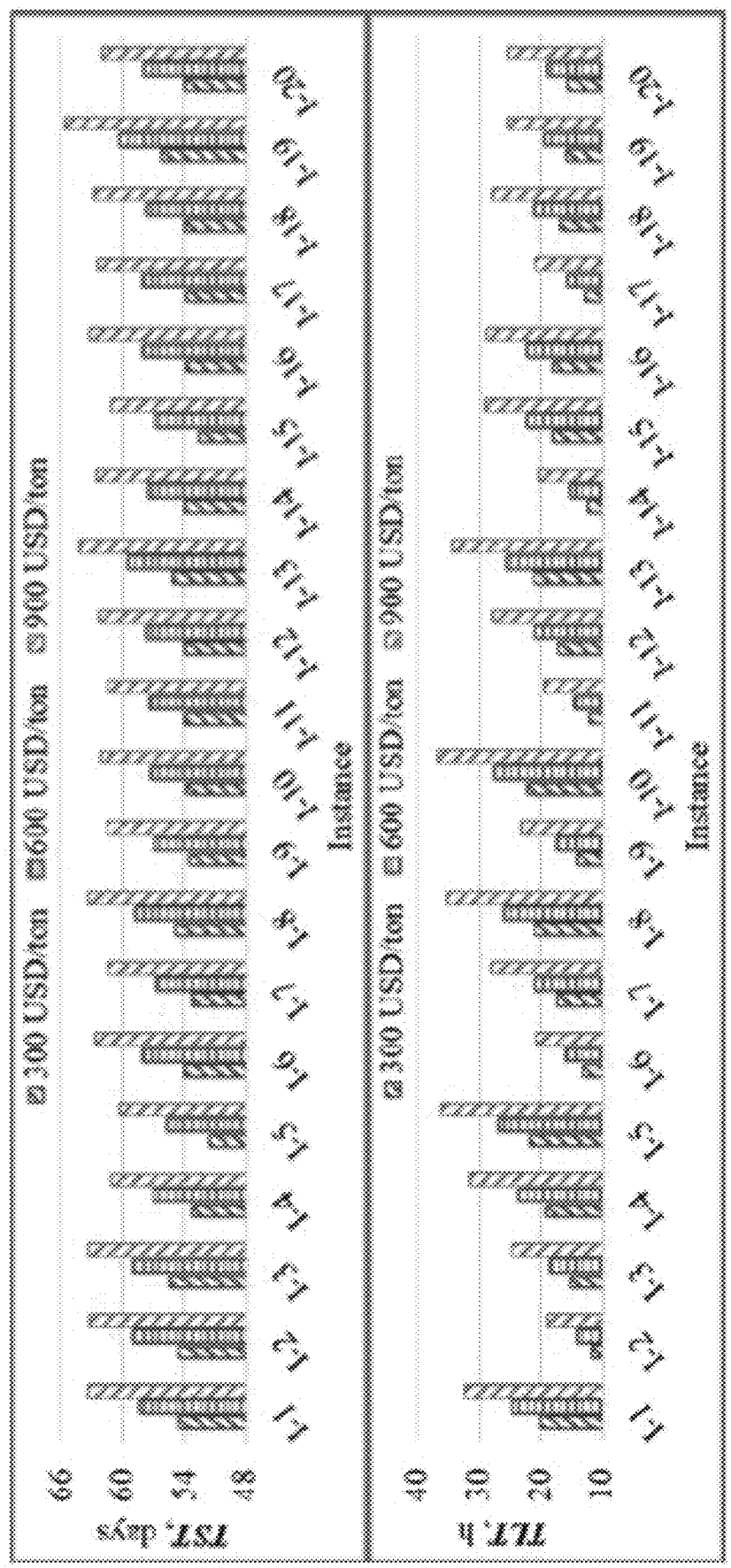
FIG. 8B depicts the unit fuel cost ($c^{FC}$) effects on vessel schedules.
Figure 8C:
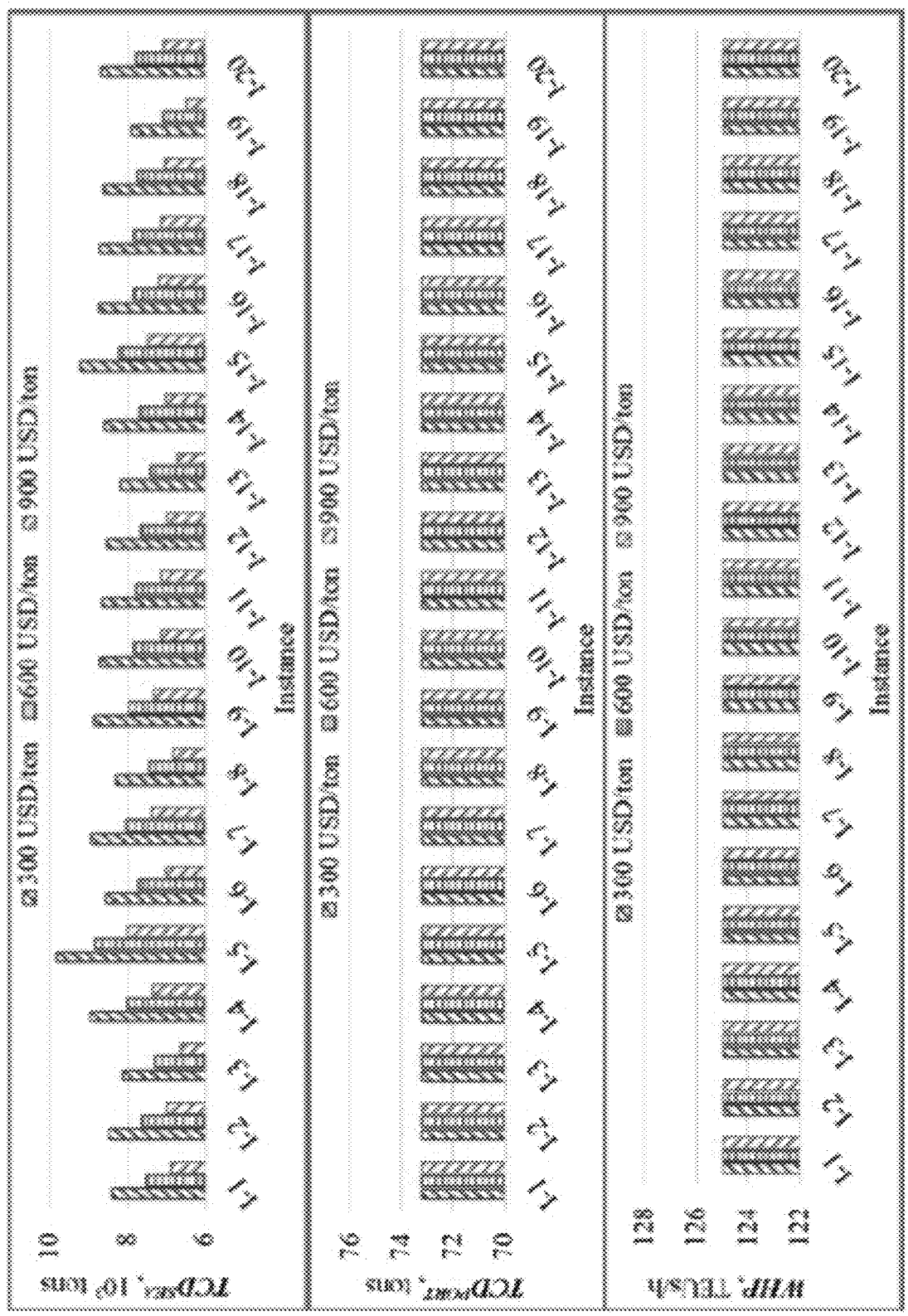
FIG. 8C depicts the unit fuel cost ($c^{FC}$) effects on vessel schedules.

Sensitivity of vessel schedules to the unit fuel cost. The fourth set of computational experiments aimed to assess the effects of changing the unit fuel cost ($c^{FC}$) on the design of vessel schedules. A total of three-unit fuel cost cases were evaluated: (a) $c^{FC}$=300 USD/ton; (b) $c^{FC}$=600 USD/ton; and (c) $c^{FC}$=900 USD/ton. The developed GMOA-VSP algorithm was executed for each one of the considered problem instances and unit fuel cost cases. Results of the performed analysis are presented in FIG. 8, where the following data were retrieved for the $F_2^*$ corner point: (1) number of vessels required for service of the EUM liner shipping route—Q; (2) average vessel sailing speed weighted by voyage leg length—WS; (3) total vessel sailing time—TST; (4) total vessel late arrival time at ports of call—TLT; (5) total amount of $CO_2$ emissions produced in sea—$TCD^{SEA}$; (6) total amount of $CO_2$ emissions produced at ports—$TCD^{PORT}$; and (7) average requested handling productivity weighted by the number of containers handled at ports—WHP. Note that the $F_1^*$ vessel schedules were not affected with changes in the unit fuel cost, as the unit fuel cost is not a component of objective function $F_1$.

A detailed analysis of vessel schedules indicates that as a result of increasing unit fuel cost the G6 alliance reduced the vessel sailing speeds at voyage legs of the EUM liner shipping route in order to decrease the fuel consumption by vessels and associated costs. The average weighted vessel sailing speed reduced on average by 12.71% due to an increase in the unit fuel cost from 300 USD/ton to 900 USD/ton. A reduction in the vessel sailing speeds further caused an increase in the total vessel sailing time by 13.80%, while the total amount of $CO_2$ emissions produced in sea decreased by 18.10% due to an increase in the unit fuel cost from 300 USD/ton to 900 USD/ton. Numerical experiments showcase that changes in the unit fuel cost primarily influenced the liner shipping operations in sea, while limited effects were observed at ports of call. Specifically, no changes were recorded in selection of vessel handling rates and total amount of $CO_2$ emissions produced at ports due to increasing unit fuel cost for the considered problem instances.

An increasing total vessel sailing time further increased the total turnaround time of vessels at the EUM liner shipping route and required the G6 alliance to deploy more vessels in order to provide the weekly service frequency at ports. The number of deployed vessels on average increased by 10.75% due to an increase in the unit fuel cost from 300 USD/ton to 900 USD/ton. Furthermore, it was found that changes in the unit fuel cost affected the vessel late arrival time at ports of the EUM liner shipping route. Specifically, the total late arrival time on average increased by 10.5 hours (or ≈62.71%) due to an increase in the unit fuel cost from 300 USD/ton to 900 USD/ton. The latter finding can be explained by the fact that decrease in the vessel sailing speeds (i.e., application of "slow steaming" to reduce the fuel consumption and associated costs) further resulted in violation of service TWs at ports of call. The conducted numerical experiments demonstrate that the value of objective function $F_2$ can increase by up to 21.46% from changing the unit fuel cost from 300 USD/ton to 900 USD/ton.

Figure 9A:
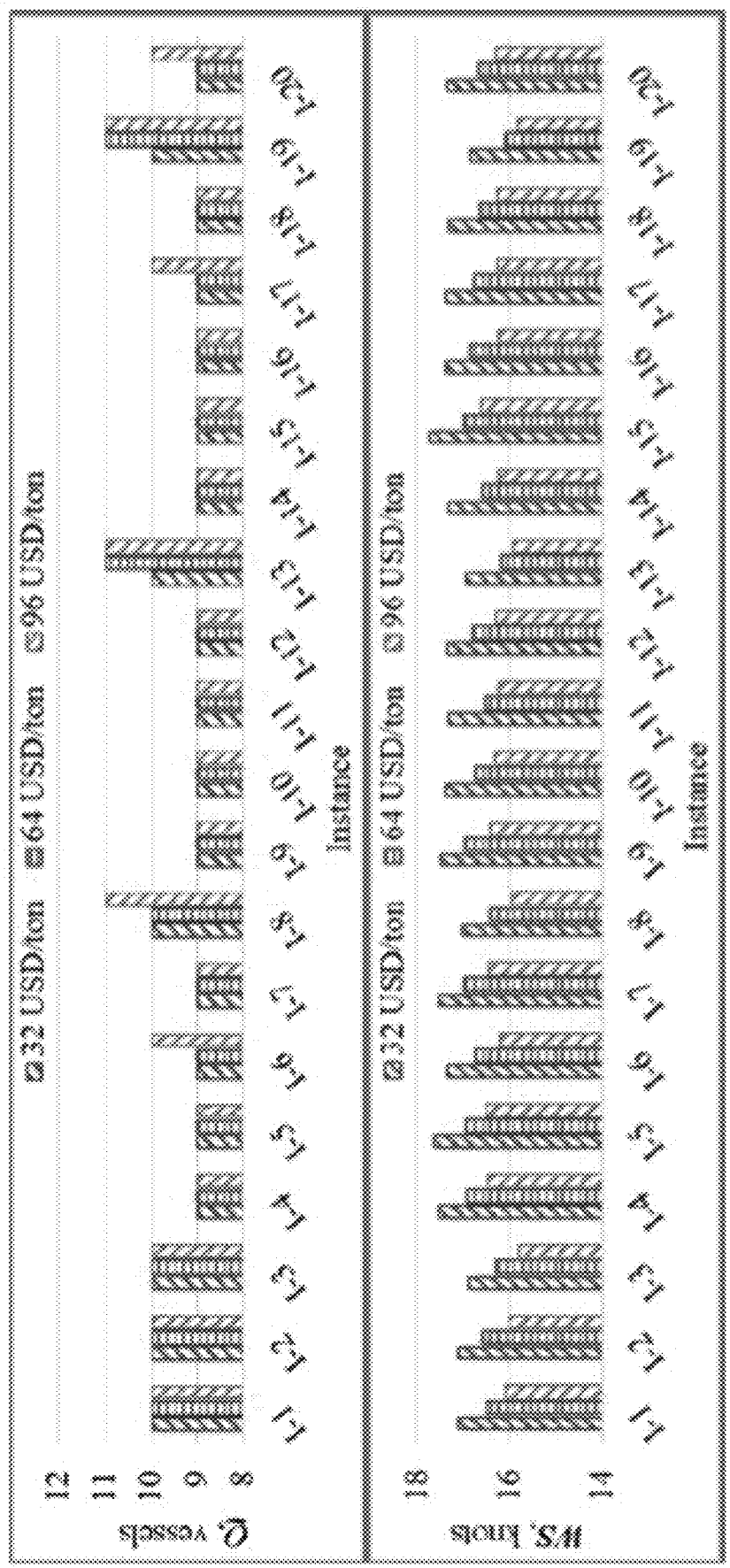
FIG. 9A depicts the unit $CO_2$ emission cost ($c^{CO_2}$) effects on vessel schedules.
Figure 9B:
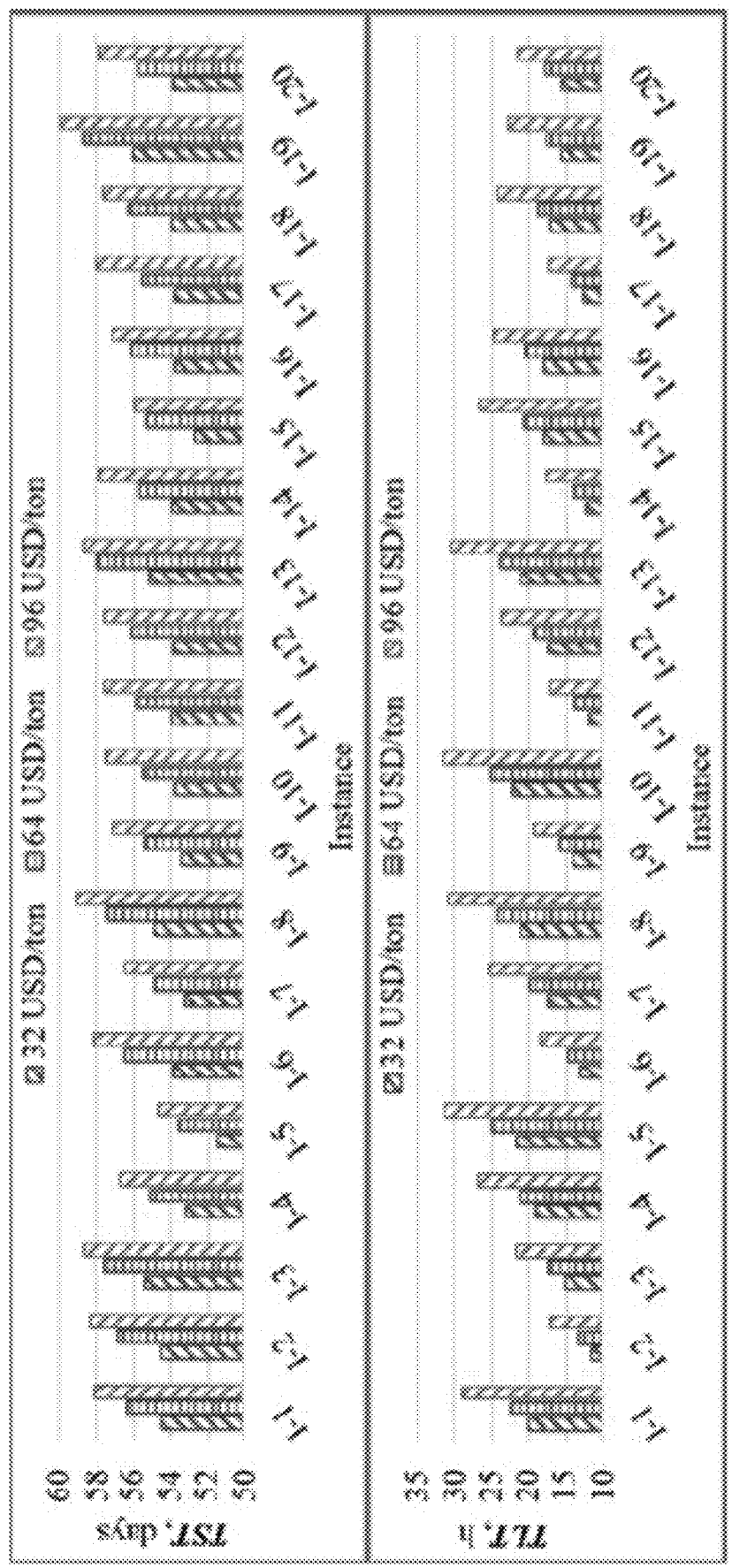
FIG. 9B depicts the unit $CO_2$ emission cost ($c^{CO_2}$) effects on vessel schedules.
Figure 9C:
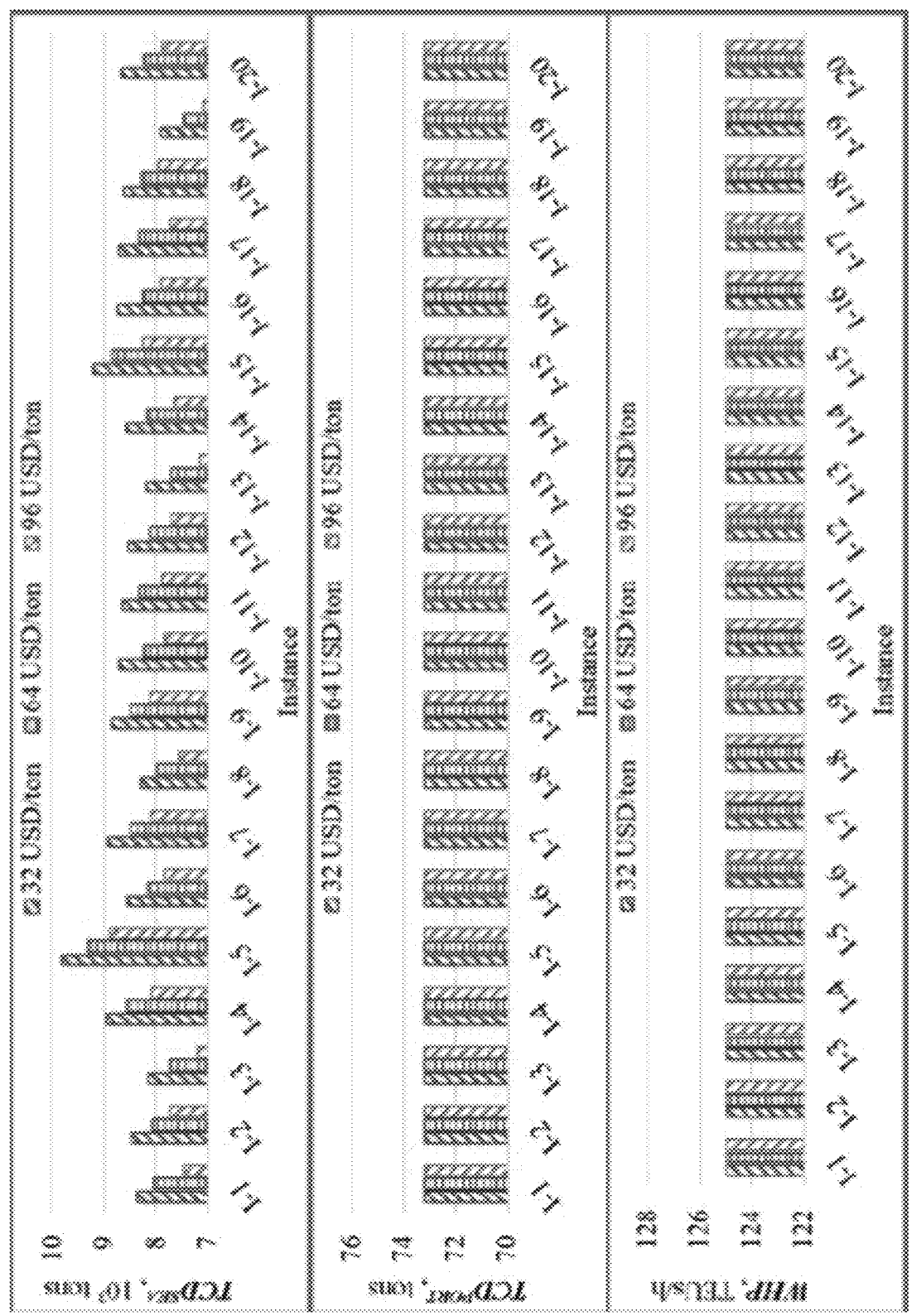
FIG. 9C depicts the unit $CO_2$ emission cost ($c^{CO_2}$) effects on vessel schedules.

Sensitivity of vessel schedules to the unit $CO_2$ emission cost. The fifth set of computational experiments aimed to evaluate the effects of changing the unit $CO_2$ emission cost ($c^{CO_2}$) on the design of vessel schedules. A total of three-unit $CO_2$ emission cost cases were evaluated: (a) $c^{CO_2}$=32 USD/ton; (b) $c^{CO_2}$=64 USD/ton; and (c) $c^{CO_2}$=96 USD/ton. The developed GMOA-VSP algorithm was launched for each one of the considered problem instances and unit $CO_2$ emission cost cases. Results of the performed analysis are presented in FIG. 9, where the following data were retrieved for the $F_2^*$ corner point: (1) number of vessels required for service of the EUM liner shipping route—Q; (2) average vessel sailing speed weighted by voyage leg length—WS; (3) total vessel sailing time—TST; (4) total vessel late arrival time at ports of call—TLT; (5) total amount of $CO_2$ emissions produced in sea—$TCD^{SEA}$; (6) total amount of $CO_2$ emissions produced at ports—$TCD^{PORT}$; and (7) average requested handling productivity weighted by the number of containers handled at ports—WHP. Note that the F1 vessel schedules were not affected with changes in the unit $CO_2$ emission cost, as the unit $CO_2$ emission cost is not a component of objective function $F_1$.

Throughout the numerical experiments it was found that an increasing unit $CO_2$ emission cost required the G6 alliance to decrease the vessel sailing speeds at the EUM liner shipping route to reduce the fuel consumption and the total amount of $CO_2$ emissions produced in sea. An increase in the unit $CO_2$ emission cost from 32 USD/ton to 96 USD/ton reduced the average weighted vessel sailing speed and total amount of $CO_2$ emissions produced in sea by 6.28% and 9.87% respectively. Therefore, the unit $CO_2$ emission cost (i.e., $CO_2$ tax) can serve as efficient mean in reducing the $CO_2$ emissions produced in sea and improving the environmental sustainability of liner shipping operations.

A reduction in the vessel sailing speed increased the total vessel sailing time by 6.86% and, hence, increased the total turnaround time of vessels. Due to increase in the total vessel turnaround time the G6 alliance was required to deploy on average 3.23% more vessels in order to guarantee the weekly service frequency at ports of the EUM liner shipping route. Similar to results from the unit fuel cost sensitivity analysis, an increasing unit $CO_2$ emission cost did not cause any changes in port operations. Specifically, the G6 alliance selected handling rates with the same handling productivities at ports. The latter finding can be justified by the fact that the total amount of $CO_2$ emissions produced at ports (on average ≈73.20 tons over the considered problem instances) is significantly smaller than the total amount of $CO_2$ emissions produced in sea (on average ≈8,649.60 tons over the considered problem instances). Results from the conducted numerical experiments also indicate that an increasing unit $CO_2$ emission cost increased the total vessel late arrival time to port of the EUM liner shipping route. The latter finding can be explained by the fact that reduction in the vessel sailing speeds caused violation of the vessel service TWs at ports of call. The total vessel late arrival time increased by 7.11 hours (or ≈42.47%) from increasing the unit $CO_2$ emission cost from 32 USD/ton to 96 USD/ton. It was found that the value of objective function $F_2$ could increase by up to 7.26% from changing the unit $CO_2$ emission cost from 32 USD/ton to 96 USD/ton.

Discussion

The multi-objective mathematical model for the vessel scheduling problem, discussed in this disclosure, demonstrates that the design of vessel schedules may significantly change depending on the goals the G6 alliance aims to achieve. Specifically, the numerical experiments show that the G6 alliance on average was required to increase the number of vessels by 3.25, decrease the vessel sailing speed by 30.8%, and reduce the average handling productivity at ports by 15.0% from reducing the total amount of $CO_2$ emissions produced in sea and at ports by 57.1% and 51.3% respectively. Furthermore, an efficient collaboration with marine container terminal operators may assist the G6 alliance with the design of cost-effective vessel schedules. It was found that the collaborative agreement, when both vessel service TWs and handling rates were negotiated between the G6 alliance and marine container terminal operations, might yield up to 6.0% and 24.9% cost savings as compared to the collaborative agreements, when either vessel handling rates or vessel service TWs were negotiated respectively.

Moreover, a reduction in the TW duration could increase the total route service cost components on average by up 16.9%. Numerical experiments also demonstrate that the vessel schedules were more sensitive to changes in the unit fuel cost as compared to changes in the unit $CO_2$ emission cost. An increasing unit fuel cost required the G6 alliance to reduce the average vessel sailing speed by 12.71%, while an increasing unit $CO_2$ emission cost caused reduction in the average vessel sailing speed by 6.28%. The latter finding can be also justified by the difference in marginal changes of the unit fuel and $CO_2$ emission costs (i.e., the unit fuel cost was changed from 300 USD/ton to 900 USD/ton, while the $CO_2$ emission cost was changed from 32 USD/ton to 96 USD/ton). Furthermore, it is necessary to underline that performance of the GMOA-VSP algorithm (in terms of the produced optimal vessel schedules and the computational time) is affected with selection of the upper bound interval for the conflicting objective functions, as the developed solution algorithm is based on the ε-constraint method.

Conclusion

Nowadays many liner shipping companies started consolidation in order to compete with the mega alliances and attract new customers. In order to avoid potential monetary losses, liner shipping companies must not only focus on efficient collaboration with their alliance partners, but also develop new strategies to design cost-effective vessel schedules. Some of decisions that have to be made by liner shipping companies throughout the design of vessel schedules are conflicting in their nature. However, the vessel scheduling models, presented in the literature to date, generally combine the conflicting objectives into one objective function, which aims to minimize the total route service cost. Such approach does not allow capturing the conflicting nature of certain route service cost components, which further causes limitations in the analysis of important tradeoffs. To avoid the latter shortcoming, this disclosure discussed a multi-objective mixed integer nonlinear optimization model for the vessel scheduling problem, which took into consideration all major route service cost components reported in the literature and separated them in two conflicting groups. The original nonlinear model was linearized by discretizing the vessel sailing speed reciprocal. The Global Multi-Objective Optimization Algorithm was developed to obtain the Pareto Front vessel schedules.

Numerical experiments were performed using the operational data, collected for the EUM liner shipping route. Results showcased that the G6 alliance, serving the EUM liner shipping route, might be required to make significant changes in the design of vessel schedules depending on the goals to be achieved. In order to improve the environmental sustainability of liner shipping operations and decrease the total amount of carbon dioxide emissions produced in sea and at ports by 57.1% and 51.3% respectively, the G6 alliance had to increase the number of vessels by 3.25, decrease the vessel sailing speed by 30.8%, and reduce the average handling productivity at ports by 15.0%. Moreover, negotiation of both vessel service time windows and handling rates between the G6 alliance and marine container terminal operators significantly reduced the total route service cost components as compared to the cases when either only vessel service handling rates or time windows were negotiated. It was found that a reduction in the duration of vessel service TWs could cause an increase in the total route service cost components by up to 16.9%. The numerical experiments also demonstrated that an increase in the unit fuel cost from 300 USD/ton to 900 USD/ton required the G6 alliance to reduce the average vessel sailing speed by 12.71%. Furthermore, the total amount of carbon dioxide emissions produced in sea decreased by 9.87% due to an increase in the unit carbon dioxide emission cost from 32 USD/ton to 96 USD/ton.

Therefore, the current multi-objective mathematical model and the developed solution algorithm may facilitate the design of cost-effective vessel schedules and assist liner shipping companies with the analysis of important tradeoffs between the conflicting objectives.

Applications and Improvements

Certain embodiments of the claimed subject matter provide specific applications and ways of automating the creation of a vessel schedules that incorporates a multi-objective mixed integer nonlinear optimization model incorporating elements form multiple sources in order to solve a problem faced by shipping company consolidations.

Certain embodiments of the claimed subject matter provide improvements to the environmental sustainability of liner shipping operations and decreases the total amount of $CO_2$ emissions produced by liners at sea and at ports and reduced the average handling productivity at ports. Certain embodiments of the claimed subject matter provide improvements reduce the total route service costs components.

Certain embodiments provide a means for configuring memory to store the automated vessel schedule creation using the methods described herein, providing a specific improvement in the memory storage and retrieval when creating multi-objective mixed integer nonlinear optimization of vessel schedules.

Hardware and Software Infrastructure Examples

The present invention may be embodied on various computing platforms that perform actions responsive to software-based instructions and most particularly on touch-screen portable devices. The following provides an antecedent basis for the information technology that may be utilized to enable the invention.

The computer readable medium described in the claims below may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any non-transitory, tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, radio frequency, etc., or any suitable combination of the foregoing. Computer program code for carrying out operations for aspects of the present invention may be written in any combination of one or more programming languages, including an object-oriented programming language such as Java, C#, C++, Visual Basic or the like and conventional procedural programming languages, such as the "C" programming language or similar programming languages.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or otherdevices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It should be noted that when referenced, an "end-user" is an operator of the software as opposed to a developer or author who modifies the underlying source code of the software. For security purposes, authentication means identifying the particular user while authorization defines what procedures and functions that user is permitted to execute.

Example 2: Detailed Analysis of the Vessel Scheduling Literature

Figure 10:
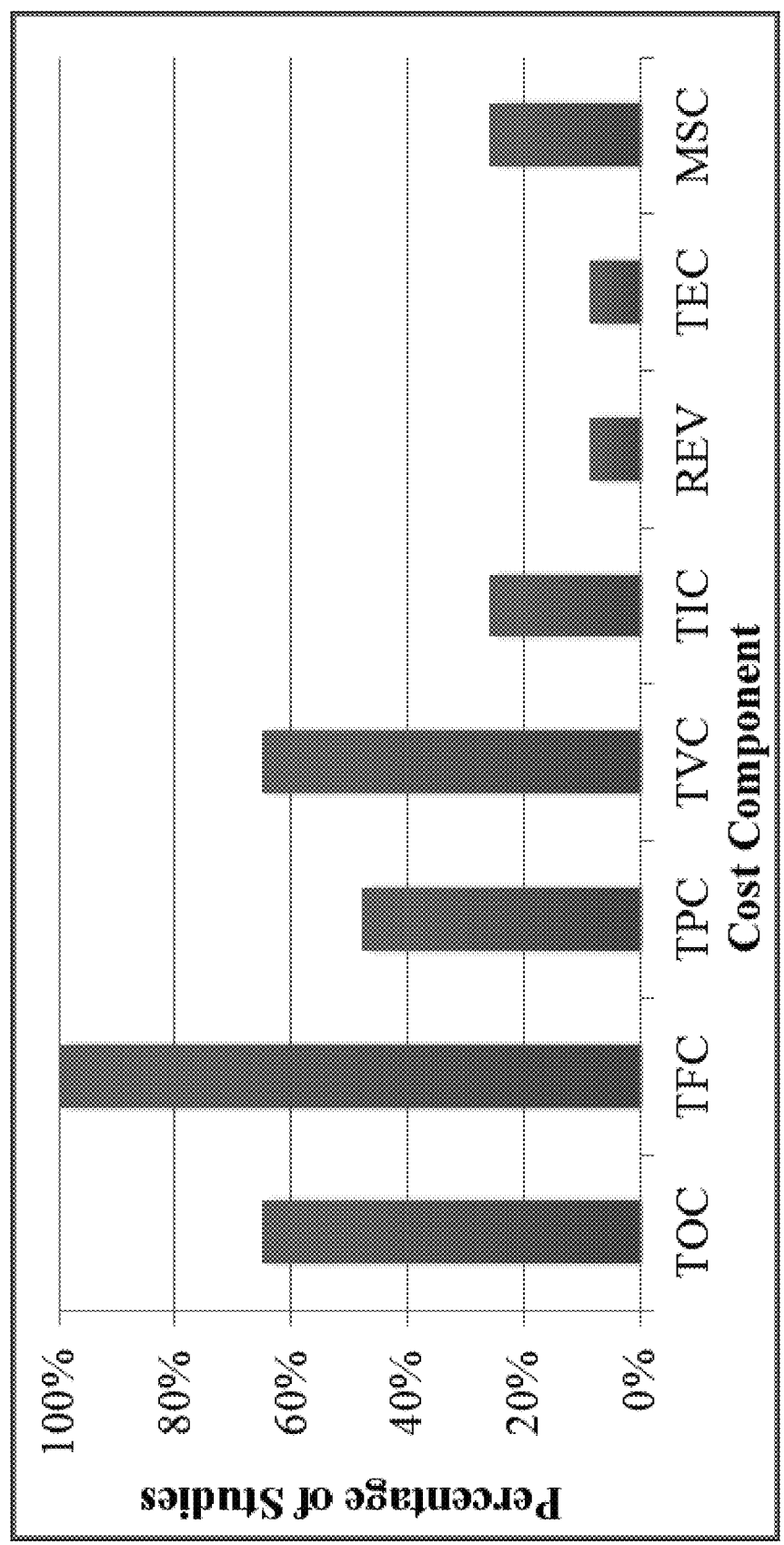
FIG. 10 depicts the distribution of the vessel scheduling studies by the considered cost components.

The main features of the collected vessels scheduling studies are summarized in Table A1, including the following information: (i) author(s); (ii) year; (iii) objective considered; (iv) objective components; (v) solution approach adopted; and (vi) notes/important considerations. A review of the vessel scheduling literature indicates that the most common objective of the proposed models is to minimize the total route service cost. Only Chuang et al. (2010) and Fagerholt and Psaraftis (2015) presented mathematical models, aiming to maximize the total profit, where the total profit was estimated as a difference between the total revenue generated and the total route service cost. The following components of the total route service cost were considered in the vessel scheduling models presented in the literature: (1) total vessel weekly operational cost—TOC; (2) total fuel consumption cost—TFC; (3) total port handling cost—TPC; (4) total service TW violation cost—TVC; (5) total container inventory cost—TIC; (6) total revenue—REV; (7) total vessel emission cost—TEC; and (8) miscellaneous costs—MSC. The distribution of collected vessel scheduling studies by the considered cost components is presented in FIG. 10.

TABLE A1

Vessel scheduling literature summary.

| a/a | Author(s) | Year | Objective | Objective Components | Solution Approach | Notes/Important Considerations |
|---|---|---|---|---|---|---|
| 1 | Fagerholt | 2001 | Minimize the total cost | TOC; TFC; TPC; TVC | Heuristic | soft service TWs |
| 2 | Chuang et al. | 2010 | Maximize the total profit | REV; TOC; TFC; TPC | Heuristic | uncertainty in port times, sailing times, and demand |
| 3 | Ronen | 2011 | Minimize the total cost | TOC; TFC | Analytical method | sailing speed optimization |
| 4 | Qi & Song | 2012 | Minimize the total cost | TFC; TVC | Sample average approximation | uncertainty in port times |
| 5 | Wang & Meng | 2012a | Minimize the total cost | TOC; TFC | Cutting-plane algorithm | uncertainty in port and sailing times |
| 6 | Wang & Meng | 2012c | Minimize the total cost | TOC; TFC; TVC | Sample average approximation | uncertainty in port waiting and handling times |
| 7 | Brouer et al. | 2013 | Minimize the total cost | TOC; TFC; TPC; TVC; MSC | CPLEX | consideration of disruptions |
| 8 | Kontovas | 2014 | Minimize the total cost | TOC; TFC; TPC; TEC; MSC | N/A | emission modeling approaches |
| 9 | Wang et al. | 2014 | Minimize the total cost | TOC; TFC; TIC | Iterative optimization algorithm | multiple service TWs |
| 10 | Alhrabi et al. | 2015 | Minimize the total cost | TOC; TFC; TVC | Iterative optimization algorithm | multiple service TWs |
| 11 | Dulebenets | 2015a | Minimize the total cost | TOC; TFC; TPC; TVC | Heuristic | Memetic algorithm to solve the problem |
| 12 | Dulebenets | 2015b | Minimize the total cost | TOC; TFC; TPC; TVC; MSC | CPLEX | multiple port handling rates |
| 13 | Dulebenets et al. | 2015 | Minimize the total cost | TOC; TFC; TPC; TVC; TIC | CPLEX | emission constraints |
| 14 | Fagerholt & Psaraftis | 2015 | Maximize the total profit | REV; TFC | Analytical method | low sulphur fuel within ECAs |
| 15 | Fagerholt et al. | 2015 | Minimize the total cost | TFC | Xpress-MP | low sulphur fuel within ECAs |
| 16 | Li et al. | 2015 | Minimize the total cost | TFC; TVC | Dynamic programming | consideration of disruptions |
| 17 | Li et al. | 2016 | Minimize the total cost | TFC; TPC; TVC; MSC | Dynamic programming | consideration of disruptions |
| 18 | Song et al. | 2015 | Minimize the annual vessel operational cost; Minimize the schedule unreliability; Minimize the total carbon dioxide emissions | TFC; TVC; TEC; MSC | Heuristic | uncertainty in port times |
| 19 | Wang et al. | 2015 | Minimize the total cost | TFC; TIC | Iterative optimization algorithm | perceived value of container transit times |
| 20 | Dulebenets | 2016a | Minimize the total cost | TOC; TFC; TPC; TVC; TIC | BARON | heterogeneous vessel fleet |
| 21 | Dulebenets | 2016b | Minimize the total cost | TOC; TFC; TPC; TVC; TIC | Iterative optimization algorithm | low sulphur fuel within ECAs |

TABLE A1-continued

Vessel scheduling literature summary.

| a/a | Author(s) | Year | Objective | Objective Components | Solution Approach | Notes/Important Considerations |
|---|---|---|---|---|---|---|
| 22 | Aydin et al. | 2017 | Minimize the total cost | TFC; TVC | Dynamic programming | uncertainty in port times |
| 23 | Dulebenets & Ozguven | 2017 | Minimize the total cost | TOC; TFC; TPC; TVC; TIC; MSC | CPLEX | transport of perishable assets |

Notes:
TOC—total vessel weekly operational cost; TFC—total fuel consumption cost; TPC—total port handling cost; TVC—total cost associated with violation of service TWs; TIC—total container inventory cost; REV—total revenue; TEC—total vessel emission cost; MSC—miscellaneous costs; ECA—"Emission Control Area".

Example 3: Vessel Schedule Example

Figure 11:
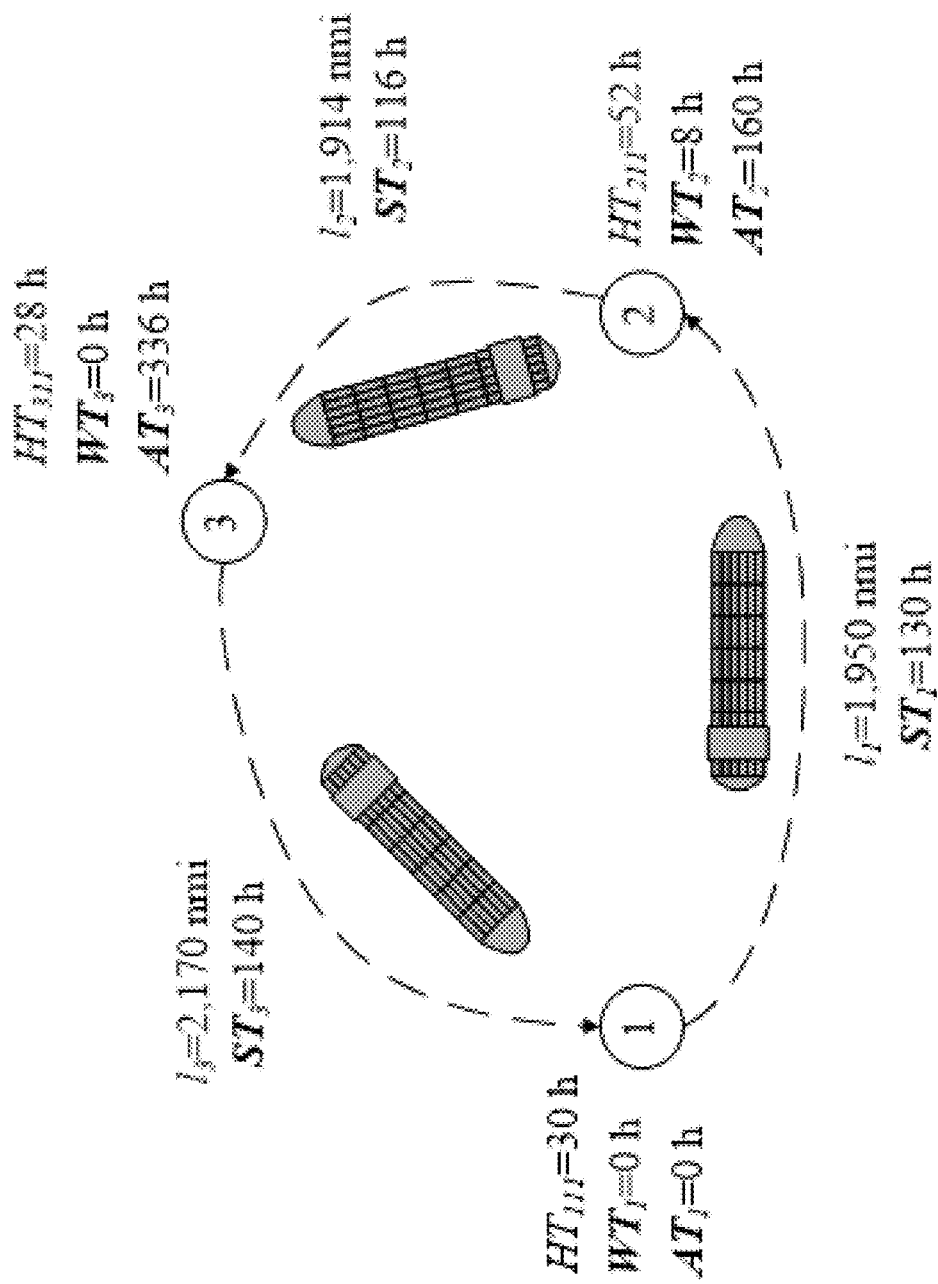
FIG. 11 depicts an example of the vessel schedule generated by the MOVSP mathematical model.

Consider a liner shipping route, which consists of three ports of call and is illustrated in FIG. 11. Assume that a vessel arrives at port "1" at time $AT_1=0$ h. Then, based on the contractual agreement with the marine container terminal operator at port "1", the vessel is being served during TW "1" under handling rate "1" for $HT_{111}=30$ h and leaves port "1" at time $DT_1=0+30=30$ h. Next, the vessel sails from port "1" to port "2" for $ST_1=130$ h (at sailing speed of $$v_1 = \frac{l_1}{ST_1} = \frac{1,950}{130} = 15.0 \text{ knots}),$$

arrives at port "2" at time $AT_2=30+130=160$ h, and has to wait for $WT_2=8$ h before being served during the selected service TW (i.e., the vessel arrived at port "2" before the start of the selected service TW—$TW_{21}^S=168$ h; and therefore, it was required to wait in the dedicated waiting area of port "2" until the start of the service TW: $WT_2=TW_{21}^S-AT_1-HT_{111}x_{111}-ST_1=168-0-30-130=8$ h). Then, the vessel is served at TW "1" under handling rate "1" for $HT_{211}=52$ h and leaves port "2" at time $DT_2=160+8+52=220$ h. Next, the vessel sails to port "3" for $ST_2=116$ h (at sailing speed of $$v_2 = \frac{l_2}{ST_2} = \frac{1,914}{116} = 16.5 \text{ knots})$$

and arrives at port "3" at time $AT_3=220+116=336$ h, where it is being served during TW "1" under handling rate "1" for $HT_{311}=28$ h. The vessel leaves port "3" at time $DT_3=336+28=364$ h, sails to port "1" for $ST_3=140$ h (at sailing speed of $$v_3 = \frac{l_3}{ST_3} = \frac{2,170}{140} = 15.5 \text{ knots}),$$

and returns to port "1" at time $AT_1=364+140=504$ h. The vessel schedule details for the considered example are presented in Table B1.

TABLE B1

Example vessel schedule details.

| Port p | $AT_p$-vessel arrival time (h) | $WT_p$-vessel waiting time (h) | $HT_{pth}x_{pth}$- vessel handling time (h) | $ST_p$-vessel sailing time to the next port (h) |
|---|---|---|---|---|
| [1] | 0 | 0 | 30 | 130 |
| [2] | 160 | 8 | 52 | 116 |
| [3] | 336 | 0 | 28 | 140 |

The total vessel turnaround time (TT) for the considered liner shipping route will be $TT=30+130+8+52+116+28+140=504$ h. In order to provide the weekly service frequency, the liner shipping company needs to deploy $$Q = \frac{TT}{168} = \frac{504}{168} = 3 \text{ vessels},$$

where term "168"—is the total amount of hours in a week. Furthermore, the returning time at port "1" (i.e., $AT_1=504$ h) should be adjusted as $AT_1=DT_3+ST_3-168Q=364+140-168\cdot 3=0$ h. In other words, variable $AT_1$ can take only one value ($AT_1=0$ h not $AT_1=504$ h). Therefore, the total vessel turnaround time term (168Q) is required in equations (22) and (26) of the MOVSP mathematical model to capture a round trip journey of the first vessel in the fleet.

Figure 12:
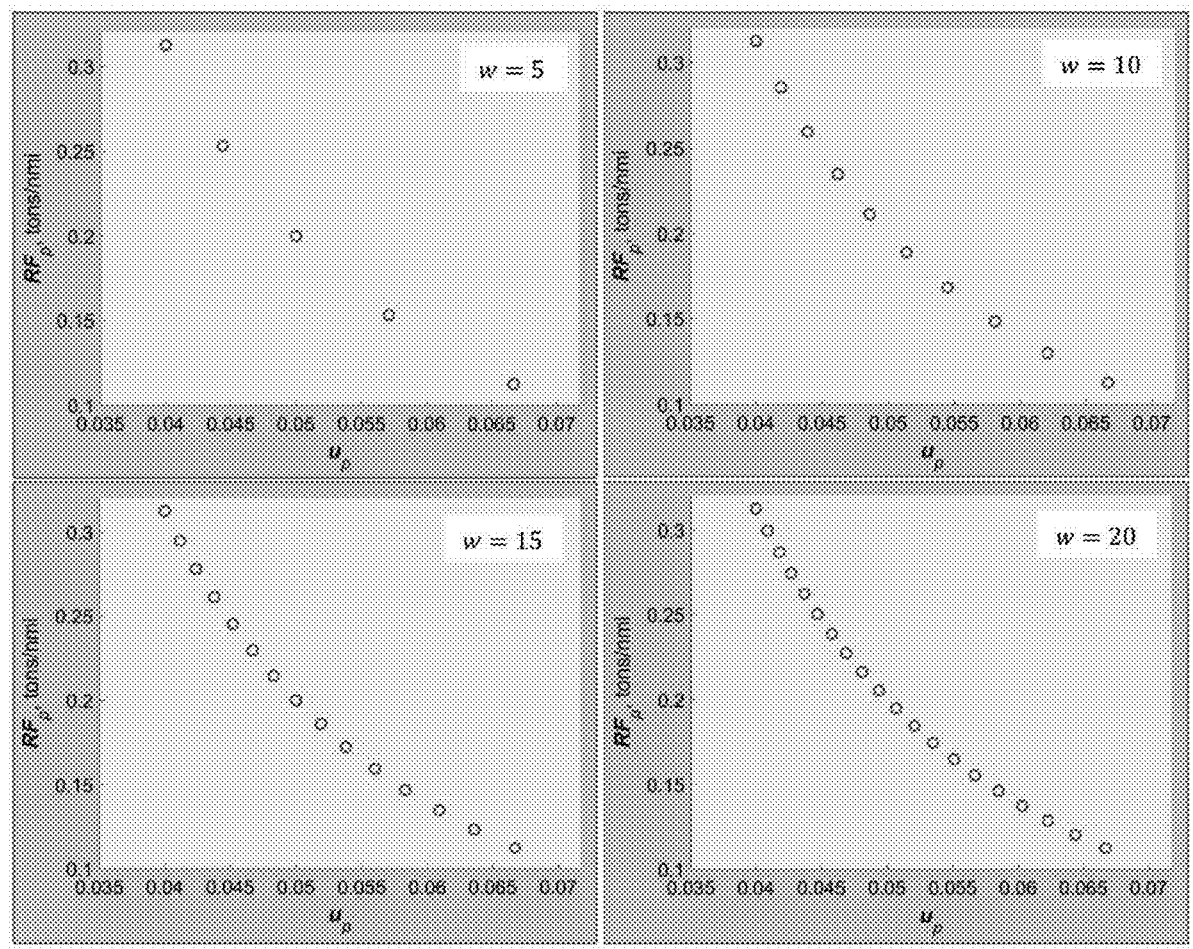
FIG. 12 depicts fuel consumption function examples for different discretization levels.

Example 4: Fuel Consumption Function Examples for Different Discretization Levels Examples of the fuel consumption function for different vessel sailing speed reciprocal discretization levels (w=5, 10, 15, 20) are presented in FIG. 12. The vessel sailing speed was assumed to vary from $v^{min}=15$ knots to $v^{max}=25$ knots (Wang and Meng, 2012a-c); hence, $$\frac{1}{25} \leq u_p \leq \frac{1}{15} \forall p \in P.$$

It was observed that an increasing discretization level improves accuracy of the approximation for the fuel consumption function.

Example 5: Identification of the Vessel Schedules with the Minimum Total Route Service Cost Another important feature of the developed GMOA-VSP algorithm is its capability to produce vessel schedules with the minimum total route service cost (i.e., where both conflicting objective functions $F_1$ and $F_2$ are combined into one objective function $F=F_1+F_2$). The minimum total route service cost vessel schedules will be of interest to liner shipping companies, along with PFs that are produced by the GMOA-VSP algorithm for the analysis of important tradeoffs between the conflicting objectives. The procedure for identification of the minimum total route service cost vessel schedules (MSCVSIP), deployed within the GMOA-VSP algorithm, is presented in Pseudocode 2 (PS-2).

---

PS-2. Minimum Service Cost Vessel Schedule Identification Procedure (MSCVSIP)

---

MSCVSIP(PF,VS)
in: PF - cost components for the PF vessel schedules; VS - the PF vessel schedules
out: VS* - the minimum service cost vessel schedule
  1: $F_1 \leftarrow$ Retrieve-F1(PF)     ◁ Retrieve values of objective function $F_1$ from the PF
  2: $F_2 \leftarrow$ Retrieve-F2(PF)     ◁ Retrieve values of objective function $F_2$ from the PF
  3: $F \leftarrow |F_1|$     ◁ Initialize the data structure for objective function F
  4: $i \leftarrow 1$
  5: while $i \leq |PF|$ do
  6:     $F_i \leftarrow F_{1i} + F_{2i}$     ◁ Estimate objective function F
  7:     $i \leftarrow i + 1$
  8: end while
  9: $VS^* \leftarrow \mathrm{argmin}_{VS}(F)$     ◁ Determine the vessel schedule with minimum F
10: return VS*

---

Figure 13A:
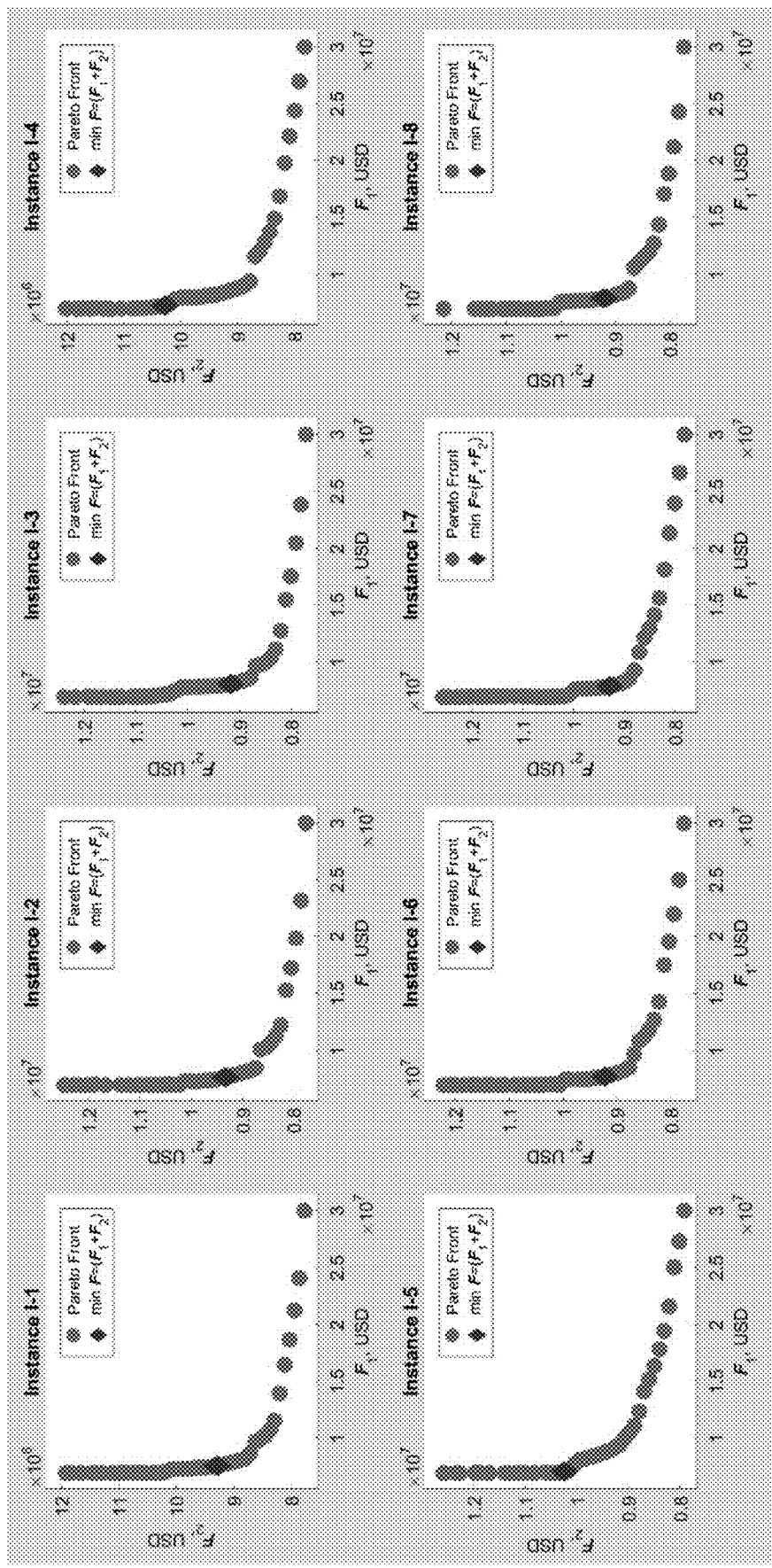
FIG. 13A depicts the identification of the vessel schedules with the minimum total route service cost for the considered problem instances.
Figure 13B:
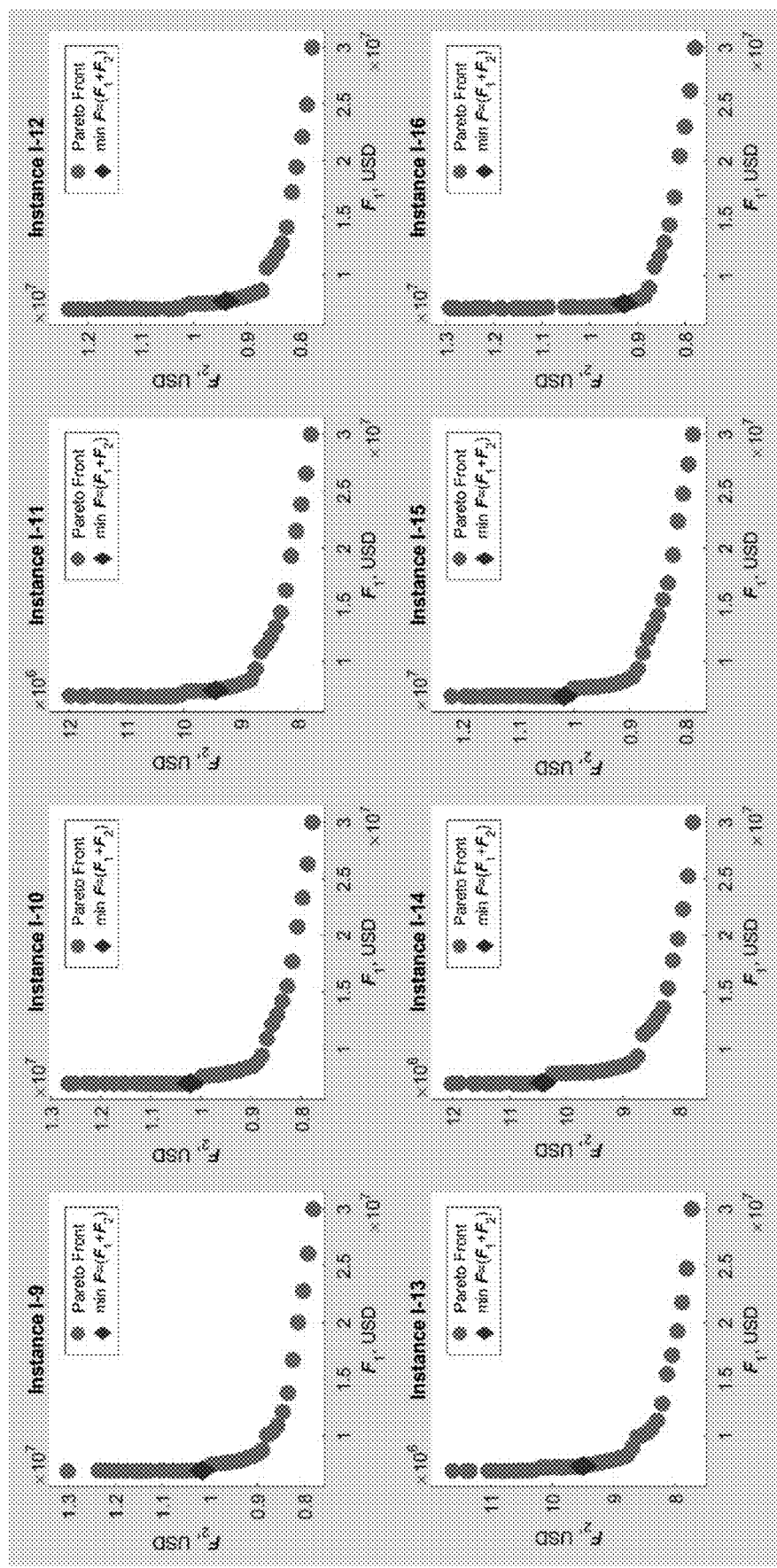
FIG. 13B depicts the identification of the vessel schedules with the minimum total route service cost for the considered problem instances.
Figure 13C:
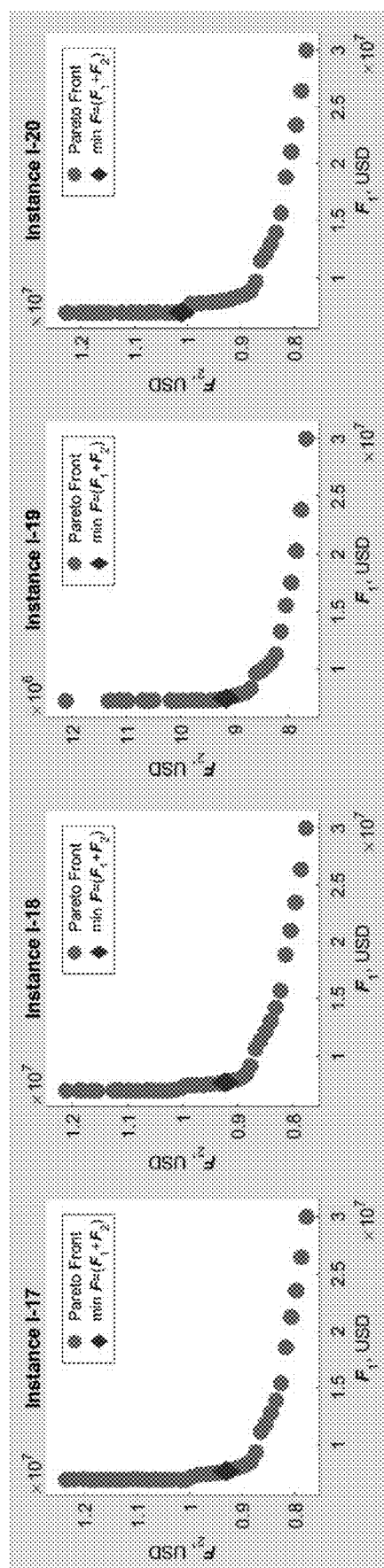
FIG. 13C depicts the identification of the vessel schedules with the minimum total route service cost for the considered problem instances.

In step 1, the values of objective function $F_1$ are retrieved from the PF, while the values of objective function $F_2$ are retrieved from the PF in step 2. In step 3, the data structure for objective function F is initialized. Then, MSCVSIP starts an iterative procedure (steps 5-8), where the F objective function value is estimated as a summation of the $F_1$ and $F_2$ objective function values (step 6). The iterative process is terminated once the F objective function value is calculated for each PF point. After that, the minimum total route service cost vessel schedule is identified (step 9). The vessel schedules with the minimum total route service cost were determined using the GMOA-VSP algorithm for each one of the generated problem instances, and results are presented in FIGS. 13A-13C. Note that the accuracy of the minimum total route service cost vessel schedule is affected with the upper bound interval ($\varepsilon$) selection and the desired number of PF points ($N_{PF}$). An increase in the desired number of PF points (which will require reduction of the upper bound interval selection) will improve accuracy of the produced minimum total route service cost vessel schedule.

REFERENCES

1. Alhrabi, A., Wang, S., Davy, P., 2015. Schedule design for sustainable container supply chain networks with port time windows. Advanced Engineering Informatics 29, 322-331.
2. American Shipper, 2015. Best practices and collaboration for curbing port congestion. White paper.
3. Aydin, N., Lee., H., Mansouri, S., 2017. Speed optimization and bunkering in liner shipping in the presence of uncertain service times and time windows at ports. European Journal of Operational Research 259, 143-154.
4. Bilgen, B., Ozkarahan, I., 2007. A mixed-integer linear programming model for bulk grain blending and shipping. International Journal of Production Economics 107, 555-571.
5. Brouer, B., Dirksen, J., Pisinger, D., Plum, C., Vaaben, B., 2013. The Vessel Schedule Recovery Problem (VSRP)—A MIP model for handling disruptions in liner shipping. European Journal of Operational Research 224, 362-374.
6. Chuang, T., Lin, C., Kung, J., Lin, M, 2010. Planning the route of container ships: A fuzzy genetic approach. Expert Systems with Applications 37, 2948-2956.
7. Coello Coello, C., Lamont, G., Van Veldhuizen, D., 2007. Evolutionary algorithms for solving multi-objective problems. Springer-Verlag, 2nd Ed.
8. Deb, K., Pratap, A., Agarwal, S., Meyarivan, T., 2002. A fast and elitist multiobjective genetic algorithm: NSGA-II. IEEE Transactions on Evolutionary Computation 6, 182-197.
9. Du, Y., Chen, Q., Quan, X., Long, L., Fung, R, 2011. Berth allocation considering fuel consumption and vessel emissions. Transportation Research Part E 47, 1021-1037.
10. Dulebenets, M. A., 2015a. Bunker consumption optimization in liner shipping: A metaheuristic approach. International Journal on Recent and Innovation Trends in Computing and Communication 3, 3766-3776.
11. Dulebenets, M. A., 2015b. Models and solution algorithms for improving operations in marine transportation. Dissertation, the University of Memphis, Memphis, TN
12. Dulebenets, M. A., 2016a. The vessel scheduling problem in a liner shipping route with heterogeneous vessel fleet. International Journal of Civil Engineering, 1-14.
13. Dulebenets, M. A., 2016b. Advantages and disadvantages from enforcing emission restrictions within emission control areas. Maritime Business Review 1, 107-132.
14. Dulebenets, M. A., Golias, M. M., Mishra, S., 2015. The green vessel schedule design problem: Consideration of emissions constraints. Energy Systems, 1-23.
15. Dulebenets, M. A., Ozguven, E. E., 2017. Vessel scheduling in liner shipping: Modeling transport of perishable assets. International Journal of Production Economics 184, 141-156.
16. EPA, 2017. Causes of Climate Change. https://www3.epa.gov/climatechange/science/causes.html. Accessed 6 Feb. 2017.
17. Fagerholt, K., 2001. Ship scheduling with soft time windows: An optimization based approach. European Journal of Operational Research 131, 559-571.
18. Fagerholt, K., Gausel, N. T., Rakke, J. G., Psaraftis, H., 2015. Maritime routing and speed optimization with emission control areas. Transportation Research Part C 52, 57-73.

19. Fagerholt, K., Psaraftis, H., 2015. On two speed optimization problems for ships that sail in and out of emission control areas. Transportation Research Part D 39, 56-64.
20. GAMS, 2017. GAMS home page. Available: https://www.gams.com/. Accessed 28 Jan. 2017.
21. IContainers, 2017. Shipping alliances: New mergers. http://www.icontainers.com/us/2016/08/11/new-alliances-shipping-line-mergers/. Accessed 5 Feb. 2017.
22. IMO, 2014. Prevention of GHG emissions from ships. Third IMO GHG Disclosure 2014-Final Report.
23. Journal of Commerce, 2015. Container shipping industry faces potential wave of consolidation. http://www.joc.com. Accessed 5 Feb. 2017.
24. Journal of Commerce, 2016a. Japanese shipping merger to create new major liner. http://www.joc.com. Accessed 6 Feb. 2017.
25. Journal of Commerce, 2016b. Hanjin Shipping bankruptcy timeline: How did we get here? http://www.joc.com. Accessed 6 Feb. 2017.
26. Kontovas, C., 2014. The Green Ship Routing and Scheduling Problem (GSRSP): A conceptual approach. Transportation Research Part D 31, 61-69.
27. Li, C., Qi, X., Lee, C., 2015. Disruption recovery for a vessel in liner shipping. Transportation Science 49, 900-921.
28. Li, C., Qi, X., Song, D., 2016. Real-time schedule recovery in liner shipping service with regular uncertainties and disruption events. Transportation Research Part B 93, 762-788.
29. Mansouri, S., Lee, H., Aluko, O., 2015. Multi-objective decision support to enhance environmental sustainability in maritime shipping: A review and future directions. Transportation Research Part E 78, 3-18.
30. Mathworks, 2016. Release 2016a. http://www.mathworks.com/. Accessed 25 Jan. 2017.
31. Meng, Q., Wang, S., Andersson, H., Thun, K., 2014. Containership routing and scheduling in liner shipping: Overview and future research directions. Transportation Science 48, 265-280.
32. OOCL, 2017. Schedule by Service Loops, Asia-Europe (AET), Asia-Mediterranean Express Service (EUM). http://www.oocl.com. Accessed 10 Jan. 2017.
33. Ports.com, 2017. Sea route & distance. http://ports.com/sea-route. Accessed 11 Jan. 2017.
34. Psaraftis, H., Kontovas, C., 2013. Speed models for energy-efficient maritime transportation: A taxonomy and survey. Transportation Research Part C 26, 331-351.
35. Ronen, D., 2011. The effect of oil price on containership speed and fleet size. Journal of the Operational Research Society 62, 211-216.
36. Qi, X., Song, D, 2012. Minimizing fuel emissions by optimizing vessel schedules in liner shipping with uncertain port times. Transportation Research Part E 48, 863-880.
37. Schroten, A., Van Essen, H., Anthes, R., 2011. External Cost Calculator—Methodology report. CE Delft and IVE mbH.
38. Song, D., Li, D., Drake, P., 2015. Multi-objective optimization for planning liner shipping service with uncertain port times. Transportation Research Part E 84, 1-22.
39. The Port Authority of New York and New Jersey, 2016. Marine Terminal Tariffs. http://www.panynj.gov/port/tariffs.html. Accessed 10 May 2016.
40. Tran, N., Haasis, H., 2017. An empirical disclosure of fleet expansion and growth of ship size in container liner shipping. International Journal of Production Economics 159, 241-253.
41. Tran, N., Haasis, H., Buer, T., 2016. Container shipping route design incorporating the costs of shipping, inland/feeder transport, inventory and $CO_2$ emission. Maritime Economics & Logistics, 1-28.
42. UNCTAD, 2016. Review of Maritime Transport 2016. United Nations Conference on Trade and Development, New York and Geneva.
43. Wang, S., Alharbi, A., Davy, P., 2014. Liner ship route schedule design with port time windows. Transportation Research Part C 41, 1-17.
44. Wang, S., Meng, Q, 2012a. Liner ship route schedule design with sea contingency time and port time uncertainty. Transportation Research Part B 46, 615-633.
45. Wang, S., Meng, Q, 2012b. Sailing speed optimization for container ships in a liner shipping network. Transportation Research Part E 48, 701-714.
46. Wang, S., Meng, Q., 2012c. Robust schedule design for liner shipping services. Transportation Research Part E 48, 1093-1106.
47. Wang, S., Meng, Q., Liu, Z., 2013a. Bunker consumption optimization methods in shipping: A critical review and extensions. Transportation Research Part E 53, 49-62.
48. Wang, S., Meng, Q., Liu, Z., 2013b. A note on "Berth allocation considering fuel consumption and vessel emissions". Transportation Research Part E 49, 48-54.
49. Wang, S., Qu, X., Yang, Y., 2015. Estimation of the perceived value of transit time for containerized cargoes. Transportation Research Part A 78, 298-308.
50. World Bank, 2016. Cost to import (US$ per container). http://data.worldbank.org/indicator/IC.IMP.COST.CD. Accessed 10 Dec. 2016.
51. World Shipping Council, 2015. Some observations on port congestion, vessel size and vessel sharing agreements. http://www.worldshipping.org. Accessed 15 Dec. 2016.
52. Yang, C., Marlow, P., Lu, C., 2009. Assessing resources, logistics service capabilities, innovation capabilities and the performance of container shipping services in Taiwan. International Journal of Production Economics 122, 4-20.
53. Zampelli, S., Vergados, Y., Schaeren, R., Dullaert, W., Raa, B., 2014. The berth allocation and quay crane assignment problem using a CP approach. Principles and Practice of Constraint Programming, Springer Berlin Heidelberg, 880-896.
54. Zhen, L., Shen, T., Wang, S., Yu, S., 2016. Models on ship scheduling in transshipment hubs with considering bunker cost. International Journal of Production Economics 173, 111-121.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

The advantages set forth above, and those made apparent from the foregoing description, are efficiently attained. While the disclosure is susceptible to various modifications and implementation in alternative forms, specific embodiments have been shown by way of non-limiting example in the drawings and have been described in detail herein. Since certain changes may be made in the above construction without departing from the scope of the instant application, it is intended that all matters contained in the foregoing description or shown in the accompanying drawings shall be interpreted as illustrative and not in a limiting sense.

The disclosure is not intended to be limited to the particular forms disclosed. Rather, the disclosure is to cover all modifications, equivalents, and alternatives falling within the scope of the disclosure as defined by the following appended claims and their legal equivalents.

Without further elaboration, it is believed that one skilled in the art can use the preceding description to utilize the present disclosure to its fullest extent. The examples and embodiments disclosed herein are to be construed as merely illustrative and exemplary and not a limitation of the scope of the present disclosure in any way. It will be apparent to those having skill in the art, and having the benefit of this disclosure, that changes may be made to the details of the above-described embodiments without departing from the underlying principles of the disclosure herein.

It is also to be understood that the following claims are intended to cover all of the generic and specific features of the invention herein described, and all statements of the scope of the invention that, as a matter of language, might be said to fall therebetween.

What is claimed is:

1. A method of optimizing vessel schedule development and delivery for liner shipping vessels while in transit, the method comprising:
   providing a computing device with a graphical user interface and a processor;
   creating, via the processor of the computing device, a first set of objectives from a first conflict group and a second set of objectives from a second conflict group to improve scheduling for a singular liner vessel, wherein the first set of objectives conflicts with the second set of objectives for the singular liner vessel, the first set of objectives including a total vessel weekly operation cost, a total container inventory cost, and a total vessel late arrival cost, the second set of objectives including a total fuel consumption cost, a total port handling cost, and a total cost of carbon dioxide emissions produced at sea and in ports of call;
   generating, via the processor of the computing device, for the singular liner vessel, an optimal vessel schedule using a multi-objective mixed integer nonlinear optimization model using the first set of objectives and the second set of objectives by:
      calculating a multi-objective vessel scheduling problem model based on a conflicting summation value associated with each of the first set of objectives and the second set of objectives;
      linearizing the multi-objective vessel scheduling problem model to generate a linearized multi-objective vessel scheduling problem model by discretizing, for each possible vessel sailing speed for the singular liner vessel, a vessel sailing speed reciprocal value, and calculating a fuel consumption for each vessel sailing speed reciprocal value;
      solving the linearized multi-objective vessel scheduling problem model via a global multi-objective optimization algorithm by minimizing the associated summation value of the second set of objectives and setting an upper limit on the associated summation value of the first set of objectives, thereby generating a solution for the multi-objective mixed integer nonlinear optimization model;
   comparing, via the processor of the computing device, at least one set of objectives of the generated optimal vessel schedule to at least one set of objectives of an original vessel schedule; and
   automatically delivering, via the processor of the computing device, the optimal vessel schedule to the graphic user interface associated with the computing device by:
      based on a determination that the multi-objective mixed integer nonlinear optimization model minimizes monetary losses in operating the singular liner vessel, automatically adjusting, while in transit, in real-time, a speed, an amount of ports to be visited, and a course path of the singular liner vessel according to the mixed integer nonlinear optimization model; and
      based on a determination that the multi-objective mixed integer nonlinear optimization model does not minimize monetary losses in operating the singular liner vessel, automatically maintaining, while in transit, in real-time, a speed, an amount of ports to be visited, and a course path of the singular liner vessel.

2. The method of claim 1, wherein the first set of objectives further comprises a negotiation of arrival time windows.

3. The method of claim 1, wherein the first set of objectives is weighted differently than the second set of objectives.

4. The method of claim 1, further comprising retrieving an environmental variable which has an impact on the optimal vessel schedule, and wherein the environmental variable is delivered to the processor in the computer which automatically adjusts the optimal vessel schedule based on the impact of the environmental variable.

5. The method of claim 4, wherein the environmental variable is selected from the group consisting of: weather, crew efficiency, and fuel cost.

6. A liner shipping vessel optimization system for automatically developing and delivering an optimal vessel schedule for liner shipping vessels while in transit to a graphic user interface associated with a computing device, the liner shipping vessel optimization system comprising:
   the computing device having a processor; and
   a non-transitory computer-readable medium operably coupled to the processor, the computer-readable medium having computer-readable instructions stored thereon that, when executed by the processor, cause the liner shipping vessel optimization system to automatically deliver the optimal vessel schedule to the graphical user interface associated with the computing device by executing instructions comprising:
      creating, via the processor of the computing device, a first set of objectives from a first conflict group and a second set of objectives from a second conflict group to improve scheduling for the singular liner vessel, wherein the first set of objectives conflicts with the second set of objectives for the singular liner vessel, the first set of objectives including a total vessel weekly operation cost, a total container inventory cost, and a total vessel late arrival cost, the second set of objectives including a total fuel consumption cost, a total port handling cost, and a total cost of carbon dioxide emissions produced at sea and in ports of call;
      generating, via the processor of the computing device, for the singular liner vessel, an optimal vessel schedule using a multi-objective mixed integer nonlinear optimization model using the first set of objectives and the second set of objectives by:

calculating a multi-objective vessel scheduling problem model based on a conflicting summation value associated with each of the first set of objectives and the second set of objectives;

linearizing the multi-objective vessel scheduling problem model to generate a linearized multi-objective vessel scheduling problem model by discretizing, for each possible vessel sailing speed for the singular liner vessel, a vessel sailing speed reciprocal value, and calculating a fuel consumption for each vessel sailing speed reciprocal value;

solving the linearized multi-objective vessel scheduling problem model via a global multi-objective optimization algorithm by minimizing the associated summation value of the second set of objectives and setting an upper limit on the associated summation value of the first set of objectives, thereby generating the multi-objective mixed integer nonlinear optimization model;

comparing, via the processor of the computing device, at least one set of objectives of the generated optimal vessel schedule to at least one set of objectives of an original vessel schedule; and automatically delivering, via the processor of the computing device, the optimal vessel schedule to the graphic user interface associated with the computing device by:

based on a determination that the multi-objective mixed integer nonlinear optimization model minimizes monetary losses in operating the singular liner vessel, automatically adjusting, while in transit, in real-time, a speed, an amount of ports to be visited, and a course path of the singular liner vessel according to the mixed integer nonlinear optimization model; and based on a determination that the multi-objective mixed integer nonlinear optimization model does not minimize monetary losses in operating the singular liner vessel, while in transit, in real-time, a speed, an amount of ports to be visited, and a course path of the singular liner vessel.

7. A system for optimizing vessel schedule development and delivery in liner shipping, where the considered objectives a singular liner vessel are conflicting in their nature, the system comprising:

a computing device with a graphical user interface and a processor;

a first set of objectives to improve scheduling for a singular liner vessel, the first set of objectives conflicting with a second set of objectives for the singular liner vessel, the conflicting first and seconds sets of objectives configured to be delivered to the computing device via the processor, the first set of objectives including a total vessel weekly operation cost, a total container inventory cost, and a total vessel late arrival cost, the second set of objectives including a total fuel consumption cost, a total port handling cost, and a total cost of carbon dioxide emissions produced at sea and in ports of call;

an optimal vessel schedule for the singular liner vessel determined using a multi-objective mixed integer nonlinear optimization model executed by the processor in the computer using the objectives, the optimal vessel schedule configured to be delivered to the graphical user interface, the multi-objective mixed integer nonlinear optimization model including:

calculating a multi-objective vessel scheduling problem model based on a conflicting summation value associated with each of the first set of objectives and the second set of objectives;

linearizing the multi-objective vessel scheduling problem model to generate a linearized multi-objective vessel scheduling problem model by discretizing, for each possible vessel sailing speed for the singular liner vessel, a vessel sailing speed reciprocal value, and calculating a fuel consumption for each vessel sailing speed reciprocal value;

solving the linearized multi-objective vessel scheduling problem model via a global multi-objective optimization algorithm by minimizing the associated summation value of the second set of objectives and setting an upper limit on the associated summation value of the first set of objectives, thereby generating the multi-objective mixed integer nonlinear optimization model;

wherein at least one set of objectives of the generated optimal vessel schedule is compared to at least one set of objectives of an original vessel schedule, via the processor of the computing device; and wherein the delivery of the optimal vessel schedule is automatically delivered the optimized vessel schedule to the singular liner vessel via the processor of the computing device by:

based on a determination that the multi-objective mixed integer nonlinear optimization model minimizes monetary losses in operating the singular liner vessel, automatically adjusting, while in transit, in real-time, a speed, an amount of ports to be visited, and a course path of the singular liner vessel according to the mixed integer nonlinear optimization model; and based on a determination that the multi-objective mixed integer nonlinear optimization model does not minimize monetary losses in operating the singular liner vessel, automatically maintaining, while in transit, in real-time, a speed, an amount of ports to be visited, and a course path of the singular liner vessel.

* * * * *